US012769017B2

(12) United States Patent
Meuth et al.

(10) Patent No.: US 12,769,017 B2
(45) Date of Patent: Oct. 20, 2026

(54) SEISMIC DETECTION SYSTEM AND METHOD

(71) Applicant: OCADO INNOVATION LIMITED, Hatfield (GB)

(72) Inventors: Benjamin Meuth, Hatfield (GB); Saqib Khaliq, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 165 days.

(21) Appl. No.: 18/720,096

(22) PCT Filed: Dec. 15, 2022

(86) PCT No.: PCT/EP2022/086239
§ 371 (c)(1),
(2) Date: Jun. 14, 2024

(87) PCT Pub. No.: WO2023/111222
PCT Pub. Date: Jun. 22, 2023

(65) Prior Publication Data

US 2025/0052917 A1 Feb. 13, 2025

(30) Foreign Application Priority Data

Dec. 17, 2021 (GB) ..................................... 2118417

(51) Int. Cl.
*G01V 1/01* (2024.01)
*B65G 1/04* (2006.01)
(Continued)

(52) U.S. Cl.
CPC ............. *G01V 1/01* (2024.01); *B65G 1/0478* (2013.01); *B65G 43/00* (2013.01);
(Continued)

(58) Field of Classification Search
CPC .... G01V 1/01; G01V 2210/21; B65G 1/0478; B65G 43/00; B65G 2207/20; B65G 1/0464; G01M 5/0066; G01M 7/00
See application file for complete search history.

(56) References Cited

U.S. PATENT DOCUMENTS

2013/0046475 A1 2/2013 Lin et al.
2013/0245810 A1 9/2013 Sullivan et al.
(Continued)

FOREIGN PATENT DOCUMENTS

EP 2942445 A1 11/2015
EP 2947445 A1 11/2015
(Continued)

OTHER PUBLICATIONS

Anonymous: "Seismic Design Category 101—Fitzpatrick Engineering", Mar. 25, 2019, 6 pages.
(Continued)

*Primary Examiner* — G.M. A Hyder
(74) *Attorney, Agent, or Firm* — Gregory Matt McCloskey

(57) ABSTRACT

A method for detecting seismic events, the method including acquiring acceleration data over a given period of time from one or more accelerometers located on a grid framework structure; comparing the acquired acceleration data to ground acceleration data from one or more accelerometers located on the ground; determining a differential acceleration between the acceleration data and the ground acceleration data; determining displacement data from the differential acceleration; and determining whether a seismic event has taken place over the given period of time based on the displacement data.

21 Claims, 29 Drawing Sheets

(51) Int. Cl.
*B65G 43/00* (2006.01)
*G01M 5/00* (2006.01)
*G01M 7/00* (2006.01)

(52) U.S. Cl.
CPC ............ *G01M 5/0066* (2013.01); *G01M 7/00* (2013.01); *B65G 2207/20* (2013.01); *G01V 2210/21* (2013.01)

(56) References Cited

U.S. PATENT DOCUMENTS

| | | | | |
|---|---|---|---|---|
| 2014/0324356 | A1 | 10/2014 | Park et al. | |
| 2015/0239668 | A1 | 8/2015 | Sullivan et al. | |
| 2015/0355050 | A1 | 12/2015 | Yoshida et al. | |
| 2016/0137419 | A1 | 5/2016 | Sullivan et al. | |
| 2017/0088354 | A1 | 3/2017 | Sullivan et al. | |
| 2018/0022549 | A1 | 1/2018 | Sullivan et al. | |
| 2018/0106696 | A1 | 4/2018 | Mcclure et al. | |
| 2018/0327185 | A1 | 11/2018 | Sullivan et al. | |
| 2019/0072684 | A1 | 3/2019 | Manfredini | |
| 2019/0233210 | A1 | 8/2019 | Sullivan et al. | |
| 2020/0339351 | A1 | 10/2020 | Sullivan et al. | |
| 2022/0204264 | A1 | 6/2022 | Sullivan et al. | |
| 2023/0312309 | A1* | 10/2023 | Ingram-Tedd ....... | B65G 1/0464 211/189 |
| 2023/0339679 | A1* | 10/2023 | Bates .................... | B65G 1/0464 |
| 2024/0270491 | A1* | 8/2024 | Bannister ............. | B65G 1/0464 |

FOREIGN PATENT DOCUMENTS

| | | | |
|---|---|---|---|
| EP | 2753992 | B1 | 2/2017 |
| JP | 2003294574 | A | 10/2003 |
| JP | 2003344213 | A | 12/2003 |
| JP | 2006249833 | A | 9/2006 |
| JP | 2007198812 | A | 8/2007 |
| JP | 2009216493 | A | 9/2009 |
| JP | 2011095237 | A | 5/2011 |
| JP | 2013170955 | A | 9/2013 |
| JP | 201617847 | A | 2/2016 |
| JP | 2018017529 | A | 2/2018 |
| JP | 2020076670 | A | 5/2020 |
| TW | 1676967 | B | 11/2019 |
| WO | 2015019055 | A1 | 2/2015 |
| WO | 2015185628 | A2 | 12/2015 |
| WO | 2016149823 | A1 | 9/2016 |
| WO | 2019101367 | A1 | 5/2019 |
| WO | 2021175873 | A1 | 9/2021 |
| WO | 2021175874 | A1 | 9/2021 |
| WO | 2022034195 | A1 | 2/2022 |

OTHER PUBLICATIONS

Goto et al., "Extreme Accelerations During Earthquakes Caused by Elastic Flapping Effect", Scientific Reports, 2019, 9 pages.

International Search Report (PCT/ISA/210) and Written Opinion (PCT/ISA/237) mailed on Mar. 15, 2023, by the European Patent Office as the International Searching Authority for International Application No. PCT/EP2022/086239.

Patents Act 1977: Combined Search and Examination Report under Section 17 in corresponding Application No. GB2118417.1 dated Jun. 7, 2022, 5 pages.

Patents Act 1977: Combined Search and Examination Report under Section 17 in corresponding Application No. GB2218981.5 dated May 25, 2023, 6 pages.

International Preliminary Report On Patentability issued on Jun. 27, 2024 by the International Bureau in corresponding PCT Application No. PCT/EP2022/086239 (13 pages) corresponding to Applicant's U.S. Appl. No. 18/720,096.

Office Action issued on May 13, 2025 by the Canadian Patent Office in corresponding Canadian Application No. 3,242,583 (4 pages) corresponding to Applicant's U.S. Appl. No. 18/720,096.

Office Action issued on Jul. 1, 2025 by the Japanese Patent Office in corresponding Japanese Application No. 2024-535792 (12 pages) corresponding to Applicant's U.S. Appl. No. 18/720,096.

* cited by examiner

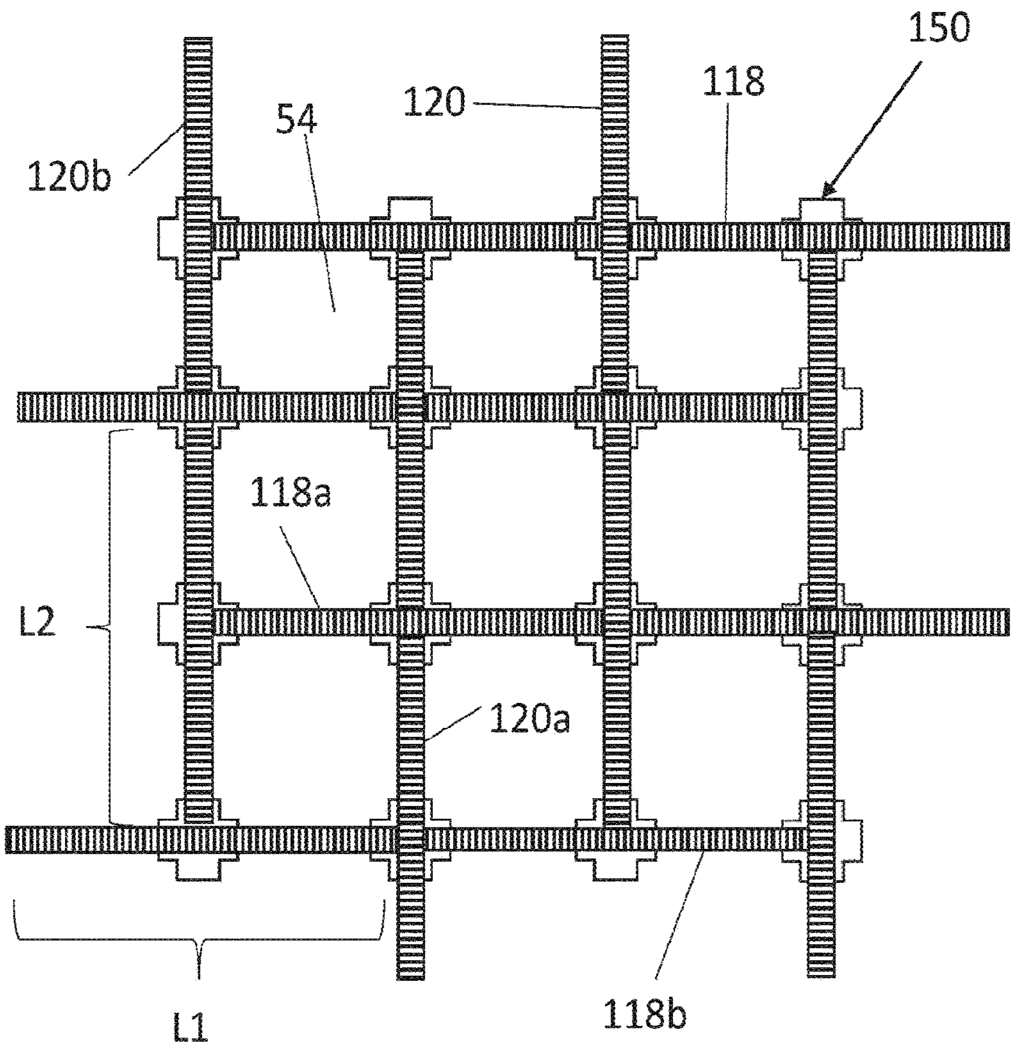
Figure 11
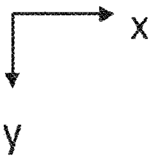

(a)

(b)

SEISMIC DETECTION SYSTEM AND METHOD

FIELD OF INVENTION

The present invention relates to the field of seismic detection systems and methods for a grid framework structure. The grid framework structure supports remotely operated load handling devices on tracks located on a grid framework structure for handling storage containers or bins stacked in the grid framework structure.

BACKGROUND

Storage systems comprising a three-dimensional storage grid structure, within which storage containers/bins are stacked on top of each other, are well known. PCT Publication No. WO2015/185628A (Ocado) describes a known storage and fulfilment system in which stacks of bins or containers are arranged within a grid framework structure. The bins or containers are accessed by load handling devices remotely operative on tracks located on the top of the grid framework structure. A system of this type is illustrated schematically in FIGS. 1 to 3 of the accompanying drawings.

As shown in FIGS. 1 and 2, stackable containers, known as bins or containers 10, are stacked on top of one another to form stacks 12. The stacks 12 are arranged in a grid framework structure 14 in a warehousing or manufacturing environment. The grid framework is made up of a plurality of storage columns or grid columns. Each grid in the grid framework structure has at least one grid column for storage of a stack of containers. FIG. 1 is a schematic perspective view of the grid framework structure 14, and FIG. 2 is a top-down view showing a stack 12 of bins 10 arranged within the framework structure 14. Each bin 10 typically holds a plurality of product items (not shown), and the product items within a bin 10 may be identical, or may be of different product types depending on the application.

The grid framework structure 14 comprises a plurality of upright members or upright columns 16 that support horizontal members 18, 20. A first set of parallel horizontal grid members 18 is arranged perpendicularly to a second set of parallel horizontal grid members 20 to form a plurality of horizontal grid structures supported by the upright members 16. The members 16, 18, 20 are typically manufactured from metal and typically welded or bolted together or a combination of both. The bins 10 are stacked between the members 16, 18, 20 of the grid framework structure 14, so that the grid framework structure 14 guards against horizontal movement of the stacks 12 of bins 10, and guides vertical movement of the bins 10.

The top level of the grid framework structure 14 includes rails 22 arranged in a grid pattern across the top of the stacks 12. Referring additionally to FIG. 3, the rails 22 support a plurality of load handling devices 30. A first set 22*a* of parallel rails 22 guide movement of the robotic load handling devices 30 in a first direction (for example, an X-direction) across the top of the grid framework structure 14, and a second set 22*b* of parallel rails 22, arranged perpendicular to the first set 22*a*, guide movement of the load handling devices 30 in a second direction (for example, a Y-direction), perpendicular to the first direction. In this way, the rails 22 allow movement of the robotic load handling devices 30 laterally in two dimensions in the horizontal X-Y plane, so that a load handling device 30 can be moved into position above any of the stacks 12.

A known load handling device 30 shown in FIGS. 4 and 5 comprising a vehicle body 32 is described in PCT Patent Publication No. WO2015/019055 (Ocado), hereby incorporated by reference, where each load handling device 30 only covers one grid space of the grid framework structure 14. Here, the load handling device 30 comprises a wheel assembly comprising a first set of wheels 34 consisting of a pair of wheels on the front of the vehicle body 32 and a pair of wheels 34 on the back of the vehicle 32 for engaging with the first set of rails or tracks to guide movement of the device in a first direction and a second set of wheels 36 consisting of a pair of wheels 36 on each side of the vehicle 32 for engaging with the second set of rails or tracks to guide movement of the device in a second direction. Each of the sets of wheels is driven to enable movement of the vehicle in X and Y directions respectively along the rails. One or both sets of wheels can be moved vertically to lift each set of wheels clear of the respective rails, thereby allowing the vehicle to move in the desired direction.

The load handling device 30 is equipped with a lifting device or crane mechanism to lift a storage container from above. The crane mechanism comprises a winch tether or cable 38 wound on a spool or reel (not shown) and a grabber device 39. The lifting device comprises a set of lifting tethers 38 extending in a vertical direction and connected nearby or at the four corners of a lifting frame 39, otherwise known as a grabber device (one tether near each of the four corners of the grabber device) for releasable connection to a storage container 10. The grabber device 39 is configured to releasably grip the top of a storage container 10 to lift it from a stack of containers in a storage system of the type shown in FIGS. 1 and 2.

The wheels 34, 36 are arranged around the periphery of a cavity or recess, known as a container-receiving recess or container receiving space 40, in the lower part. The recess is sized to accommodate the container 10 when it is lifted by the crane mechanism, as shown in FIGS. 5(*a* and *b*). When in the recess, the container is lifted clear of the rails beneath, so that the vehicle can move laterally to a different location. On reaching the target location, for example another stack, an access point in the storage system or a conveyor belt, the bin or container can be lowered from the container receiving portion and released from the grabber device.

In other examples, the container-receiving space 40 of the load handling device 30 may not be located within the body 32 of the load handling device 30. For example, in some examples, the container receiving space 40 may be adjacent to the body 32 of the load handling device 30, e.g. in a cantilever arrangement with the weight of the body 32 of the load handling device 30 counterbalancing the weight of the container to be lifted. In such embodiments, a frame or arms of the lifting device may protrude horizontally from the body 32 of the load handling device 30, and the lifting tethers 38 may be arranged at respective locations on the protruding frame/arms and configured to be raised and lowered from those locations to raise and lower a container 10 into the container-receiving space 40 adjacent to the body 32.

The grid framework structure is subjected to various external and internal forces. These include but are not limited to ground movement which can be attributed to the composition of the ground or soil type, forces developed by the movement of the load handling devices on the grid framework structure which can weight in excess of 100 kg, movement as a result of nearby constructions or moving vehicles such as trains or even during an earthquake or storm. It is paramount to keep the individual elements within the grid framework structure intact as a result of such external forces experienced by the grid framework.

To ensure stability of the grid framework structure, prior art storage systems are largely dependent on various supports and bracing arranged within or at least partly along the periphery of the grid. However, the use of various supports and bracing (anti-movement braces) to stabilise the grid framework structure from internal and external forces is disadvantageous for a number of reasons. The grid framework structure occupies space or area which could be utilised by the grid to store containers; in that it prevents optimum usage of available space or area for the storage of containers. The need of a supporting structure may limit the available options for positioning of the grid framework structure since any auxiliary grid supporting structure often requires connection to a surrounding structure such as the inner walls of a building and the requirement of a supporting structure that is not cost efficient.

WO2019/101367 (Autostore Technology AS) teaches a grid supporting structures for integration in a storage grid structure of an automated storage system. The grid supporting structure is made up of four storage columns interconnected by multiple vertically inclined support struts. The storage column profiles has a cross-section comprising a hollow centre section and four corner sections, each corner section comprises two perpendicular bin guiding plates for accommodating a corner of a storage bin. The support struts have a width which allows them to fit in between two parallel guiding plates so as to not compromise the ability of the storage columns to accommodate a stack of containers or storage bins.

An alternative grid framework structure is thus required that minimises the impact of the available space or area for the storage of containers so as to provide a free-standing storage grid or at least requiring a less extensive auxiliary grid support structure.

Much of the world's population is located along seismic fault lines or in the paths of powerful storms such as hurricanes and tornadoes. Locating the grid frame structure in such areas are at risk of structural damage from seismic and storm events as the current grid framework structure may not hold the grid structure together. Powerful seismic and storm events may result in the failure of their structural integrity e.g. as a result in the inability of the structural fasteners to keep the grid firmly attached to the upright members. Earthquakes can be labelled into four categorises labelled as Type A, B, C, or D depending on the severity of the earthquake, whereby Type A is considered the least powerful earthquake and Type D is considered the most powerful earthquake. Type A-D can be graded by their spectral acceleration which is the maximum acceleration measured in g that an object, above ground level, will experience during an earthquake. Type D considered to represent the most powerful seismic event and typically, has a measured spectral acceleration in the region 0.5 g to 1.83 g (short period spectral response acceleration SDS see https://www.fegstructural.com/seismic-design-category-101/) and is the result of most failure of buildings. As powerful seismic events act on a structure, the three dimensional dynamic forces compromise the structural fasteners holding the grid framework structure together, causing them to work their way loose or out of the members in which they are embedded or, if they remain in place, they may tear their way through a structural fastener.

Many jurisdictions, such as the US states, have passed laws mandating that all new buildings, residential or commercial be constructed with certain seismic bracing features incorporated therein. A grid framework structure comprises internal bracing features incorporated within the grid framework structure whereby one or more of the upright members are braced together by one or more bracing members or bracing towers is shown in FIG. 6. Typically, the bracing members are distributed internally throughout the grid framework structure. The distribution of the internal bracing is largely dependent on the size of the grid framework structure, the ground condition and the environmental condition such as temperature. However, whilst the grid framework structure is able to withstand very low level seismic events having a spectral acceleration less than 0.3 g, presently there are no earthquake restraint system for a grid framework structure that is able to withstand more powerful Type C and Type C seismic events categorised by a spectral acceleration in the region of 0.5 g to 1.83 g.

After a seismic event, the state of the grid framework structure needs to be assessed. Manual inspection after the seismic event is possible, but of course it is preferable to understand the state of the grid framework structure before sending in personnel.

The first step before any damage in the grid framework structure can be rectified is to understand the extent of the damage, in particular to measure the extent of yielding in the grid framework structure. To do this manually would require measuring the position of the structural members at the edge and inside the grid framework structure, which is a labour-intensive and time-consuming process. Another method of measuring displacement is required that does not require manual intervention.

A seismic detection system is therefore needed that can determine whether a seismic event has taken place, and assess the extent of yielding of the grid framework structure without the need for humans to enter the grid and take measurements manually.

SUMMARY OF INVENTION

One aspect of the invention provides a method for detecting seismic events, the method comprising the steps of:

a) acquiring acceleration data over a given period of time from one or more accelerometers located on a grid framework structure, said grid framework structure comprising
 i) a first set of horizontal grid members extending in a first direction;
 ii) a second set of horizontal grid members extending in a second direction substantially perpendicular to the first direction and intersecting with the first set of horizontal grid members at intersections, the first and second sets of horizontal grid members being arranged to form a grid comprising a plurality of substantially rectangular frames in a horizontal plane, each of the substantially rectangular frames constituting a grid cell;
 iii) a plurality of upright columns supporting the first and second sets of horizontal grid members, the plurality of upright columns forming a plurality of vertical storage locations for containers to be stacked between the upright columns;
b) comparing the acquired acceleration data to ground acceleration data from one or more accelerometers located on the ground;
c) determining a differential acceleration between the acceleration data and the ground acceleration data;
d) determining displacement data from the differential acceleration; and e) determining whether a seismic event has taken place over the given period of time based on the displacement data.

Acceleration data is acquired from the one or more accelerometers as a signal of acceleration as a function of time. Differential acceleration is calculated by subtracting the ground acceleration data from the acceleration data, and is the difference between the acceleration data and the ground acceleration data. Differential acceleration represents the acceleration of the grid framework structure relative to the ground.

The given period of time represents the time between the start of the seismic event and the end of the seismic event. For example, the given period of time could be the time during which the acceleration measured by the accelerometers is significantly higher than background acceleration, or the period of time during which the differential acceleration is above a minimum acceleration threshold.

The step of determining displacement data may comprise performing double integration on the differential acceleration data. Integrating the differential acceleration once with respect to time gives differential velocity (the velocity of the grid framework structure relative to the ground). Integrating the differential acceleration a second time, i.e. integrating the differential velocity with respect to time, gives the displacement data. The displacement data represents differential displacement (the displacement of the grid framework structure relative to the ground as a result of movement of the grid framework structure), and is a signal of displacement as a function of time. The acceleration data and displacement data represent the acceleration and displacement of the points on the grid structure where each of the one or more accelerometers are located, relative to the ground. The ground acceleration data represents the acceleration of the ground, since the ground acceleration data is acquired from one or more accelerometers located on the ground, and provides a reference point for calculating differential acceleration data.

The one or more accelerometers located on the ground may be attached to a substructure (for example, a concrete foundation or slab) upon which the grid framework structure is built, or alternatively the one or more accelerometers located on the ground may be directly placed on top of the soil (e.g. located inside a hole in the substructure).

The step of determining whether a seismic event has taken place may comprise one or more of the following steps:

a) detecting non-proportional response from the displacement data;

b) detecting period elongation in the displacement data;

c) calculating static displacement from the displacement data.

In each of these three cases a), b) and c), the step of determining whether a seismic event has taken place may comprise identifying the presence of one or more characteristic oscillation regimes in the displacement data, where the one or more characteristic oscillation regimes comprise:

a) a non-proportional response regime;

b) a period elongation regime;

c) a residual drift regime.

In each of these three cases a), b) and c), determining whether a seismic event has taken place may comprise comparing the displacement data or a parameter derived from the displacement data to a predetermined threshold. In case a) non-proportional response, the predetermined threshold may comprise a displacement threshold; in case b) period elongation, the predetermined threshold may comprises a predetermined frequency and/or a predetermined period of oscillation; and in case c) residual drift, the predetermined threshold may comprise a predetermined static displacement threshold. Each of these three characteristic oscillation regimes is described in more detail below.

Case a), the non-proportional response regime, may occur when a structural member of the grid framework structure extends beyond its elastic limit and exhibits inelastic behaviour.

The step of determining whether a seismic event has taken place over the given period of time may comprise determining whether the displacement data exceeds a predetermined displacement threshold corresponding to the elastic limit of a member of the grid structure. The step of determining whether a seismic event has taken place may comprise identifying the non-proportional response regime by determining whether the displacement is proportional to the acceleration.

Case b), the period elongation regime, may occur when a structural member yields and the dynamic properties of the grid framework structure have changed as a result.

The step of determining whether a seismic event has taken place may comprise determining a change in a frequency and/or period of oscillation of the displacement data over the given period of time. Determining the change in the frequency and/or period of oscillation of the displacement data may comprise determining whether the frequency and/or period of oscillation differs from a predetermined frequency and/or a predetermined period of oscillation. The step of determining the change in the frequency and/or period of oscillation of the displacement data may comprise calculating a Fourier transform of the displacement data to obtain a frequency spectrum of the grid framework structure. The method may further comprise the step of providing reference displacement data representative of the behaviour of the grid framework structure in the absence of seismic events, and calculating a Fourier transform of the reference displacement data to obtain a reference frequency spectrum of the grid framework structure. The method may further comprise the step of comparing the frequency spectrum of the grid framework structure to the reference frequency spectrum of the grid framework structure. The natural frequency of oscillation of the grid structure can be obtained from the frequency spectrum of the grid framework structure. If the natural frequency obtained from the reference frequency spectrum of the grid framework structure (i.e. the natural frequency in the absence of seismic event) is different to the natural frequency obtained from the frequency spectrum of the grid framework structure, then the change in the natural frequency may be an indication of yielding in the grid framework structure.

Case c), the residual drift regime, may occur when there is a static displacement of the grid framework structure that remains after oscillations die down, i.e. the static displacement indicates that an accelerometer has moved from its initial position.

Displacement data can be divided into two parts: oscillating displacement or dynamic displacement, representing the oscillation of the accelerometer about its centre position, and static displacement, representing movement of the centre position of the oscillating displacement relative to its origin or initial position. Dynamic displacement indicates that the accelerometer's position is oscillating about its centre position, and static displacement indicates that the accelerometer has moved or been displaced from its origin or initial position. The displacement data is a superposition of oscillating displacement and static displacement.

The step of determining whether a seismic event has taken place over the given period of time may comprise determining a static displacement from the displacement data and determining whether the static displacement exceeds a predetermined static displacement threshold.

If the centre position of the oscillating displacement remains at the origin, then the static displacement is zero. However, if a structural member upon which an accelerometer is mounted yields, the accelerometer will move so that the centre position of its oscillating displacement is no longer at the accelerometer's origin or initial position. This movement of the centre position can also be described as residual drift, meaning that once the oscillating displacement has died down or attenuated, the accelerometer is displaced (i.e. has drifted) from its initial position.

Rather than determining whether a seismic event has taken place from the presence of any non-zero static displacement or residual drift, it is advantageous to define a predetermined static displacement threshold that is greater than zero. When the static displacement is above this predetermined static displacement threshold, it is considered that a seismic event has taken place. A predetermined static displacement of zero would pick up small displacements, and cause false alarms due to small displacements that are not caused by seismic events (e.g. measurement errors).

Any or all of the three cases a) b) and c) can be used to determine whether a seismic event has taken place. In some cases it may be advantageous to use more than one of these methods, to ensure that the event is indeed a seismic event, and not a false positive (for example, residual drift/static displacement could be detected if an accelerometer moves relative to the grid framework structure rather than indicating failure of a structural member to which it is mounted).

The method may further comprise the step of filtering the acceleration data to remove or attenuate one or more signals associated with non-seismic events. Non-seismic events that may cause vibration signals may include normal operation of a storage and retrieval system or other machinery in the same building or in the surrounding area. For example, vibrations can be generated by load handling devices moving on the grid framework structure, or conveyor systems, pick stations, movement of vehicles (e.g. fork lift trucks), or other machinery in the same building. Outside the building, vibrations can be generated by passing traffic, roadworks, or movement of the ground. Filtering out these non-seismic signals is advantageous because the filtered data is cleaner and it is less likely that false positives will occur (i.e. the method detects a seismic event when no seismic event has occurred).

The step of filtering the acceleration data may comprise using a high-pass filter, low-pass filter, and/or a band filter. A high-pass filter removes or attenuates signals at a frequency below a threshold frequency and permits signals at a frequency above the threshold frequency to pass through. A low-pass filter removes or attenuates signals at a frequency above a threshold frequency and permits signals at a frequency below the threshold frequency to pass through. A band filter removes or attenuates signals at a frequency below a lower threshold frequency or above a higher threshold frequency, and permits signals at a frequency between the lower threshold frequency and the upper threshold frequency to pass through. Filtering is advantageous because it can remove noise at frequencies other than the frequency range of interest, for example the frequency range within which seismic events occur, or the frequency range within which the signal is likely to change as a result of a seismic event.

The step of the step of filtering the acceleration data to remove or attenuate one or more signals associated with non-seismic events may comprise determining the frequency ranges at which oscillation occurs in the absence of seismic events, and attenuating or filtering out these frequency ranges from the acceleration data.

The step of filtering the acceleration data to remove or attenuate one or more signals associated with non-seismic events may comprise providing reference acceleration data representative of the behaviour of the grid framework structure in the absence of seismic events, determining the frequency ranges in the reference acceleration data at which oscillation occurs in the absence of seismic events, and attenuating or filtering out these frequency ranges from the acceleration data.

Determining which frequency ranges to filter out can be done by taking a Fourier transform of the acceleration and/or the reference acceleration data in order to obtain the frequency spectrum.

The one or more accelerometers located on the grid framework structure may comprise a plurality of accelerometers, and the step of determining whether a seismic event has taken place may be based on displacement data from the plurality of accelerometers.

An advantage of using a plurality of accelerometers located on the grid framework structure is that there is redundancy built into the method. If a first accelerometer fails to detect a seismic event, then a second accelerometer is performing the same task and can detect the seismic event if the first accelerometer does not. If the method relied solely upon a single accelerometer located on the grid framework structure, then any issues with the single accelerometer would mean that seismic events would not be detected.

In some examples with a plurality of accelerometers located on the grid framework structure, a voting system can be used to determine whether a seismic event has taken place. Each accelerometer would vote "yes" or "no" depending on whether or not the data acquired by that accelerometer positively identifies a seismic event. For example, a seismic event can be considered to have taken place if a majority of the plurality of accelerometers vote "yes" (i.e. the data from the majority of the plurality of accelerometers positively identifies that a seismic event has taken place). A threshold for determining whether a seismic event has taken place can be based on a proportion of the plurality of accelerometers voting "yes"; the threshold can be a number of accelerometers (e.g. at least 10 accelerometers) or a proportion of the total number of accelerometers (e.g. a majority or 50%, two in three, 75%).

The step of determining whether a seismic event has taken place may comprise at least two out of three of the plurality of accelerometers detecting a seismic event. In this case, if there are three accelerometers located on the grid framework structure, a seismic event will be considered to have taken place if the first and second accelerometers vote "yes" but the third votes "no".

The method may further comprise the step of sending a signal to one or more output devices in response to determining that a seismic event has taken place over the given period of time. This is important in order to alert personnel to the seismic event and allow the building to be evacuated. The method may further comprise the step of using the differential acceleration and/or the displacement data to determine whether:

a) the grid framework structure has permanently deformed; and/or b) the grid framework structure is sufficiently undamaged to continue operating; and/or c) the grid framework structure is safe for personnel to enter; and/or d) the grid framework structure structural capacity to resist aftershocks.

These different states of the grid framework structure will be described in more detail later.

In examples where the one or more accelerometers comprise a plurality of accelerometers distributed across the grid framework structure, the method may further comprise the step of using the differential acceleration and/or the displacement data to determine the extent of damage to different parts of the grid framework structure.

The method may further comprise the step of preparing the grid framework structure for further seismic activity if the method detects the early stages of a seismic event.

The step of preparing the grid framework structure for a seismic event may comprise one or more of the following steps:

shutting off a power supply to components of the grid framework structure;

bringing load handling devices operative on the grid framework structure to a stop;

activating brakes on load handling devices;

shutting off a power supply to load handling devices operative on the grid framework structure.

Alternatively or additionally, preparatory actions may be taken as a result of an alert from a seismic early warning system, otherwise known as Earthquake Early Warning (EEW) or Early Warning System (EWS). Such systems operate on the principle that electronic alerts from the region of the epicentre of the seismic event can travel more quickly than seismic waves. During a seismic event, P-waves (pressure waves or primary waves) are followed by S-waves (shear waves or secondary waves). P-waves are longitudinal compression waves, travel faster than S-waves, and can be transmitted through the liquid layers of the Earth's interior. S-waves are transverse shear waves, more destructive than P-waves but travel more slowly. When a seismic event occurs, the initial P-waves trigger sensors that detect their presence. The location and magnitude of the seismic event is estimated from the P-waves, and the system sends an alert to affected areas. Locations farther from the epicentre of the seismic event can have some seconds or minutes to prepare before the more destructive S-waves arrive. The combination of early warning systems and automated responses can help to prevent some of the injuries and damage typically associated with major seismic events.

Appropriate actions can be taken as a result of an alert from a seismic early warning system. For example, personnel can be evacuated from the building housing the grid framework structure, vehicles can be parked and power sources (e.g. engines or motors) switched off, and other machinery turned off or shut down. In addition the steps for preparing a grid framework structure as described above are applicable.

In another aspect, the invention provides a method of condition monitoring a grid framework structure following a seismic event, the grid framework structure comprising:

i) a first set of horizontal grid members extending in a first direction;

ii) a second set of horizontal grid members extending in a second direction substantially perpendicular to the first direction and intersecting with the first set of horizontal grid members at intersections, the first and second sets of horizontal grid members being arranged to form a grid comprising a plurality of substantially rectangular frames in a horizontal plane, each of the substantially rectangular frames constituting a grid cell;

iii) a plurality of upright columns supporting the first and second sets of horizontal grid members, the plurality of upright columns forming a plurality of vertical storage locations for containers to be stacked between the upright columns;

iv) one or more accelerometers located on the grid framework structure;

the method comprising the steps of:

a) acquiring acceleration data over a given period of time from the one or more accelerometers;

b) comparing the acquired acceleration data to ground acceleration data over the given period of time from one or more accelerometers located on the ground;

c) determining a differential acceleration between the acceleration data and the ground acceleration data;

e) determining the extent of damage to different portions of the grid framework structure that occurred during the given period of time by determining whether the differential acceleration data exceeded a predetermined acceleration threshold during the given period of time.

The purpose of condition monitoring is to determine the condition of the grid framework structure after a seismic event, e.g. the extent of damage to different portions of the grid framework structure. Condition monitoring after a seismic event is important in order to assess the extent of damage to different portions of the grid framework structure, and will enable the grid framework structure to be repaired faster and reduce downtime. Without condition monitoring, the entirety of the grid framework structure would need to be assessed for damage, and more importantly there would be no indication of whether the grid framework structure is safe for personnel to enter. The predetermined acceleration threshold is an acceleration value that is used to define the status of a portion of the grid framework structure, i.e. different actions (e.g. inspection, repair) may be required depending on whether or not the differential acceleration exceeds the predetermined acceleration threshold.

The predetermined acceleration threshold may comprise a plurality of predetermined acceleration thresholds, each of the plurality of predetermined acceleration thresholds being indicative of a different level of damage to one or more of the portions of the grid framework structure. This enables different portions of the grid framework structure to be classified or categorised according to the level of damage, so that appropriate action (e.g. inspection and/or repairs) can be undertaken efficiently.

The plurality of predetermined acceleration thresholds may comprise a first acceleration threshold indicative of an elastic limit of a portion of the grid framework structure, such that the differential acceleration of the portion of the grid framework structure exceeding the first acceleration threshold provides an indication that the portion of the grid framework structure has been permanently deformed. If permanently deformed, then the portion of the grid framework structure may not be in a suitable condition to continue operating, for example load handling devices may not be able to travel on deformed or misaligned tracks, and load handling devices may not be able to lift storage containers from the stacks if the vertical uprights are deformed or misaligned. If not permanently deformed, then the portion of the grid framework structure may be in a suitable condition to continue operating, for example the tracks have returned to their original shape and position so load handling devices can still operate on the tracks, and the vertical uprights have returned to their original shape and position so the load handling devices can continue to lift storage containers from the stacks in order to retrieve products for customer orders.

The first acceleration threshold may be substantially 0.6 g.

The plurality of predetermined acceleration thresholds may comprise a second acceleration threshold indicative of a safety limit, such that the differential acceleration of a portion of the grid framework structure exceeding the second acceleration threshold provides an indication that it is not safe for personnel to enter the portion of the grid framework structure. Understanding which portions of the grid framework structure are safe for personnel to enter is advantageous, both for reducing the risk to personnel and for enabling personnel to confidently and safely inspect those portions of the grid framework structure which are safe for personnel to enter.

The second acceleration threshold may be substantially 1.0 g.

The plurality of predetermined acceleration thresholds may comprise a third acceleration threshold indicative of a structural limit, such that the differential acceleration of a portion of the grid framework structure exceeding the third acceleration threshold provides an indication that the portion of the grid framework structure does not have sufficient structural capacity to resist aftershocks. The structural limit is a measure of whether the portion of the grid framework structure has sufficient structural capacity to resist aftershocks, i.e. if the differential acceleration has remained below the structural limit then the portion of the grid framework structure is able to resist aftershocks, and if the differential acceleration has exceeded the structural limit, then the portion of the grid framework structure is not able to resist aftershocks, and is therefore in danger of collapsing as a result of aftershocks. If the third acceleration threshold has been exceeded, then no personnel should enter the grid framework structure.

The third acceleration threshold may be substantially 1.83 g.

The method may further comprise the steps of:

f) determining displacement data from the differential acceleration; and g) determining the extent of damage to different parts of the grid framework structure by determining whether the displacement data has exceeded a predetermined displacement threshold.

The predetermined displacement threshold may be indicative of an elastic limit, such that the displacement of a portion of the grid framework structure exceeding the predetermined displacement threshold provides an indication that the portion of the grid framework structure has been permanently deformed. If the displacement of the portion of the grid framework structure is below the predetermined displacement threshold, then the elastic limit has not been exceeded, and the portion of the grid framework structure has deformed elastically and returned to its original position. This may indicate that the portion of the grid framework structure can continue operating as usual, i.e. the tracks supporting the load handling devices are not misaligned so can continue to be used.

Knowing which portions of the grid framework structure have not exceeded the elastic limit is advantageous, because some portions may be able to continue operating as usual while other portions are assessed for damage and repaired as necessary. Ensuring business continuity, i.e. being able to continue fulfilling customer orders, is a great advantage.

In another aspect, the invention provides a seismic detection system for a grid framework structure configured to carry out the method of any preceding claim, the seismic detection system comprising:

a) one or more accelerometers mounted on the grid framework structure;

b) an input module configured to acquire acceleration data from the one or more accelerometers;

c) a controller in communication with the input module, the controller comprising one or more processors and a memory storing instructions that, when executed by the one or more processors, cause the one or more processors to:

i) determine whether a seismic event has taken place based on the acquired acceleration data from the one or more accelerometers and ii) in response to determining that a seismic event has taken place, send a signal to one or more output devices.

In some cases, the input module may also supply power to the accelerometers.

The seismic detection system may further comprise an output module configured to allow the controller to send a signal to one or more output devices.

The seismic detection system may further comprise one or more accelerometers located on the ground near the grid framework structure. The one or more accelerometers located on the ground near the grid framework structure may be used to acquire ground acceleration data, to be used as a reference in calculating the differential acceleration data as described above.

The one or more output devices may comprise beacons, alarms, and/or sirens.

In another aspect, the invention provides a grid framework structure, comprising a first set of horizontal grid members extending in a first direction;

a second set of horizontal grid members extending in a second direction substantially perpendicular to the first direction and intersecting with the first set of horizontal grid members at intersections, the first and second sets of horizontal grid members being arranged to form a grid comprising a plurality of substantially rectangular frames in a substantially horizontal plane, each of the substantially rectangular frames constituting a grid cell;

a plurality of upright columns supporting the first and second sets of horizontal grid members, the plurality of upright columns forming a plurality of vertical storage locations for containers to be stacked between the upright columns;

wherein the grid framework structure further comprises the seismic detection system of the invention.

The one or more accelerometers mounted on the grid framework structure may comprise a plurality of accelerometers arranged along the first direction and/or the second direction of the grid. For example, the first direction may represent an X-direction, and the second direction a Y-direction perpendicular to the X-direction. The accelerometers may be arranged in one or more lines along the X-direction and/or the Y-direction, or arranged in a grid pattern. The plurality of accelerometers may be arranged along at least a portion of the periphery of the grid. For example, the plurality of accelerometers may be arranged in a line along one edge of the grid, or two edges of the grid, or three edges of the grid, or all four edges of the grid. In some examples, a portion of the plurality of accelerometers may be arranged on the periphery of the grid and the remainder of the accelerometers arranged within the grid. At least a portion of the plurality of accelerometers may be arranged diagonally relative to the first and second direction of the grid. For example, a portion of the plurality of accelerometers may be arranged in a diagonal line across the grid. Combinations of these and other arrangements are also possible.

The plurality of accelerometers may lie in a substantially horizontal plane. The accelerometers may be in the same plane as the grid itself (e.g. mounted on the tracks or on the horizontal grid members), or in a parallel horizontal plane. The accelerometers may be located at or near the top of the grid framework structure, in order to measure the differential acceleration between the top of the grid framework structure and the ground.

An advantage of having a plurality of accelerometers distributed horizontally on the grid framework structure is that the accuracy of the data is improved. A greater number of accelerometers enables the displacement of the grid framework structure to be determined with greater accuracy and in more detail.

A further advantage of having a plurality of accelerometers distributed horizontally on the grid framework structure is that the data from the accelerometers can be used to determine which part(s) of the grid framework structure have suffered damage in a seismic event. If one part of the grid framework structure is damaged but another part is intact, then it may be possible for load handling devices to keep operating on the undamaged part of the grid while the damaged part is repaired. Also the accelerometer data can be used to determine the extent of yield/damage to the grid framework structure, for example to determine whether a part of the grid framework structure has not gone beyond the elastic limit and can continue operating as usual, or is damaged but safe for personnel to enter to assess the situation and take remedial action, or is so damaged that it would not be safe for personnel to enter that area of the grid framework structure.

The plurality of accelerometers may consist of between 15 and 28 accelerometers.

The one or more accelerometers mounted on the grid framework structure may be mounted on the horizontal grid members. In some examples, the accelerometers may be mounted on the tracks, or on the track supports, or on the vertical uprights.

The grid framework structure may further comprise an exoskeleton comprising a plurality of vertical frame columns braced by one or more bracing members, the grid being further supported by the exoskeleton to form a seismic force restraint system (SFRS). As will be discussed in more detail later, the exoskeleton provides further support to the grid framework structure and protects the grid framework structure from damage in case of seismic events.

The one or more accelerometers mounted on the grid framework structure may be mounted on the SFRS. In particular, the one or more accelerometers mounted on the grid framework structure may be mounted to the one or more bracing members. The bracing members act as sacrificial members in the case of a seismic event (i.e. the bracing members will yield first and protect the grid framework structure from damage), so by placing accelerometers on the bracing members, the seismic detection system is able to detect whether the bracing members have yielded. If the bracing members have not yielded, then the grid and the supporting framework structure are intact and can continue operating. It is advantageous to be able to determine that parts of the grid are undamaged and can continue operating, because then at least part of the storage system can continue fulfilling customer orders without significant downtime, thus reducing costs and enabling continuity of the business.

The grid framework structure may be subdivided into a plurality of modular frames, such that the grid extends across the plurality of modular frames. In examples where the grid framework structure is modular, some or all of the modular frames may be supported by an exoskeleton. Each of the plurality of modular frames may comprise an exoskeleton comprising a plurality of vertical frame columns braced by one or more bracing members, the grid being supported by the exoskeleton to form a seismic force restraint system (SFRS), wherein adjacent modular frames are arranged such that at least a portion of the SFRS is shared between adjacent modular frames.

Another way of describing a modular grid framework structure is an assembly comprising a plurality of modular frames, wherein each of the plurality of modular frames comprises a grid framework structure and the grid extends across the plurality of modular frames, and at least one of the plurality of modular frames comprises the seismic detection system as described above.

An advantage of subdividing the grid framework structure into a plurality of modular frames is that if one of the modular frames yields due to seismic events, other modular frames may be unaffected and able to continue operating.

The grid framework may further comprise a seismic isolation system for reducing seismic forces acting on the grid framework structure, wherein the grid framework structure is supported by the seismic isolation system, the seismic isolation system comprising a superstructure and a substructure, and at least one base isolation device disposed between the superstructure and the substructure such that the at least one base isolation device suppresses movement of the superstructure relative to the substructure in a seismic event.

The seismic isolation system has the advantage of partially isolating or decoupling the grid framework structure from its foundation, so that horizontal components of ground movement during seismic events are attenuated. The at least one base isolation device enables relative motion of the superstructure and the substructure, so not all of the horizontal movement of the ground is translated into horizontal movement of the grid framework structure.

In another aspect, the invention provides a multi-storey grid framework structure, comprising:

i) a first grid framework structure at a first level;
ii) a second grid framework structure at a second level, the second level being above the first level;

wherein each of the first and second grid framework structures comprises a grid framework structure as defined herein.

The advantage of a multi-storey grid framework structure is that more storage space is provided for the same footprint. This is particularly useful in territories where usable land is at a premium, so there is an advantage in building upwards rather than outwards so as to make the most efficient use of available space.

In another aspect, the invention provides a storage and retrieval system, comprising a grid framework structure as defined herein;

one or more load handling devices remotely operable to move the one or more containers stored in the grid framework structure, each of the one or more load handling devices comprising:

i) a wheel assembly for guiding the load handling device on the grid framework structure;
ii) a container-receiving space located above the grid framework structure; and iii) a lifting device arranged to lift a single container from a stack into the container-receiving space.

DESCRIPTION OF DRAWINGS

Further features and aspects of the present invention will be apparent from the following detailed description of an illustrative embodiment made with reference to the drawings, in which:

FIG. 11 is a perspective view showing the pattern of the grid elements at the intersections according to an embodiment of the present invention.

DETAILED DESCRIPTION

Grid Framework Structure

Figure 1:
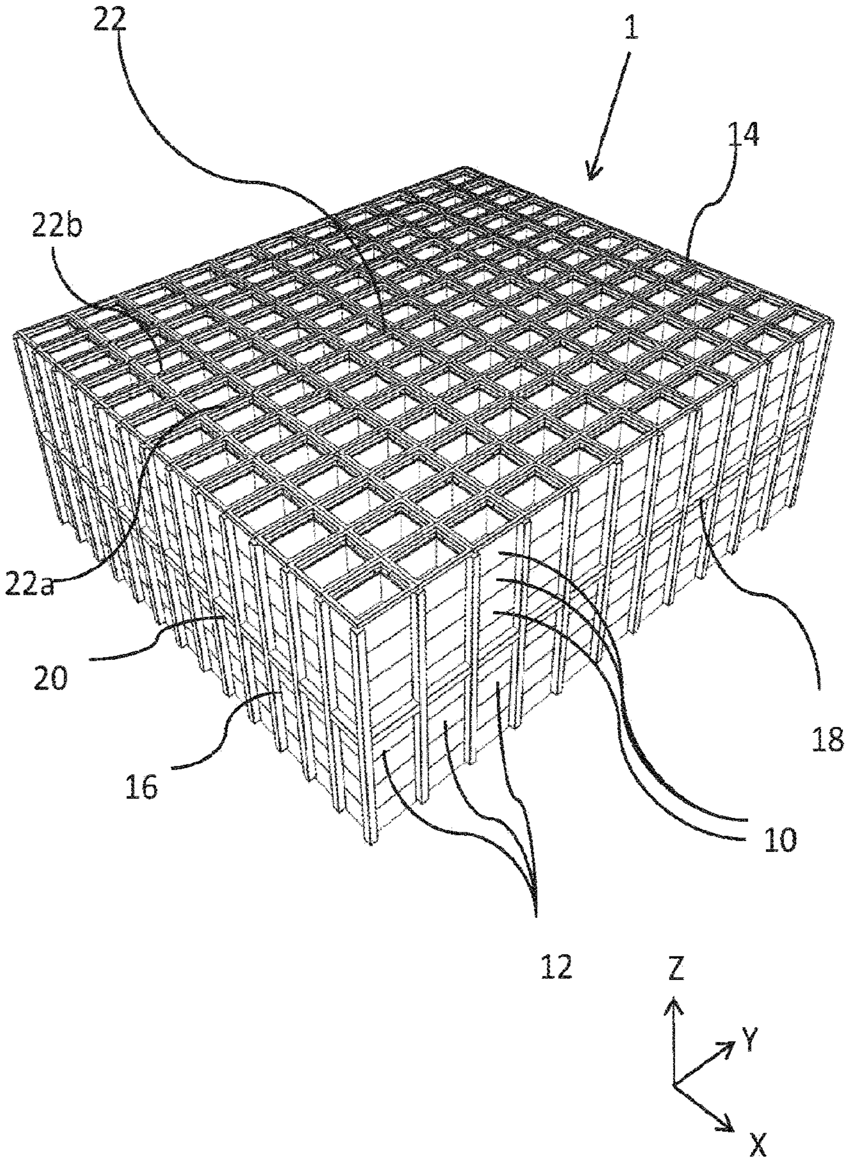
Figure 1 (PRIOR ART)
FIG. 1 is a schematic diagram of a grid framework structure according to a known system.
Figure 2:
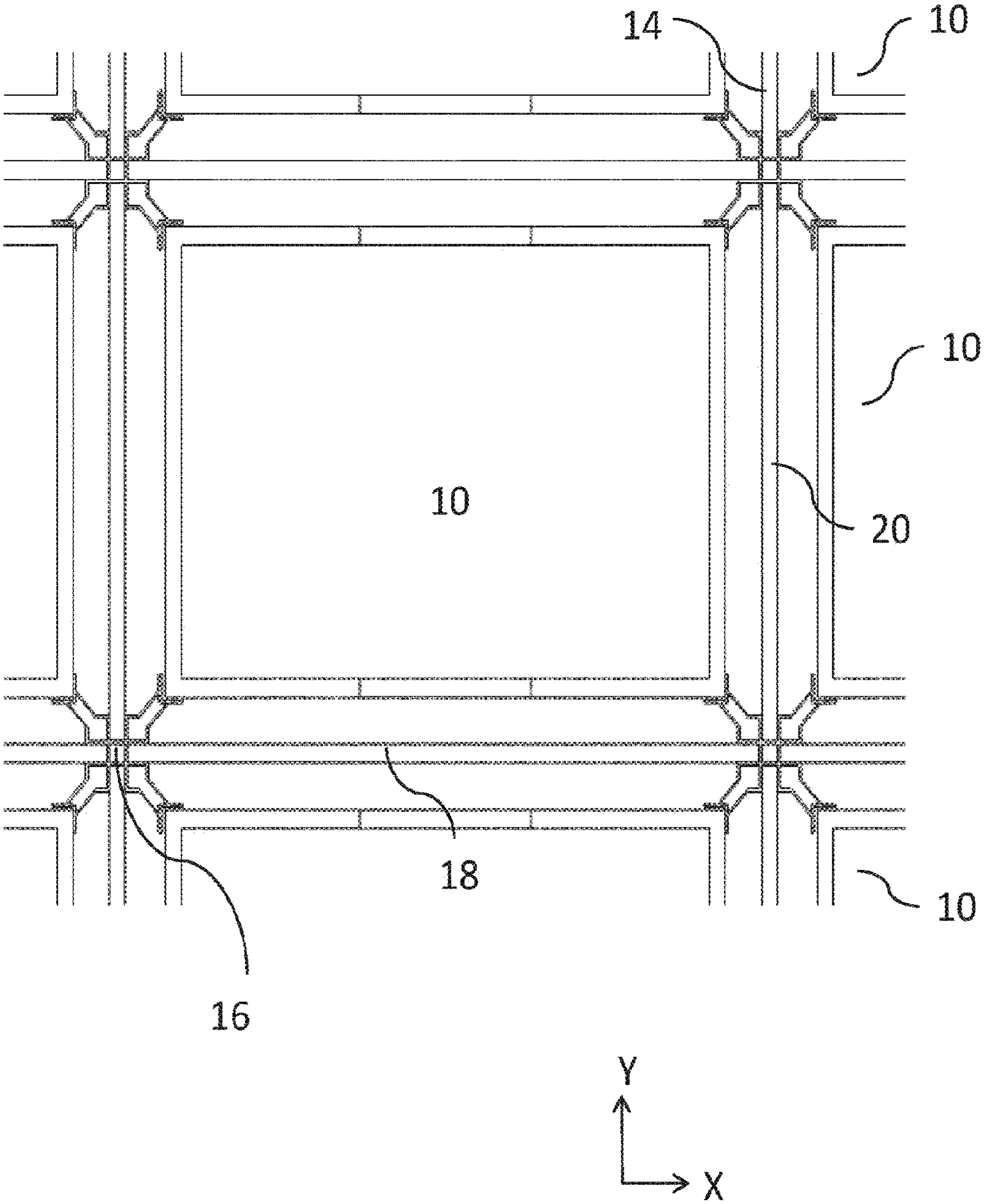
Figure 2 (PRIOR ART)
FIG. 2 is a schematic diagram of a top down view showing a stack of bins arranged within the framework structure of FIG. 1.
Figure 3:
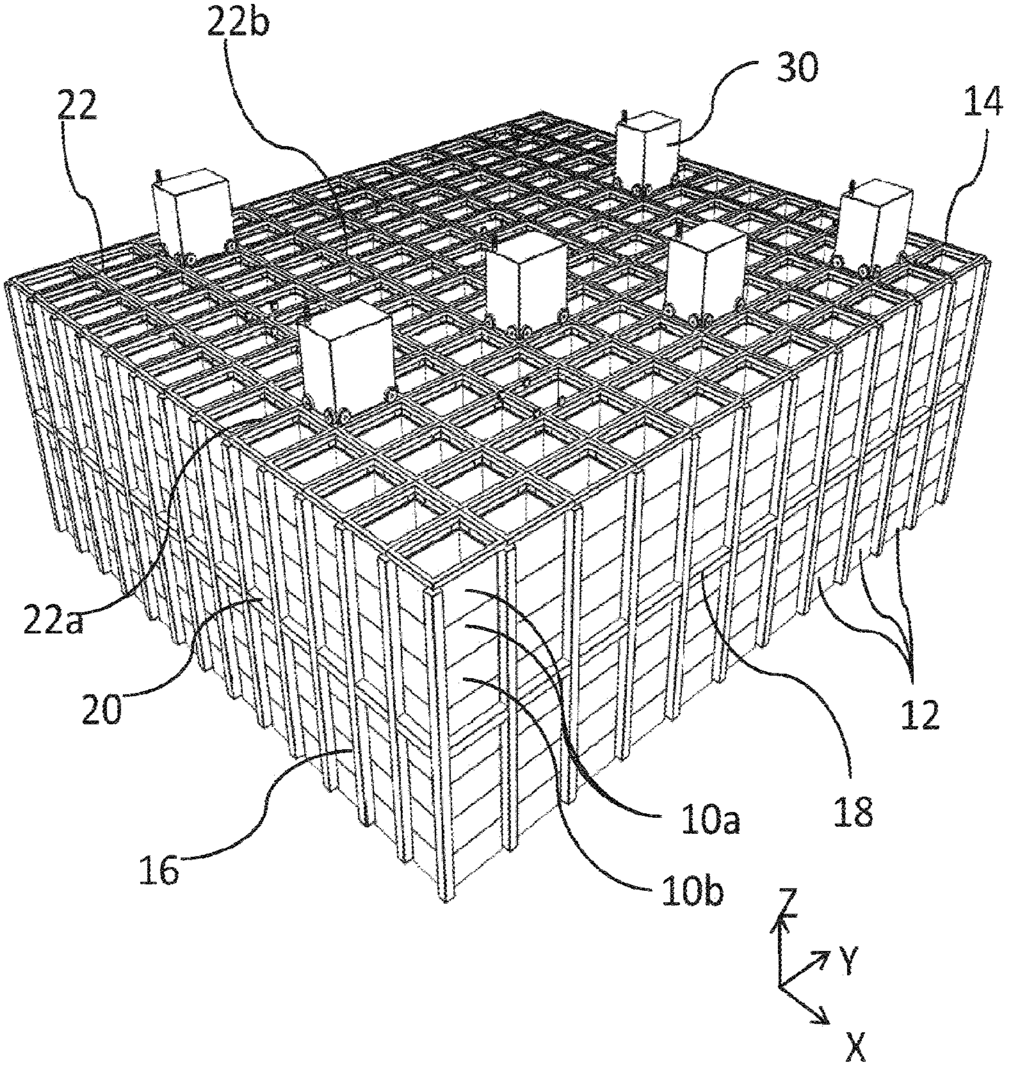
Figure 3 (PRIOR ART)
FIG. 3 is a schematic diagram of a system of a known load handling device operating on the grid framework structure.
Figure 4:
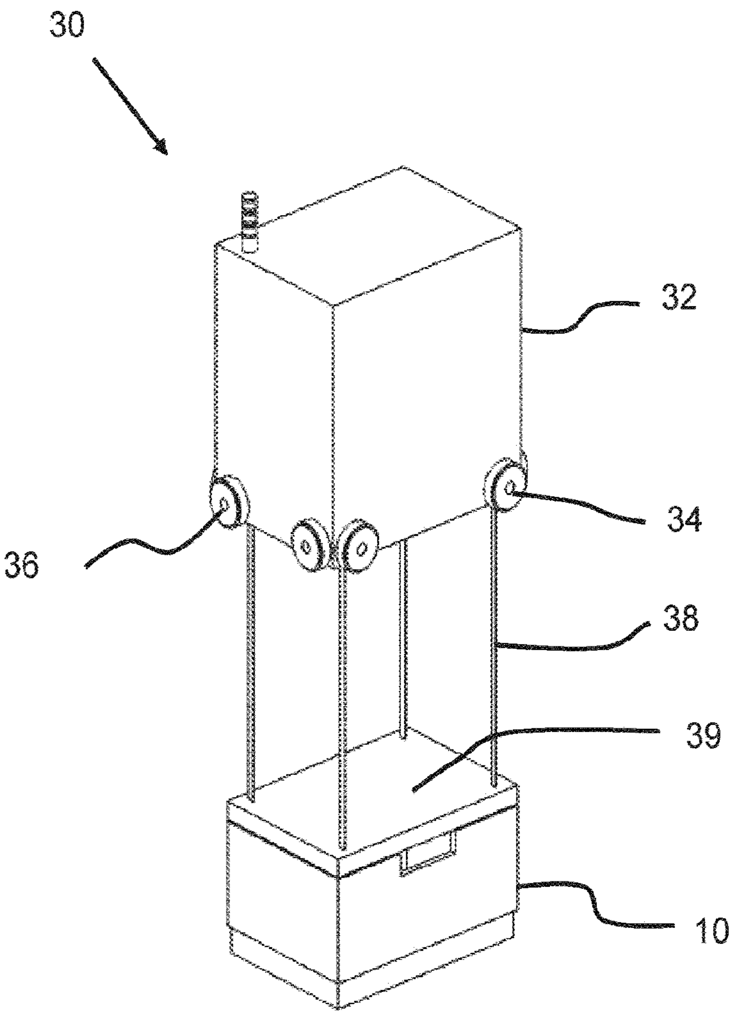
Figure 4 (PRIOR ART)
FIG. 4 is a schematic perspective view of the load handling device showing the lifting device gripping a container from above.
Figure 5:
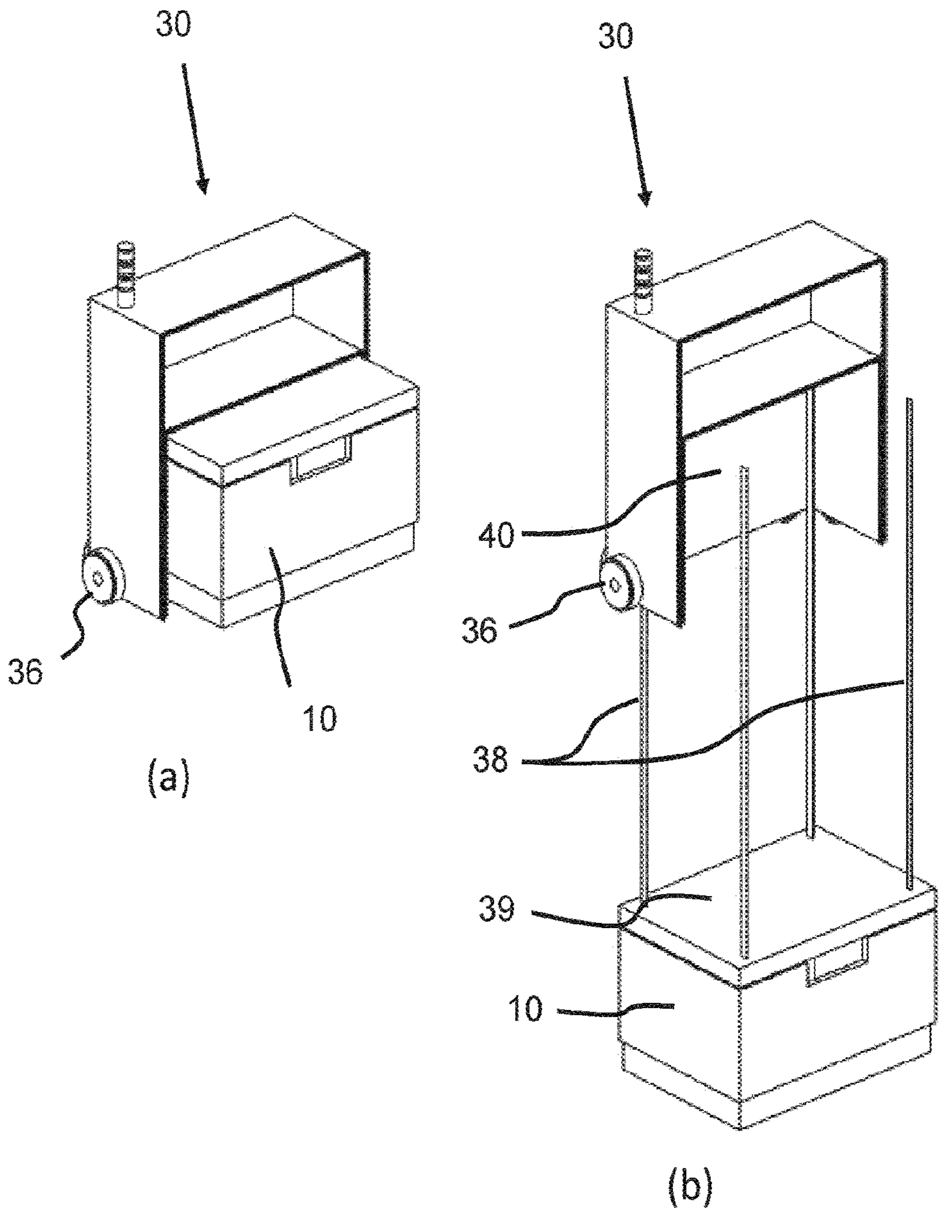
Figure 5 (PRIOR ART)
FIGS. 5(*a*) and 5(*b*) are schematic perspective cut away views of the load handling device of FIG. 4 showing (a) a container accommodated within the container receiving space of the load handling device and (b) the container receiving space of the load handling device.
Figure 6:
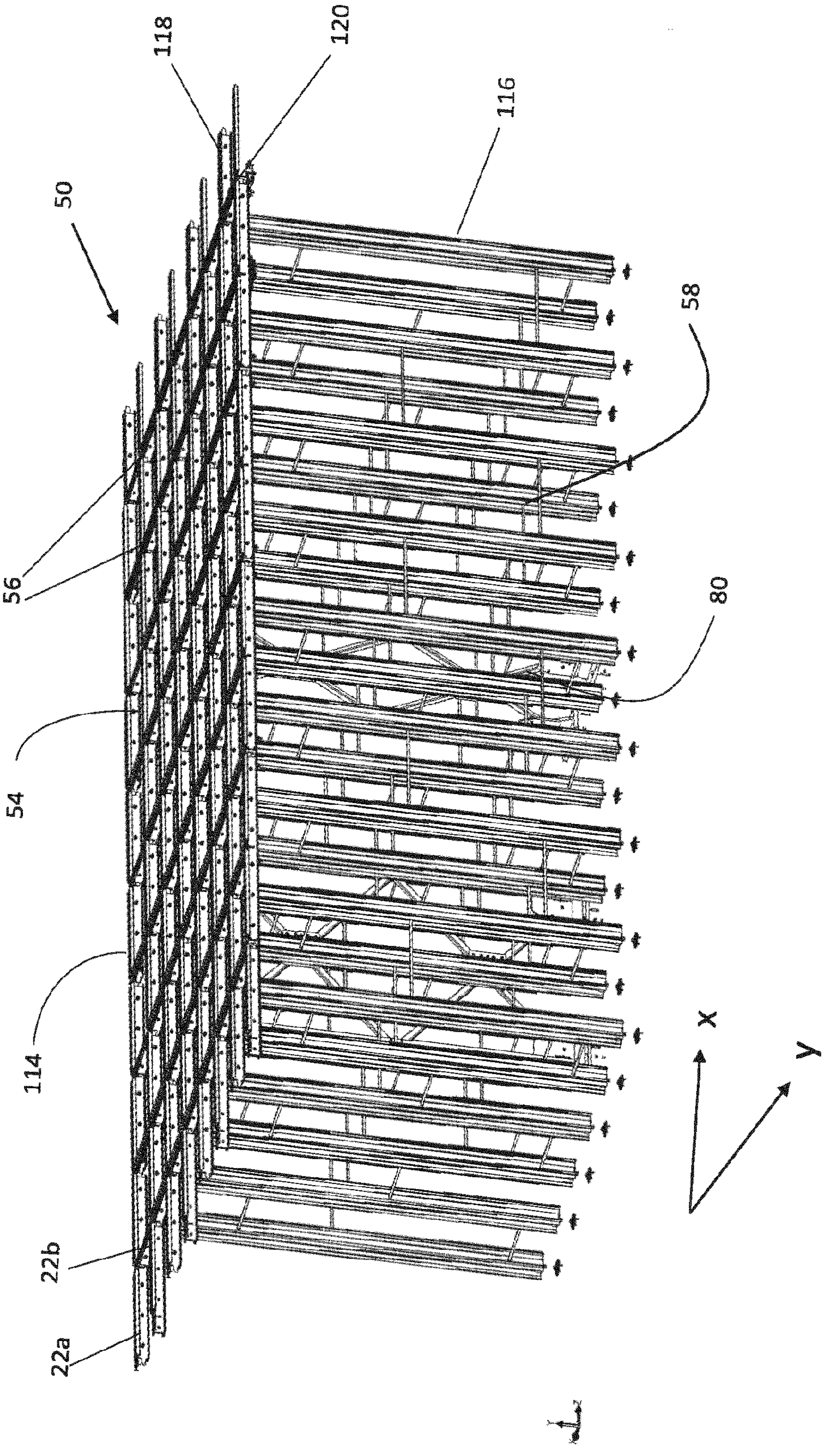
FIG. 6 is a perspective view of the grid framework structure according to an embodiment of the present invention.

FIG. 6 shows a perspective view of the grid framework structure 114 according to an embodiment of the present invention. The basic components of the grid framework structure 114 according to the present invention comprises a grid or grid structure 50 lying in a horizontal plane mounted to a plurality of upright columns or upright members 116. The term “upright member(s)” and “upright column(s)” are used interchangeably in the description to mean the same thing. As shown in FIG. 6, the grid 50 comprises a series of horizontal intersecting beams or grid members 118, 120 arranged to form a plurality of rectangular frames 54, more specifically a first a set of grid members 118 extend in a first direction x and a second set of grid members 120 extend in a second direction y, the second set of grid members 120 running transversely to the first set of grid members 118 in a substantially horizontal plane. Each of the grid members extending in the first direction and/or second direction can be sub-divided or sectioned into discrete grid element that are joined or linked together.

As an alternative to the grid framework structure 114 supporting the two-dimensional grid 50 directly on a plurality of upright columns 116 as described with reference to FIG. 6, in other examples the grid framework structure 114 supports the grid 50 on top of a plurality of prefabricated modular panels arranged in a grid pattern, the detail of which is described briefly below and fully in the PCT application, WO2022034195A1, in the name of Ocado Innovation Ltd, and incorporated herein by reference. This grid framework structure described in WO2022034195A1 addresses the problem of time and cost to assemble by supporting the 2D grid on a supporting framework structure comprising a plurality of prefabricated modular panels arranged in a three dimensional grid pattern to define a plurality of grid cells. Each of the grid cells of the supporting framework structure is sized to support two or more grid cells of the grid upon which the load handling devices operate. The grid framework structure is formed from fewer structural components yet still maintains the same structural integrity as the typical "stick-built" grid framework structure 114 described above, and is much faster and cheaper to build.

The prefabricated modular panels of the grid framework structure described above comprise upright columns 116. For example, a sub-group of the upright columns can be braced by one or more bracing members to form prefabricated panels or frames. For the purpose of the present invention, the plurality of upright columns 116 can also include the upright columns 116 in the prefabricated panels. The grid framework structure 114 can comprise any appropriate supporting framework structure to support the grid, including upright columns 116 directly supporting the grid, and/or prefabricated panels and/or frames incorporating upright columns 116.

Figure 7:
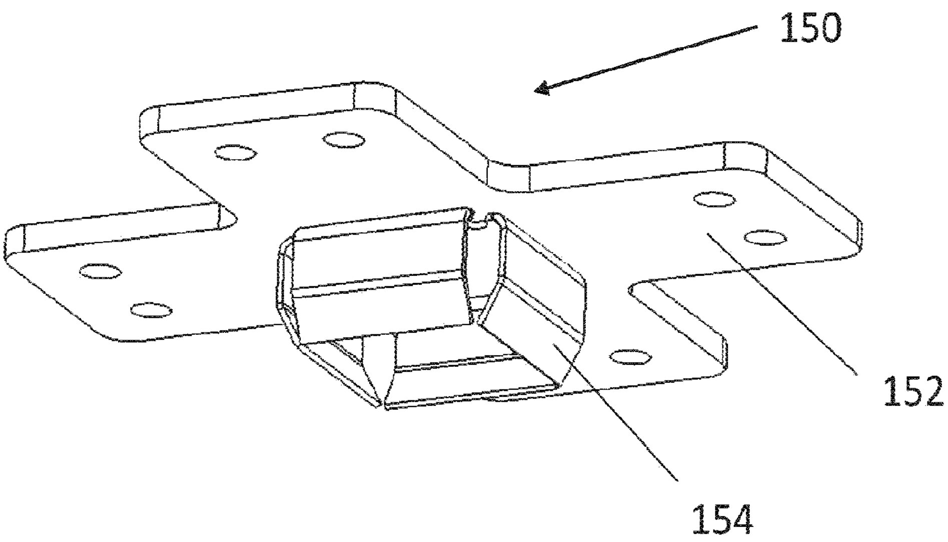
FIG. 7 is a perspective view of the cap plate for joining adjacent grid elements at the intersections according to an embodiment of the present invention.
Figure 9:
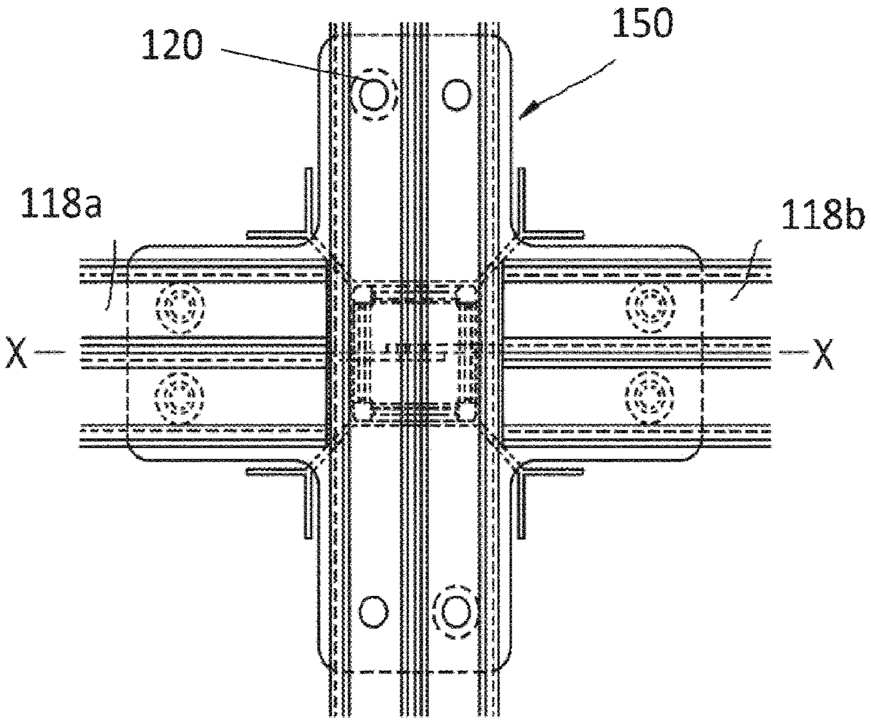
FIG. 9 is a perspective view of the cap plate linking adjacent grid elements at the intersections by connecting a centre section of a grid element and an end of an adjacent grid element according to the embodiment of the present invention.
Figure 10:
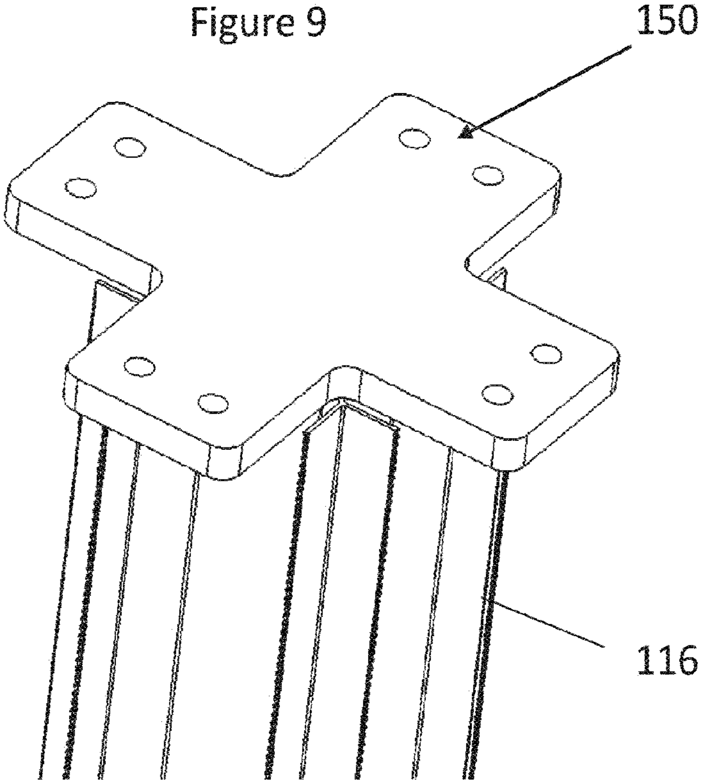
FIG. 10 is a perspective view of the cap plate fitted to an upright column for connecting adjacent grid elements together at the intersection where the grid elements cross according to an embodiment of the present invention.
Figure 13:
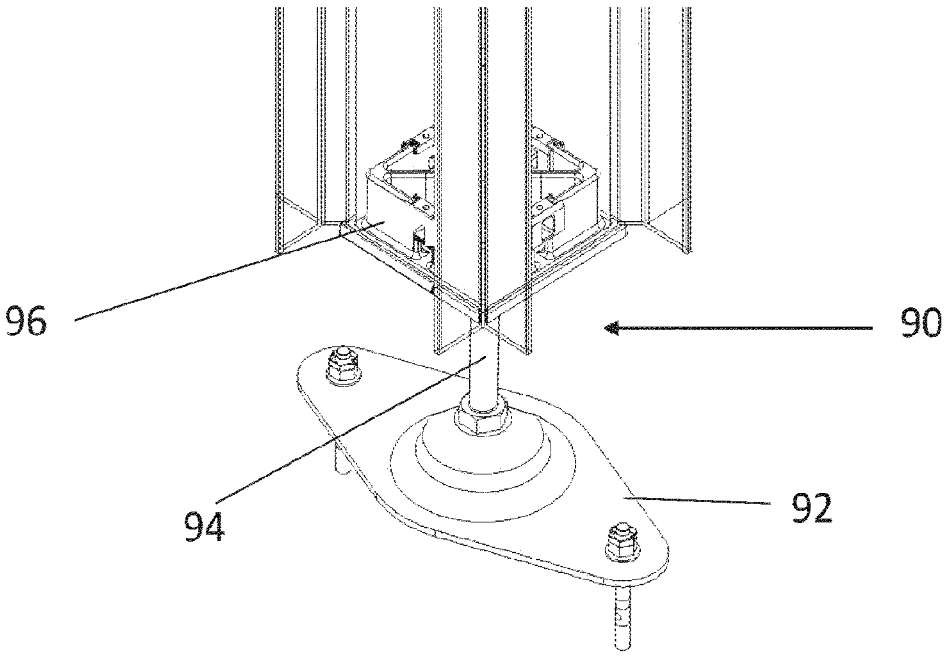
FIG. 13 is a perspective view of an adjustable foot according to an embodiment of the present invention.

A connection plate or cap plate 150 as shown in FIG. 7 can be used to link or join the individual grid elements together in both the first direction and the second direction at the junction where the grid elements cross or intersect at each of the upright columns, i.e. the cap plate 150 is used to connect the grid elements together to the upright columns 116. As a result, the upright columns are interconnected at their upper ends at the junction where the multiple grid elements cross in the grid structure by the cap plate 150. As shown in FIG. 7, the cap plate 150 is cross shaped having four connecting portions 152 for connecting to the ends or anywhere along the length of the grid elements at their intersections (see FIGS. 8 and 9). The cap plate 150 comprises a spigot or protrusion 154 that is sized to sit in a hollow central section 70 of the upright column 116 (at the second end of the upright column) in a tight fit for interconnecting the plurality of upright columns to the grid members as shown in FIG. 10. FIG. 13 shows the joints at the intersections between adjacent grid elements at an upper end of the upright columns by the one or more cap plates. For the purpose of explanation, a lower end of the upright column mounted to the floor constitutes a first end of the upright column and the upper end of the upright column adjacent the grid 50 constitutes a second end of the upright column.

The first and the second set of grid members supports a first and a second set of tracks or rails 22*a*, 22*b* respectively for a load handling device to move one or more containers on the grid framework structure. In some examples the tracks 22*a*, 22*b* may be integral with the grid members. In other examples, the tracks may be mounted on top of the grid members (also known as track supports). For the purpose of explanation of the present invention, the intersections 56 constitute nodes of the grid structure. Each of the rectangular frames 54 constitute a grid cell and are sized for a remotely operated load handling device or bot travelling on the grid framework structure to retrieve and lower one or more containers stacked between the upright columns 116. The grid 50 is raised above ground level by being mounted to the plurality of upright columns 116 at the intersections or nodes 56 where the grid members 118, 120 cross so as to form a plurality of vertical storage locations 58 for containers to be stacked between the upright columns 116 and be guided by the upright columns 116 in a vertical direction through the plurality of substantially rectangular frames 54. For the purpose of the present invention, a stack of containers can encompass a plurality of containers or one or more containers.

Figure 12:
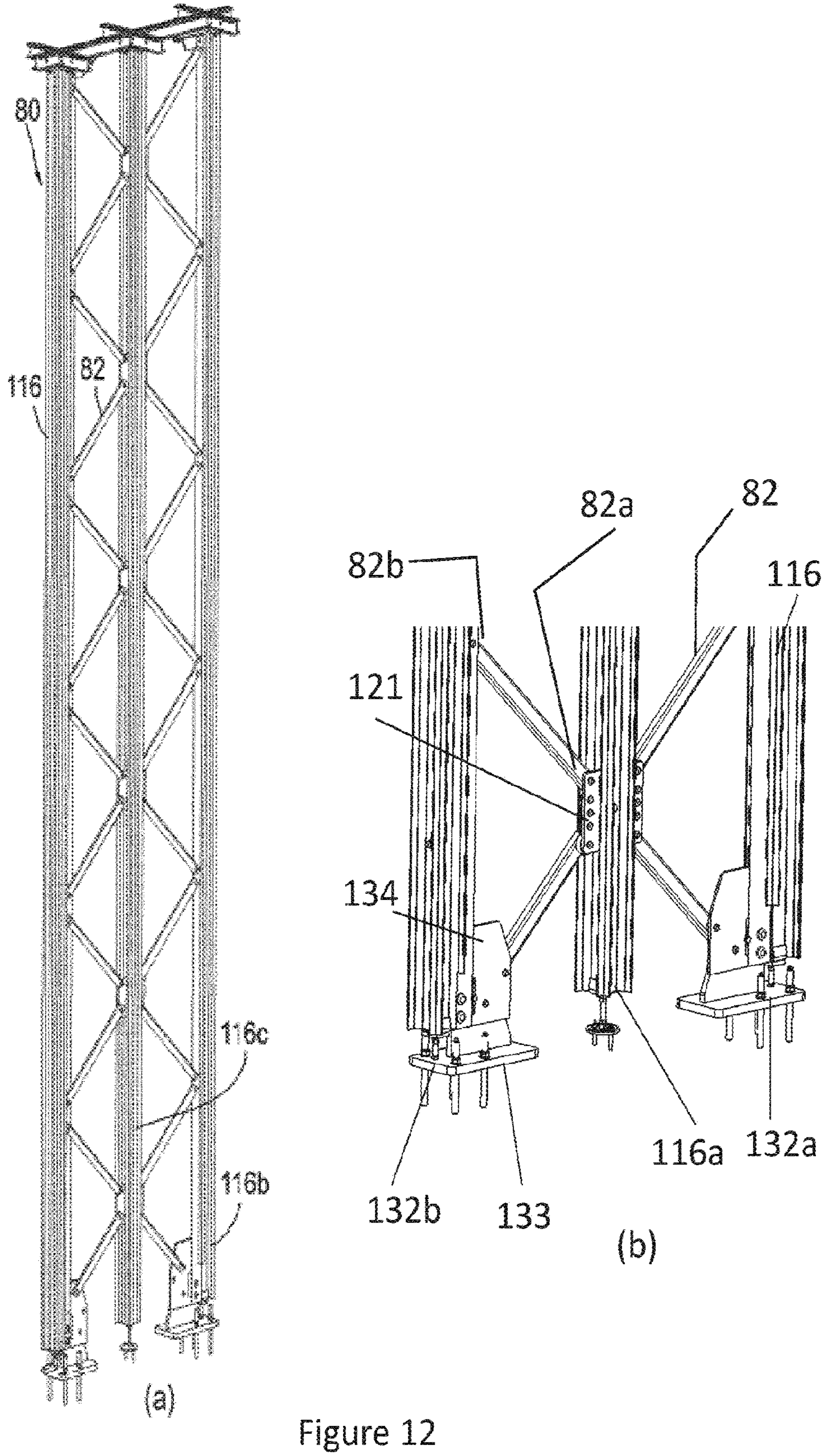
FIGS. 12(*a* and *b*) is a schematic view of a braced tower according to an embodiment of the present invention.

The grid framework structure 114 can be considered as a free standing (or self-supporting) rectilinear assemblage of upright columns 116 supporting the grid 50 formed from intersecting horizontal grid members 118, 120, i.e. a four wall shaped framework. Two or more of the upright columns are braced by at least one diagonal bracing member to provide one or more braced towers 80 within the grid framework structure 114. The structural rigidity and moment resistance of the grid framework structure is largely provided by incorporating one or more truss assemblies or braced towers 80 at least partially around the periphery and/or within the body of the grid framework structure (see FIG. 6). The truss assembly may have a triangular or other non-trapezoidal shape. For example, the truss assembly can be any type of truss that provides structural rigidity to the grid framework structure against lateral forces including but are not limited to Warren Truss or a K Truss or a Fink Truss or a Pratt Truss or a Gambrel Truss or a Howe Truss. Bolts or other suitable attachment means may be used to secure the diagonal braces to the upright columns. The braced tower 80 as shown in FIG. 12 according to an embodiment of the present invention can be formed by rigidly joining a sub-set or sub-group of the plurality of upright columns 116 by one or more angled or diagonal braces or diagonal bracing members 82. For the purpose of the present invention, the diagonal braces 82 cooperate with the upright columns 116 in a braced tower 80 to form one or more triangles. The sub-set of the plurality of upright columns that are braced together to form the braced tower 80 of the present invention can be two or more adjacent upright columns 116 lying in a same or in a single vertical plane and joined together by one or more diagonal braces 82. Putting it another way, two or more adjacent upright columns 116 connected by one or more diagonal braces 82 lie in the same or single vertical plane, i.e. they are co-planar. In the particular embodiment of the present invention shown in FIG. 12, each of the braced towers 80 comprise three upright columns in parallel relation and lie in a single vertical plane (co-planar) that are rigidly connected together by a plurality of diagonal braces 82. Two of the three upright columns 116*a*, 116*b* are laterally disposed either side of a middle upright column 116*c* and the two laterally disposed upright column 116*a*, 116*b* are rigidly connected to the middle upright column 116*c* by a plurality of diagonal braces 82. In the braced tower 80 of the present invention, one end of a diagonal bracing member 82 is connected to the middle upright column by a joining plate 121. The joining plate 121 is inserted into a slot through the hollow centre section of the middle upright column 116*c* in a direction perpendicular to the longitudinal direction of the upright column. By bracing one or more sub-groups of the upright columns 116 internally within the grid framework structure by one or more diagonal braces 82, the structural rigidity of the grid framework structure is improved. For the purpose of the present invention, the term "vertical upright column", "upright column" and "upright member" are used interchangeably through the description.

Figure 8:
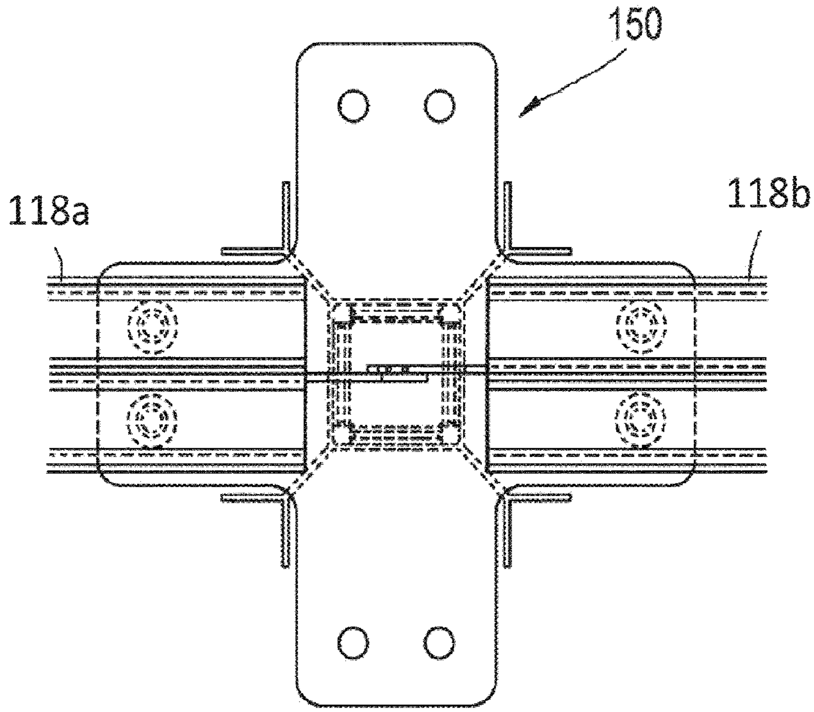
FIG. 8 is a perspective view of the cap plate linking adjacent grid elements by connecting the end of a grid element at the intersections according to an embodiment of the present invention.

The grid framework structure is anchored to the ground, in this case superstructure, by one or more anchor bolts. In an embodiment of the present invention, one or more of upright columns at their lower end are mounted to the superstructure by an adjustable foot (see FIG. 13). The adjustable foot allows the height of the one or more of upright columns and thus, the grid framework structure as a whole, to be adjusted. This allows the level of the grid in the horizontal plane to be substantially flat for the load handling devices, which are largely remotely operated, to travel on the grid structure and thereby, prevent any of the tracks or rails being put under strain due to a variation in the height of one or more of the upright members 116 in the grid framework structure. The adjustable foot 90 as shown in FIG. 13 comprises a base plate 92 and a threaded spindle or rod 94 that is threadingly engageable with a separate push fit cap or plug 96 that sits in the lower end of the upright column as shown in FIG. 8. As shown in FIG. 6, one or more of the upright columns 116 are mounted to the floor or superstructure by the base plate 92. The base plate 92 having one or more mounting holes for mounting the base plate 92 to the floor by one or more bolts.

In addition to mounting the upright columns making up the grid framework structure by the adjustable foot discussed above, one or more of the upright columns making up the braced towers 80 are anchored to the superstructure by one or more anchor feet 132*a*, 132*b* (see FIG. 12). In the particular embodiment shown in FIG. 12, the outer upright columns 116*a*, 116*b* or the laterally disposed upright columns 116*a*, 116*b* are anchored to the concrete foundation by one or more anchor feet 132 and the middle upright column 116*c* is supported on the adjustable foot 90 as discussed above. The lower end (first end) of the braced tower is anchored to the concrete foundation by one or more anchor bolts. Various types of anchor feet 132*a*, 132*b* to rigidly anchor the braced tower to the concrete foundation is applicable in the present invention. The anchor foot functions to bear the upright column load and the bracing load of the bracing assembly 82 of the braced tower 80.

Figure 14:
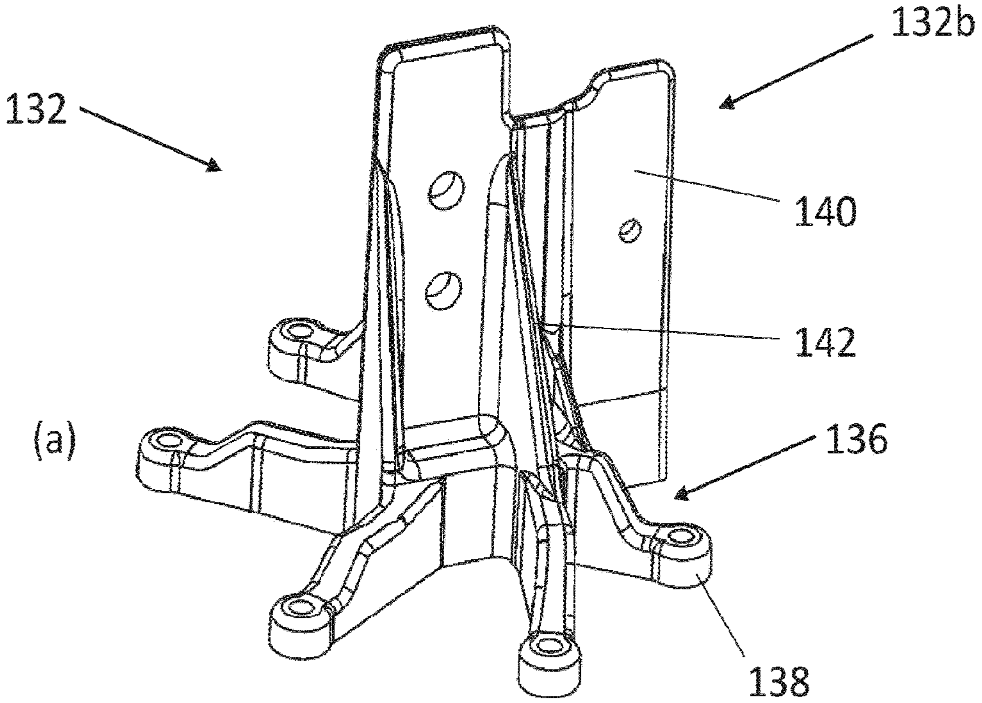
FIG. 14 is (a) a side view and (b) a top view of an anchor foot according to a second embodiment of the present invention.
Figure 14:
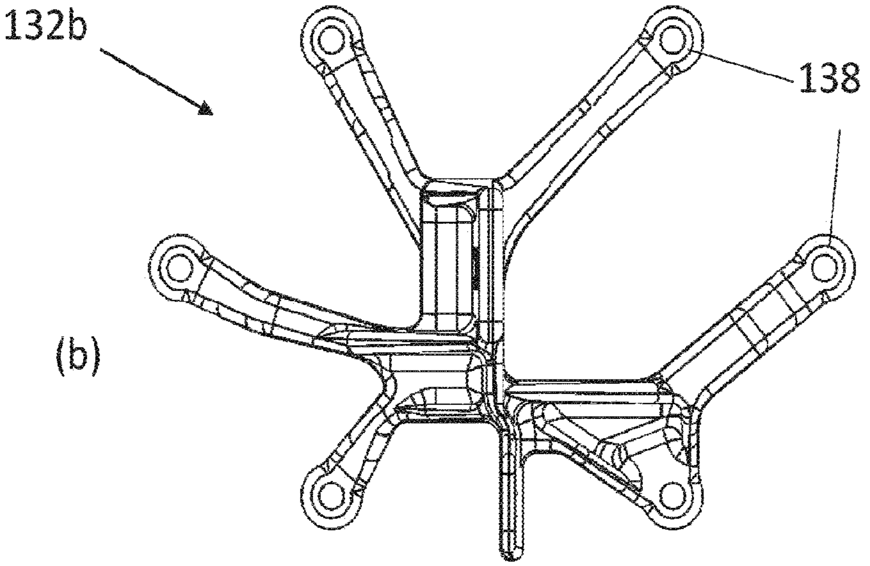

FIGS. 12 and 14 show two examples of the anchor foot that is used to anchor the braced tower to the concrete foundation according to the present invention. In comparison to the anchor foot shown in FIG. 14, the anchor foot shown in FIG. 12 is more substantial in terms of size and weight in comparison to the anchor foot shown in FIG. 14. The anchor foot 132*a* shown in FIG. 12 is fabricated as a T-joint comprising a base plate 133 lying in a horizontal plane for anchoring to the floor by one or more anchor bolts and an anchor plate 134 perpendicular to the base plate 133 for attaching to the lower end of the upright column and the ends of the bracing member 82. The anchor plate 134 is orientated such that the surface of the anchor plate 134 with the greatest surface area lies in the same vertical plane as the three upright columns 116*a*, 116*b*, 116*c* of the braced tower 80, e.g. the surface of the anchor plate 134 with the greatest surface area and the upright members 116*a*, 116*b*, 116*c* of the braced tower 80 are co-planar. The problem with the anchor foot 132*a* shown in FIG. 12 is the substantial weight and thus, cost to fabricate the anchor foot.

FIG. 14 shows an alternative anchor foot 132*b* for anchoring the braced tower 80 to the concrete foundation according to second embodiment of the present invention. Instead of a solid rectangular base plate 133, the anchor foot is topology optimised that optimizes the materials layout within a given design space for a given set of loads. Two loads considered in the topology optimisation of the anchor foot are the loads from the upright columns 116*a*, 116*b*, 116*c* and the bracing members 82.

Based on the constraints given by the applied loads, the anchor foot 132*b* of the present invention comprises a stabiliser 136 comprising a plurality of discrete fingers or digits 138 extending from an upright portion 140 such that loads are distributed amongst the plurality of fingers 138, e.g. separate fingers. In the particular embodiment of the present invention shown in FIG. 14, the upright portion 140 comprises an anchor plate arranged to rigidly connect to the upright column 116*a*, 116*b* and the diagonal brace 82 by one or more bolts so as to bear the load of the upright column 116*a*, 116*b* and the applied load of the diagonal brace 82. Like the anchor plate 134 of the first embodiment of the present invention shown in FIG. 12, the anchor plate 140 is oriented such that the surface of the anchor plate 140 with the greatest surface area lies in the same vertical plate as the three upright columns 116*a*, 116*b*, 116*c* making up the braced tower 80 of the present invention (see FIG. 7). Using the terminology of the present invention, the upright columns 116*a*, 116*b*, 116*c*, the diagonal braces 82 and the surface of the anchor plate 134, 140 all lie in the same plane, i.e. they are co-planar.

One or more of the discrete fingers 138 of the anchor foot 132*b* extend or span out in two or more different directions from the upright portion 140 so as to provide improved stability of the anchor foot 132*b*. One or more of the fingers 138 are of different lengths to aid with the stability of the anchor foot 132*b* of the present invention. The length of the fingers 138 can be different so provide different levels of stability of the braced tower 80. One or more connecting webs 142 are used to support the one or more of the fingers 138 from axial movement. The anchor foot 132*b* is anchored to the concrete foundation by one or more bolts through holes in the fingers 138 of the anchor foot 132*b*.

In the particular embodiment of the present invention, five fingers 138 of varying length are shown (see FIG. 14*b*) that extend from the upright portion 140 with holes at the distal ends of the fingers 138 for anchoring the anchor foot to the ground via an anchor bolt. The anchor foot 132*b* according to the second embodiment of the present invention can be formed as a single body, e.g. casting, or separate parts joined together, e.g. welding.

Seismic Framework Restraint System

While the current grid framework structure 114 is adequate where the ground is relatively stable, i.e. having a spectral acceleration less than 0.33 g categorised as Type A and Type B events, this cannot be said where the grid framework structure is subjected to powerful seismic events generating strong lateral forces in excess of 0.55 g spectral acceleration categorised as a Type C or D seismic event. Such powerful seismic events compromise the structural fasteners joining the grid elements (e.g. track support elements) at the intersections, causing them to work their way loose or out of the cap plates to which they are bolted to. The result is the weakening or complete loss of structural integrity of the grid framework as the lateral forces no longer are able to be transferred safely down to the structural foundations. Failure may occur at the intersections of the grid members or track support elements making up the grid. The bracing towers 80 described above used to maintain the structural integrity of the grid framework structure may not able to withstand the lateral forces as a result of powerful Type D seismic events well in excess of 0.55 g.

One way of mitigating the above problem is to support the grid framework structure by an exoskeleton, as described in WO2021175873 (Ocado), the contents being herein incorporated by reference. The exoskeleton provides an additional level of support to the grid framework structure from seismic event. More specifically, the exoskeleton comprises a plurality of vertical frame columns 218 braced by at least one bracing member, said grid being further supported by the exoskeleton to form a seismic force restraint system (SFRS).

Figure 15:
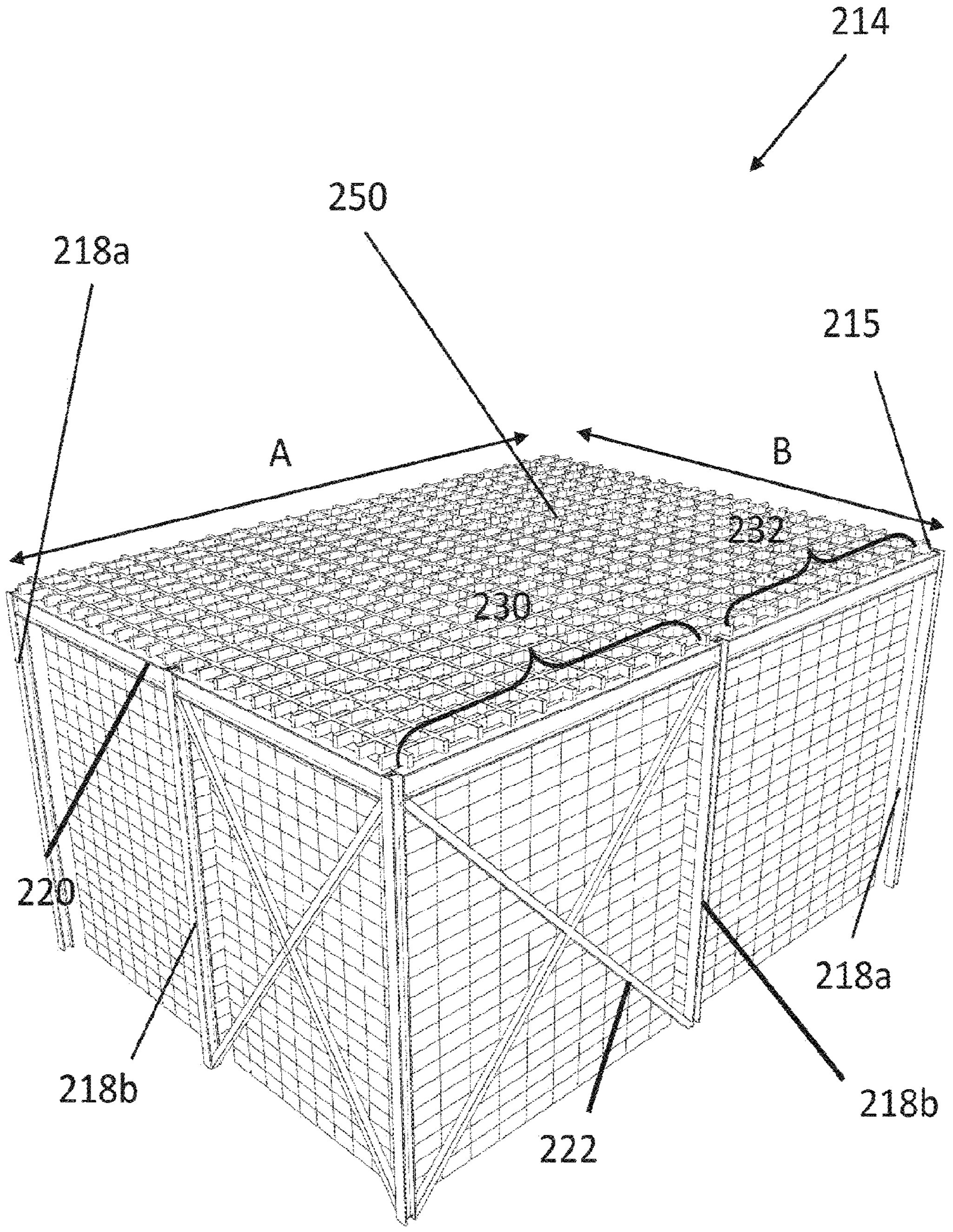
FIG. 15 is a perspective view of a seismic grid framework structure according to a first embodiment of the present invention.

The present invention as shown in FIG. 15 provides a seismic restraint grid framework structure 214 comprising a structural restraint system otherwise known as a seismic force restraint system (SFRS) to maintain the structural integrity of the grid framework structure of the present invention during powerful seismic and storm events, i.e. the SFRS supports the grid framework structure of the present invention against strong lateral forces as a result of Type C and/or D seismic events. The restraint system of the present invention reduces or eliminates structural fastener failure such as the joints securing the grid elements to the upright columns via the cap plates at the intersections through breakage, loosening, detachment or rupture through structural components. The SFRS of the present invention comprises a perimeter bracing structure 215 supported by a plurality of vertical frame columns 218 for supporting the grid against lateral forces. The perimeter bracing structure 215 comprises at least one bracing member 220, 222 extending from the plurality of vertical frame columns 218. For the purpose of the present invention, the term "support" is construed to cover any form of mechanical connection between the SFRS and the grid. For example, lateral forces generated at the grid level are transferred at the periphery of the grid 250 to the SFRS of the present invention. Additionally, for the purpose of the present invention, the at least one bracing member 220, 222 can be at least one horizontal frame beam between the vertical frame columns 218 and/or at least one diagonal bracing member 222 between the vertical frame columns 218. For the purpose of the present invention, the term "vertical frame column" and "vertical support frame column" are used interchangeably in the description to represent the columns 218 supporting the bracing members 220, 222. A vertical frame column 218 is different to the vertical upright columns 116 supporting the grid discussed above and are spaced apart by one or more spacers 74. The vertical frame column 218 forms part of the SFRS together with the perimeter bracing structure of the present invention. The SFRS can be envisaged to form an exoskeleton around the grid framework structure.

The SFRS can be imagined to form an exoskeleton around the grid framework structure of the present invention. In the particular embodiment of the present invention, the perimeter bracing structure 215 is supported by at least one vertical frame column 218*a* at the corners of the grid framework structure and braced by at least one horizontal frame beam 220 extending from the corners of the grid framework structure. In the particular embodiment of the present invention as shown in FIG. 15, four vertical frame supporting columns 218*a* are arranged at four corners of the grid framework structure to form a 3 dimensional exoskeleton, e.g. cuboid structure, having a top face and four side faces. As the SFRS forms an exoskeleton around the periphery of the grid framework structure of the present invention, the vertical frame support columns 218*a* at the corners of the grid framework structure can be termed perimeter frame columns for ease of explanation of the SFRS of the present invention. In the particular embodiment of the present invention, four horizontal frame beams 220 are mounted to the top of each of the four perimeter frame columns 218*a* so as to extend from each corner of the SFRS frame. The horizontal frame beams 220 can envisaged to represent the top chords that connects two vertical frames columns 218*a* at their top ends of the perimeter bracing structure 215 and can be termed a perimeter frame beam.

At least two of the vertical frame columns 218*a*, 218*b* are joined together by at least one diagonal bracing member 222 to form a braced frame to provide lateral support for the grid framework structure in the front and/or the back direction. The braced frame is a structural system which is designed to resist earthquake forces. The diagonal bracing members 222 are designed to work in tension and compression, similar to a truss and are designed to resist lateral loads in the form of axial stresses, by either tension or compression. A braced frame can be arranged around the periphery of the grid framework structure or at least one face of the grid framework structure and designed to absorb the bulk of the lateral forces experienced by the grid framework structure.

Any type of braced frame commonly known in the art to provide lateral support to the grid and/or grid framework structure is applicable in the present invention. In FIG. 15 the braced frame is a cross-brace where two diagonal braces 222 cross each other to form an X. The braced frame can also be a K-brace where two diagonal braces meet at a peak on the horizontal frame beam. Bracing at least two of the vertical frame columns 218*a*, 218*b* at the top of the vertical frame columns 218*a*, 218*b* by at least one horizontal frame beam 220 forms at least one drag strut or collector commonly known in the art. A drag strut or collector is where the at least two vertical frame columns 218*a*, 218*b* are braced by the horizontal frame beams 220 at the top of the two vertical frame columns 218*a*, 218*b* and functions to collect and transfer diaphragm shear forces to the vertical frame columns.

Each of the plurality of vertical frame columns 218*a*, 218*b* can be solid supports of C-shape or U shape cross section, double C or double U. Preferably, each of the plurality of vertical frame columns 218*a*, 218*b* are solid supports of I-shape comprising upper and lower beam flanges. At least two of the vertical frame columns 218*a*, 218*b* are rigidly joined together by the at least one bracing member 220, e.g. a diagonal bracing member 222 and/or a horizontal frame beam. Each of the at least two of the vertical frame columns 218*a*, 218*b* has a top end and a bottom end; the bottom end is anchored to a concrete foundation using one or more anchor bolts. Various methods commonly known in the art to anchor the bottom end of the vertical frame columns to the concrete foundation to provide lateral support to the braced frame against powerful seismic event is applicable in the present invention.

Multiple braced frames of the SFRS can be disposed around the periphery of the grid framework structure (i.e. around each face of the grid framework structure) to form a unitary frame body as shown in FIG. 15, i.e. the SFRS forms an exoskeleton supporting the grid framework structure against strong lateral forces as a result of Type C or Type D seismic events. Alternatively, at least one braced frame can be disposed to at least one face of the grid framework structure. The braced frame of the present invention can be disposed to at least one of the four side faces of the cuboid. In the particular embodiment shown in FIG. 15, a braced frame is disposed at each of the four side faces of the cuboid. The perimeter frame columns 218*a* at the corners of the grid framework structure are braced by at least one horizontal frame beam 220, 320 extending longitudinally from the top of each of the four perimeter frame columns 218*a* to form a substantially rectangular or square perimeter frame in the horizontal plane surrounding the periphery of the grid.

At least one 218*b* of the plurality of vertical frame columns 218*a*, 218*b* can be disposed intermediate of or between two vertical frame columns 218*a* at the corners of the grid framework structure so as to divide the exoskeleton into a braced frame where at least two vertical frame columns 218*a*, 218*b* are braced by at least one diagonal brace 222 and a drag strut or collector 232. A drag strut or collector 232 is where the at least two vertical frame columns 218*a*, 218*b* are braced by the horizontal frame beams 220 at the top of the two vertical frame columns 218*a*, 218*b* and functions to collect and transfer diaphragm shear forces to the vertical frame columns 218*a*, 218*b*. In the particular embodiment of the present invention shown in FIG. 15, the SFRS 215 comprises a braced frame where at least two of the plurality of vertical frame columns 218*a*, 218*b* are braced by at least one diagonal brace 222 and a horizontal frame beam 220 to form a drag strut. Also shown in FIG. 15, the at least one diagonal bracing member 222 is disposed to one side of the intermediate vertical support column 218*b* to form the braced frame 230 and the drag strut 232 is disposed to the other side of the braced frame. Bracing between the vertical frame columns at the corner of the SFRS and the intermediate vertical support column by at least one diagonal bracing member at each face of the SFRS around the grid framework structure is dependent on the nature of the seismic event, i.e. whether it is a Type C or Type D seismic event. For a more robust restraint system to cater for Type D seismic events, a braced frame comprising at least one diagonal brace according to the present invention is disposed around the periphery of the grid framework structure.

Modular Grid Framework Structure

In some examples, the seismic grid framework structure 214 can be modularised such that adjacent modules 514 of a grid framework structure in an assembly of two or more modules or modular frames share at least a portion of the SFRS 215 of one or more neighbouring modular frames. Each of the modules 514 comprises a seismic grid framework structure discussed above with reference to FIG. 15 such that each of the modules 514 comprise a predetermined number of grid cells and the perimeter bracing structure 215 supported by a plurality of vertical frame columns 218*a,b* of the present invention further supporting the grid. An assembly of two or modules can be assembled together to increase the storage capacity of the overall seismic grid framework structure wherein adjacent modules in the assembly share at least a portion of the perimeter bracing structure of the present invention, i.e. a first modular frame shares at least a portion of the perimeter bracing structure of a second modular frame, whereby the first modular frame is adjacent the second modular frame. In other words, adjacent modules share a common bracing member 220, 222 supported by at least two vertical frame columns 218*a*. The bracing member includes but is not limited to the horizontal frame beam 220 and/or the diagonal bracing member 222.

Figure 22:
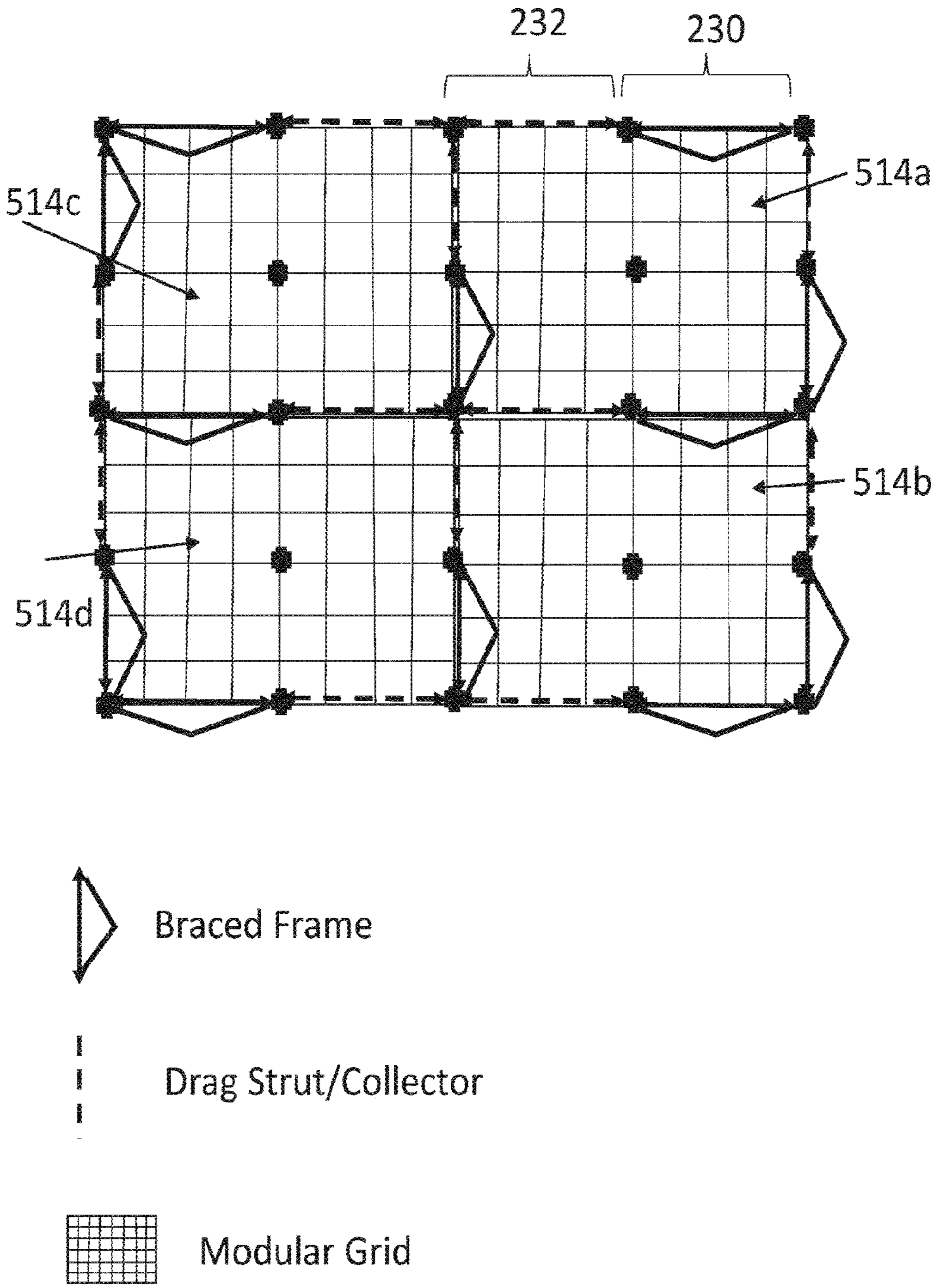
FIG. 22 is a top plan view showing modularity of a grid framework structure.

Sharing of the at least a portion of the SFRS by adjacent modules can be envisaged in the top plan view shown in FIG. 22. Four modular grids are shown in FIG. 22 sharing portions of the SFRS of adjacent modular grids. In FIG. 22, a common braced frame 230 of the SFRS shown as a triangular drawing is shared between adjacent modular grids 514(*a* to *d*). Also the drag strut 232 shown as a dashed line in FIG. 22 is shared between adjacent modules 514(*a* to *d*) such that adjacent modules share a common drag strut 232. As adjacent modules share at least a portion of the SFRS between adjacent modules, the grid from adjacent modules are connected to a common horizontal frame beam 220 such that lateral forces generated within the grid of adjacent modules are transferred to the common horizontal frame beam 220. Since the grid is supported at the borders of the grid in a manner that a portion of the grid overhangs from the SFRS, the grids from adjacent modules can be joined together by connecting the overhangs from adjacent modules.

Also shared between adjacent modules are the vertical frame columns 218*a*, 218*b* supporting the at least one bracing member 220, 222. By sharing portions of the SFRS between adjacent modules, the external bracing structures of adjacent modules 514 work together in tandem as a unitary body to deflect lateral forces. Putting it another way, joining grids 50 from adjacent modules by a common bracing member 220, 222, e.g. horizontal frame beam, the multiple adjacent grids 50 can function together to form at least one Vierendeel truss such that lateral forces are transferred across the multiple grids to the vertical frame columns 218*a*, 218*b* at the periphery of the modules. The perimeter bracing structure 215 shared between adjacent modules 514 also provide internal bracing within the assemblage of the modules 514. The internal bracing includes adjacent modules sharing a common braced frame 230 and/or a common drag strut 232.

Figure 23:
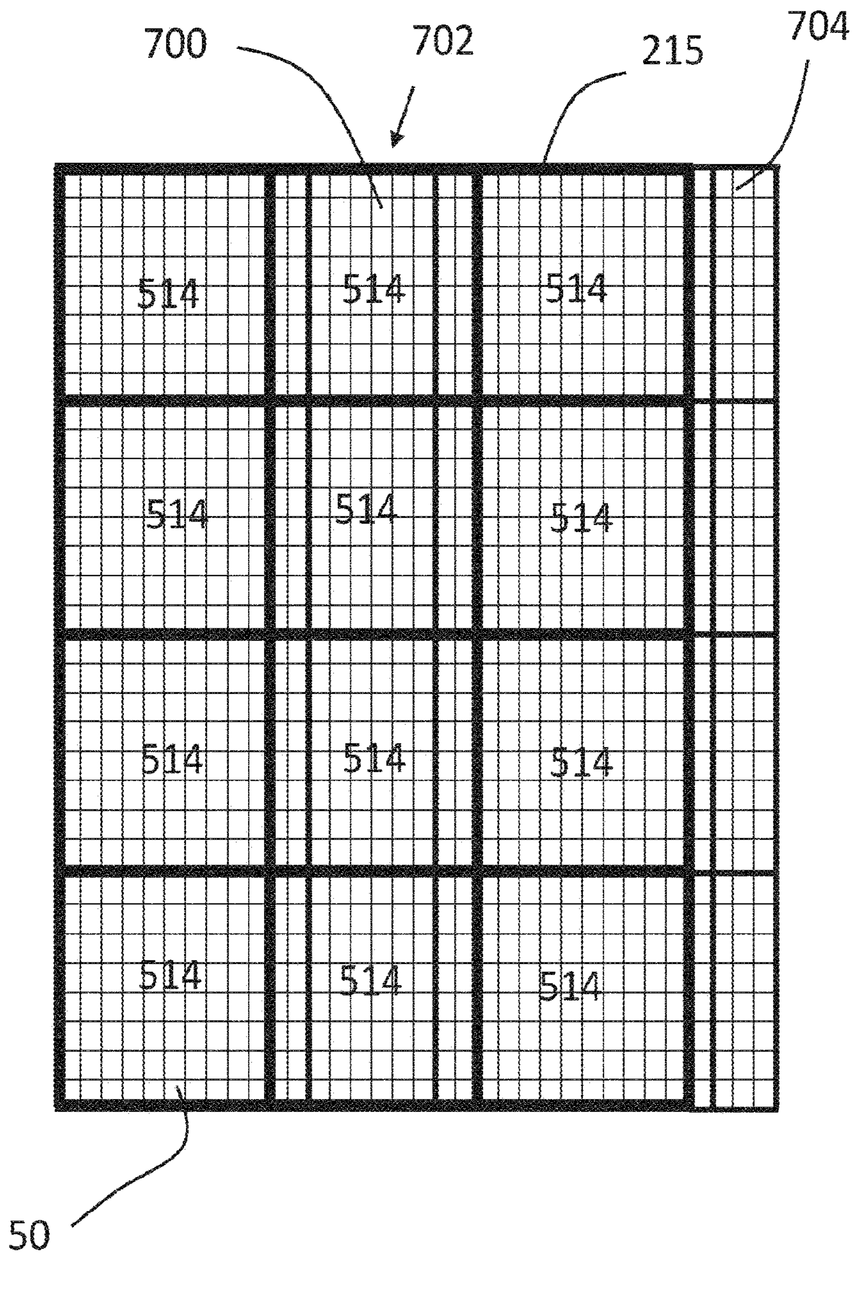
FIG. 23 is a schematic top view of a modular grid structure with pick aisle and mezzanine.

The seismic grid framework structure of the present invention allows a mezzanine 702 to be integrated into the perimeter bracing structure 215 and the vertical frame columns 218 of the present invention. The ability to modularise the seismic grid framework structure discussed above allows the mezzanine 702 to share at least a portion of the SFRS of adjacent modules, i.e. share a common braced frame 230 and/or drag strut 232 with adjacent or neighbouring modules. A cross sectional view of an assembly of modules 514 incorporating a mezzanine 702 integrated within the assembly is shown in FIG. 23. As can be seen in FIG. 23, the mezzanine 702 shares the perimeter bracing structure 215 and vertical frame columns 218 of adjacent modules 514 such that the mezzanine 702 is supported by vertical frame columns 218*a, b* supporting adjacent modules 514. Adjacent modules 514 can be a grid framework structure storing one or more containers or storage bins in a stack. In comparison to standalone mezzanines used in prior art storage systems, the mezzanine of the seismic grid framework structure is integrated within the SFRS so that separate vertical support columns to support the mezzanine are not necessary.

To create the mezzanine, vertical frame columns 218*a, b* supporting the grid frame structure of adjacent or laterally disposed modules 514 are connected together by one or more bracing members, e.g. horizontal frame beams to create a mezzanine floor and one or more diagonal bracing members 222. The vertical support (frame) columns supporting the mezzanine floor can be braced to provide more support to the mezzanine structure as shown in FIG. 23. The combination of the SFRS incorporating the grid framework structure and the mezzanine provide a single framework surrounding the assembly. The SFRS is versatile in that the perimeter frame structure 215 is flexible to integrate various other structures to the SFRS simply by linking the perimeter frame structures and vertical frame columns of adjacent modules together using one or more bracing members, e.g. horizontal frame beams, thereby integrating additional perimeter frame structures to support a grid and/or an integrated mezzanine. A top plan view of an assembly of modules, each comprising the seismic grid framework structures either side of a mezzanine structure 700 to accommodate a station is shown in FIG. 23. As can be seen in FIG. 23, the mezzanine 700 is integrated into the SFRS 215 either side of the mezzanine 700 such that the SFRSs of individual modules or modular frames 514 are shared to provide an integrated SFRS encompassing the modules and the mezzanine.

In the particular arrangement illustrated in FIG. 23, twelve modules 514 are arranged in a 3×4 grid. The bold lines indicate the edges of the modules, where bracing members (e.g. horizontal frame beams or diagonal bracing members) support the grid 50. The bold line around the outside of the structure indicates the perimeter frame structure 215. The grid structure 50 extends continuously across the top of all of the modules 514 so that load handling devices 30 can move across the grid 50 from one module 514 to another.

The grid framework structure is divided into two parts, and a mezzanine 700 extends over a pick aisle 702 between the two parts. The pick aisle 702 can accommodate pick stations or other service areas underneath the grid 50. The perimeter bracing structure 215 extends around the modules 514, the pick aisle 702, and the mezzanine 700. A further mezzanine 704 extends to the side, in order to provide a maintenance area where load handling devices can be deinducted from the grid in order to perform routine maintenance activities or repairs. The mezzanine 704 also provides more space underneath the grid 50 for storage or service areas.

Seismic Detection System Hardware

Figure 16:
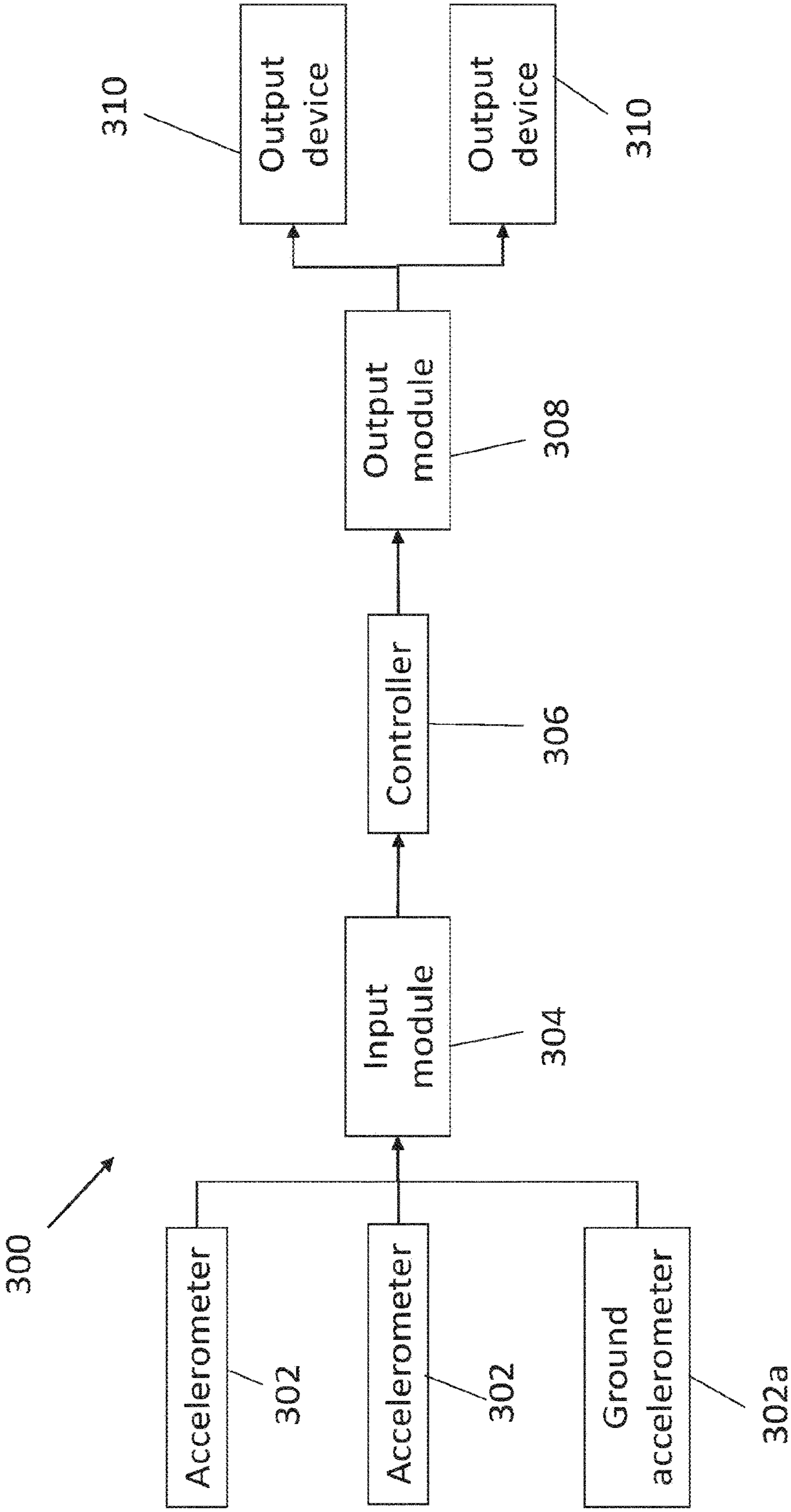
FIG. 16 is a schematic diagram of the main hardware components of a seismic detection system.

In an exemplary embodiment, such as that illustrated in FIG. 16, the seismic detection system 300 comprises one or more accelerometers 302 mounted on the grid framework structure 114. The one or more accelerometers 302 may be located at or near the top of the grid framework structure 114. A further one or more accelerometers 302*a* may be located on the ground, so as to provide a point of reference and allow differential acceleration to be measured of the top of the grid framework structure 114 relative to the ground. Accelerometers 302 may be located around the periphery of the grid framework structure and/or within the grid framework structure.

In examples where the grid framework structure 114 comprises an SFRS or perimeter bracing structure 215 as in the example illustrated in FIG. 15, accelerometers 302 may be mounted either on the horizontal grid members 118, 120 or on components of the SFRS, for example on the horizontal 220 or diagonal 222 bracing members. Accelerometers 302, 302*a* may specially designed for the purpose, or may be off-the-shelf components.

In examples where the grid framework structure is modular and comprises an assembly of modular frames 514 as described above with reference to FIGS. 22 and 23, accelerometers 302 may be mounted either on the horizontal grid members 118, 120 or on components of the SFRS, for example on the horizontal 220 or diagonal 222 bracing members. Accelerometers 302 may be mounted on the parts of the SFRS that are shared between adjacent modules 514, for example at the intersections of horizontal bracing members or horizontal frame beams 220 at the corners of the modules 514, or mid-span on the horizontal frame beams. The seismic detection system 300 further comprises an input module 304 configured to receive input from the one or more accelerometers 302. In some examples the input module 304 may also be configured to supply/provide power to the one or more accelerometers 302.

The seismic detection system 300 further comprises a controller 306 communicatively coupled to the input module for processing data acquired from the one or more accelerometers 302. The controller 306 may be described as a cDAQ (compact data acquisition), and again may be either specially designed for the purpose or an off-the-shelf component. The controller 306 may be provided with a mains power supply.

The seismic detection system 300 further comprises an output module 308 coupled to one or more output devices 310. The output module is communicatively coupled to the controller 306 and configured to receive a signal from the controller 306 indicative of a seismic event. The output module 308 may be a relay output module. In some examples, multiple relays can trigger based on different criteria. Output devices 310 can include alarms, beacons, sirens, graphical user interface displays, or any other suitable output device. The controller 306 may be located in a maintenance area located adjacent to or near to the grid framework structure. The accelerometers 302 may be connected to the controller 306 wirelessly or via cables (in which case, a junction box may be used). The signal processing and data analysis is carried out by the controller 306.

FIG. 16 is a simple schematic illustration of the main hardware components of the seismic detection system 300. As shown in the figure, data from accelerometers 302 and a ground accelerometer 302*a* is collected by an input module 304 and delivered to a controller 306. The controller 306 then processes the data, and sends a signal via an output module 308 to output devices 310. In some examples, data from the accelerometers (raw data and/or post-processed data from the controller) may be stored in a database, either stored locally in the maintenance area or in the cloud.

In some examples, further processing of the data can take place after the event to confirm that a seismic event has occurred, and/or to perform further calculations.

Figure 21:
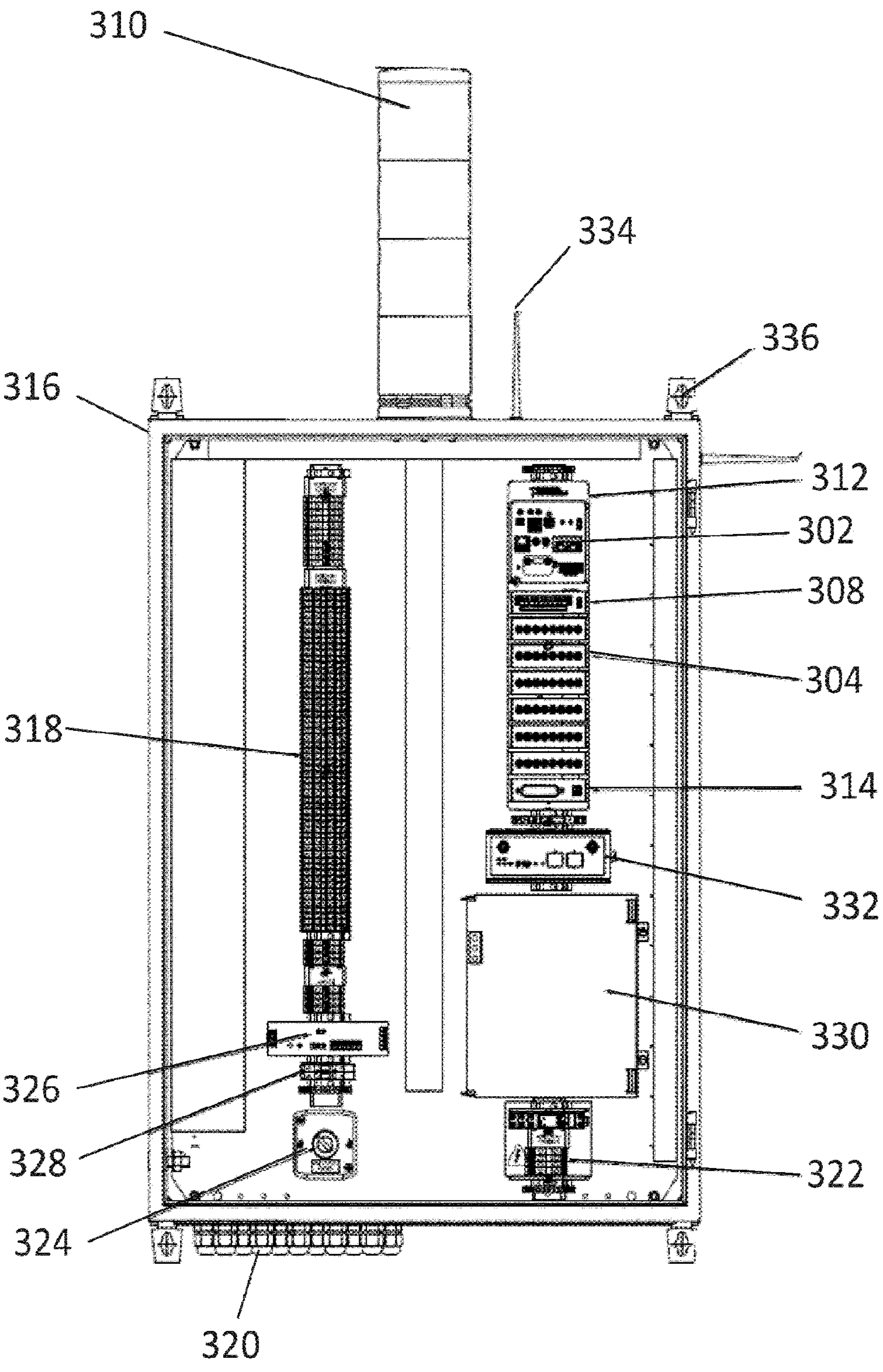
FIG. 21 is a schematic diagram of the controller and other components of a seismic detection system according to an embodiment of the invention.

FIG. 21 illustrates an exemplary embodiment of the controller 306 with its input and output modules 304, 308. In this embodiment, the controller is an N 9133 cDAQ (compact data acquisition). The cDAQ chassis 312 houses the controller 306, and provides eight slots into which input or output modules can be inserted. In this example, six of the slots are occupied by input modules 304 (NI-9231) for receiving data from the accelerometers 302, one slot is occupied by an output module 308 (NI-9482 relay output module), and one slot is occupied by a digital input/output module 314 (NI-9401). In this system the digital input/output module 314 can be used as a digital output to drive the output device 310, and also to receive fault alarms from auxiliary equipment. The cDAQ is enclosed within an outer casing 316, which also houses other components, as described below.

The input modules 304 are connected to input terminals 318, which in turn are connected to connection points 320 on the outside of the outer casing 316. The connection points 320 connect cables from the accelerometers 302 on the grid framework structure and also from the ground accelerometer 302*a* located on the ground.

The output module 308 is connected to relay output terminals 322, which in turn are connected to an output device 310 (in this case, a beacon with three different colours, and a buzzer). When a seismic event is detected, the beacon can light up to give a visual display and the buzzer can sound to give an audible warning. Different colours can be used to represent the severity of the seismic event (e.g. red for the most severe events, yellow for less sever events, and green for no event detected). After a seismic event, the output device 310 can be reset using an alarm reset key switch 324.

A UPS (uninterruptible power supply) 326 and a UPS battery 330 are provided, which connect to the controller 306 via power input terminals 328. The UPS ensures that the seismic detection system can still operate if mains power is cut off. A UPS is generally used to provide emergency power to a load when the input power source or mains power fails, and will provide near-instantaneous protection from input power interruptions.

A wireless router 332 is provided to transmit data from the controller. Wireless antennae 334 are provided on the outside of the outer casing 316. The data from the controller may be transmitted to a computer stored locally (for example, in the maintenance area) or to the cloud, as described above.

The outer casing 316 is provided with mounting points 336, for mounting the outer casing to a wall or other structure.

Figure 17:
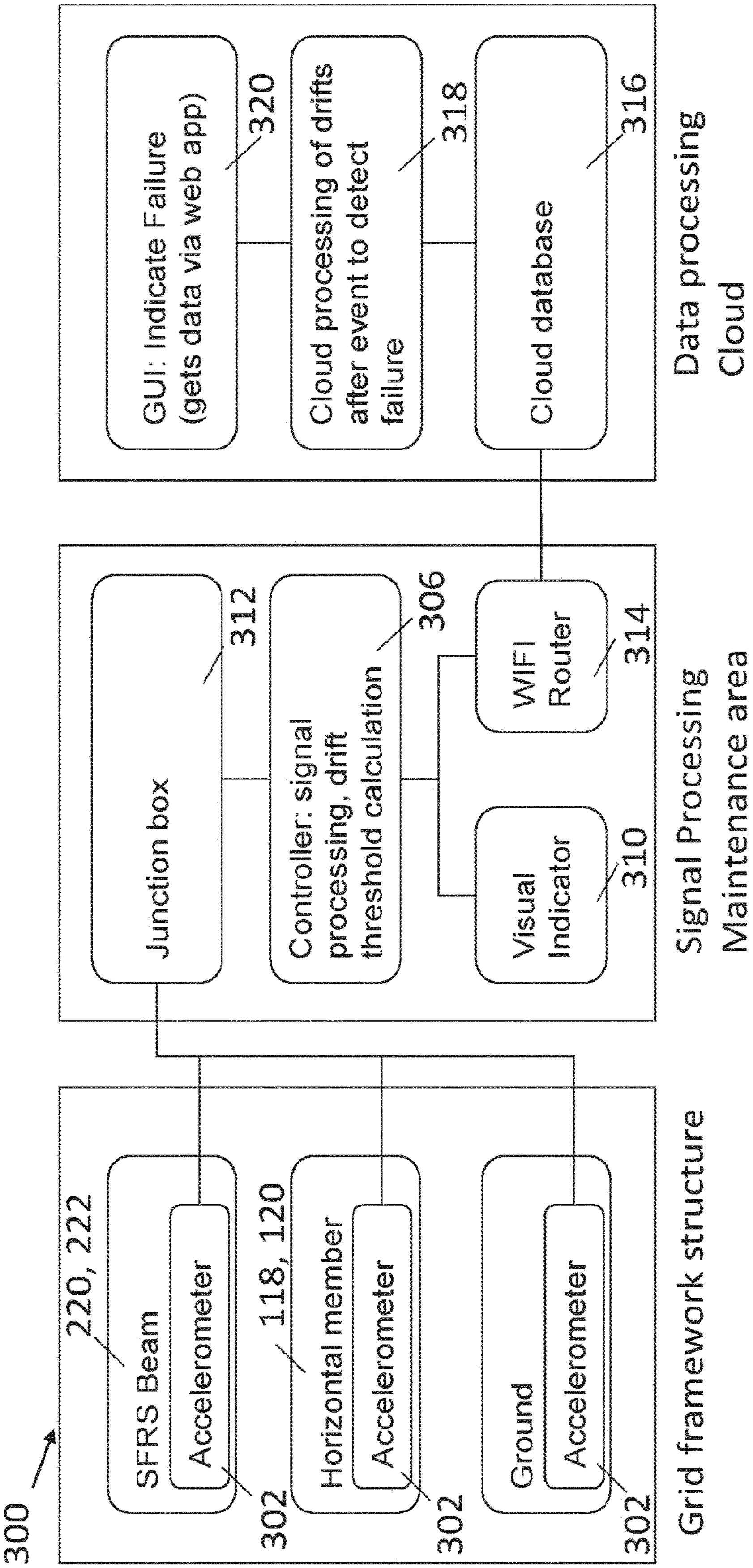
FIG. 17 illustrates a possible arrangement of the seismic detection system architecture, where post-event data processing takes place in the cloud.

FIG. 17 illustrates one possible arrangement of the system architecture, where post-event data processing takes place in the cloud. In this example, accelerometers 302 are located on the SFRS beams or bracing members 220, 222, on the horizontal members 118, 120 of the grid framework structure. A further accelerometer 302*b* is located on the ground. Inputs from all of the accelerometers are directed by a junction box 312 to the controller 306. The controller processes the data from the accelerometers, and a visual indicator (an example of an output device 310) indicates whether a seismic event has been detected. Data from the controller (which could be raw or processed data from the accelerometers) is directed to a wifi router 314, then transmitted to a cloud database 316. Further processing of the data can happen in the cloud via a cloud processor 318, and a graphic user interface 320 can display a visual indicator of failure and/or more detailed data, using data from the cloud processor obtained via a web app. The advantage of data processing on the cloud is that the data can be viewed from anywhere, onsite or offsite, in order to monitor the status of the grid framework structure and to further understand the impact of any seismic events.

In some examples, the controller 306 of the seismic detection system can be integrated into other control systems for the grid framework structure 114.

The one or more output devices 310 can be used by personnel to check the status of the grid framework structure, and determine whether it is structurally safe to access after an event. Visual and audible indicators can be used to communicate the status and to let personnel know whether it is safe to access the grid. For example, visual indicators may indicate a status of red, amber, or green. A red status means that the grid framework structure is unsafe and the building needs to be evacuated; amber status means that the grid framework structure is safe for personnel to enter but needs to be inspected and repaired or realigned before load handling devices can operate on the grid; and green status means that the grid framework structure is safe to continue operating.

In some cases, spectral acceleration thresholds may be used to determine whether the status is red, amber, or green. For example, if the measured acceleration has exceeded a predetermined spectral acceleration threshold, the status of the grid framework structure may be classified as "red". In some cases there may be more than one predetermined spectral acceleration threshold; for example if a lower spectral acceleration threshold is exceeded the status could be defined as "amber", and if an upper spectral acceleration threshold is exceeded the status could be defined as "red".

The one or more output devices 310 may be remote i.e. not located inside the building where the grid framework structure is housed, so that personnel can check the status remotely in case they are unable to access the building.

After a seismic event, the one or more output devices may be reset (e.g. alarms turned off) so that they do not continue to operate after investigation and/or remedial action.

Positioning of Accelerometers on Grid

Figure 18:
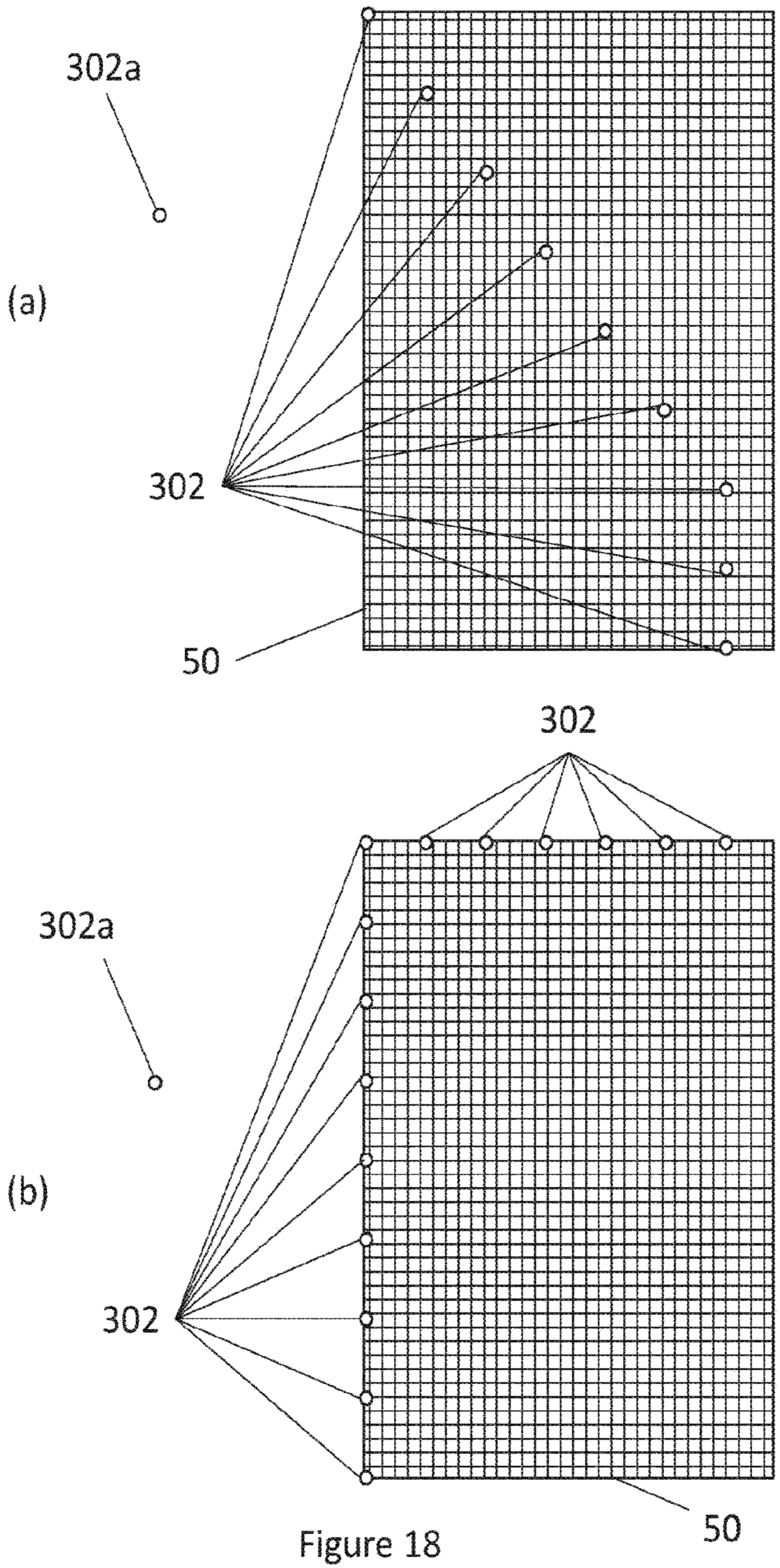
FIGS. 18(*a* and *b*) is a schematic top view of a grid structure showing two different options for the locations of accelerometers on the grid structure.

FIG. 18 illustrates two possible arrangements of accelerometer locations on the grid structure 50. In FIG. 18(*a*), a major portion of the accelerometers 302 are arranged in a diagonal line across the centre of the grid structure 50. In FIG. 18(*b*) the accelerometers 302 are arranged along the periphery of the grid structure 50, along two of the four edges. In both cases, an additional accelerometer 302*a* is positioned on the ground in order to measure the differential acceleration of the accelerometers on the grid structure relative to the ground. Of course, these are only illustrative examples, and any suitable arrangement of accelerometers 302 on the periphery of the grid structure and/or within the grid structure can be used.

In examples where the grid framework structure comprises an SFRS or external bracing structure, it may be advantageous to place accelerometers on structural members of the bracing structure, since these members are expected to buckle first in a seismic event. In the grid framework structure illustrated in FIG. 15, for example, accelerometers could be placed on the horizontal frame beams 220 or the diagonal bracing members 222 of the perimeter bracing framework.

The accelerometers 302 may be located at or near the top of the grid framework structure. This enables the displacement of the grid to be measured relative to displacement on the ground, and gives an indication of yield at the top of the structure.

The accelerometer 302*a* located on the ground can be attached to a concrete foundation or slab upon which the grid framework structure is built, or alternatively the accelerometer 302*a* can be directly placed on top of the soil (for example, located inside a hole in the concrete foundation slab).

A recent study (see https://www.nature.com/articles/s41598-018-37716-y) found that the record of asymmetric vertical accelerations observed during a magnitude 6.3 earthquake could be explained by a "flapping effect", i.e. the local, elastic bouncing of a foundation slab on which the sensor was installed. The results suggest that the extremely large accelerations recorded did not reflect the actual ground shaking, but were caused by a local, system response around the sensor. This finding has important implications for both the evaluation of seismic hazard and the installation methodology of accelerometers in all earthquake prone countries. A simulation model consisting of the foundation slab and an irregular contact surface between the slab and underlying soil successfully explained both the mainshock and aftershock records. The elastic bouncing of the slab (the "flapping effect" is induced by vertical motion through a system with variation in the horizontal direction, e.g., the foundation slab sitting on an irregular surface. Rather than representing the actual shaking of the ground, the measurements are at least partially a local system response around the sensor.

An irregular contact surface allows local elastic bouncing of the concrete slab during earthquake ground shaking. Such an irregular contact surface, which would have been created by differential settlement of the soil or soil erosion over time, was confirmed by site investigation; some minor gaps (<1 cm) between the concrete slab and soil ground were found.

To prevent similar soil-slab interactions in a grid framework structure, the foundation slab can be firmly attached to the soil ground, for example using piles or anchors. Alternatively or additionally, slab properties (thickness, stiffness) may be designed to minimize the effect of elastic bouncing.

Alternatively or additionally, the ground accelerometer 302*a* may be placed directly onto soil ground, for example through a hole or gap in the foundation slab. The term "located on the ground" in this specification should be interpreted to cover both the situation where the accelerometer 302*a* is secured to the foundation slab, and the situation where the accelerometer is located directly on the soil ground.

Further examples of possible arrangements of accelerometer locations are illustrated in FIGS. 24 to 28, applied to the modular seismic grid framework structure described earlier and illustrated in FIG. 23.

Figure 24:
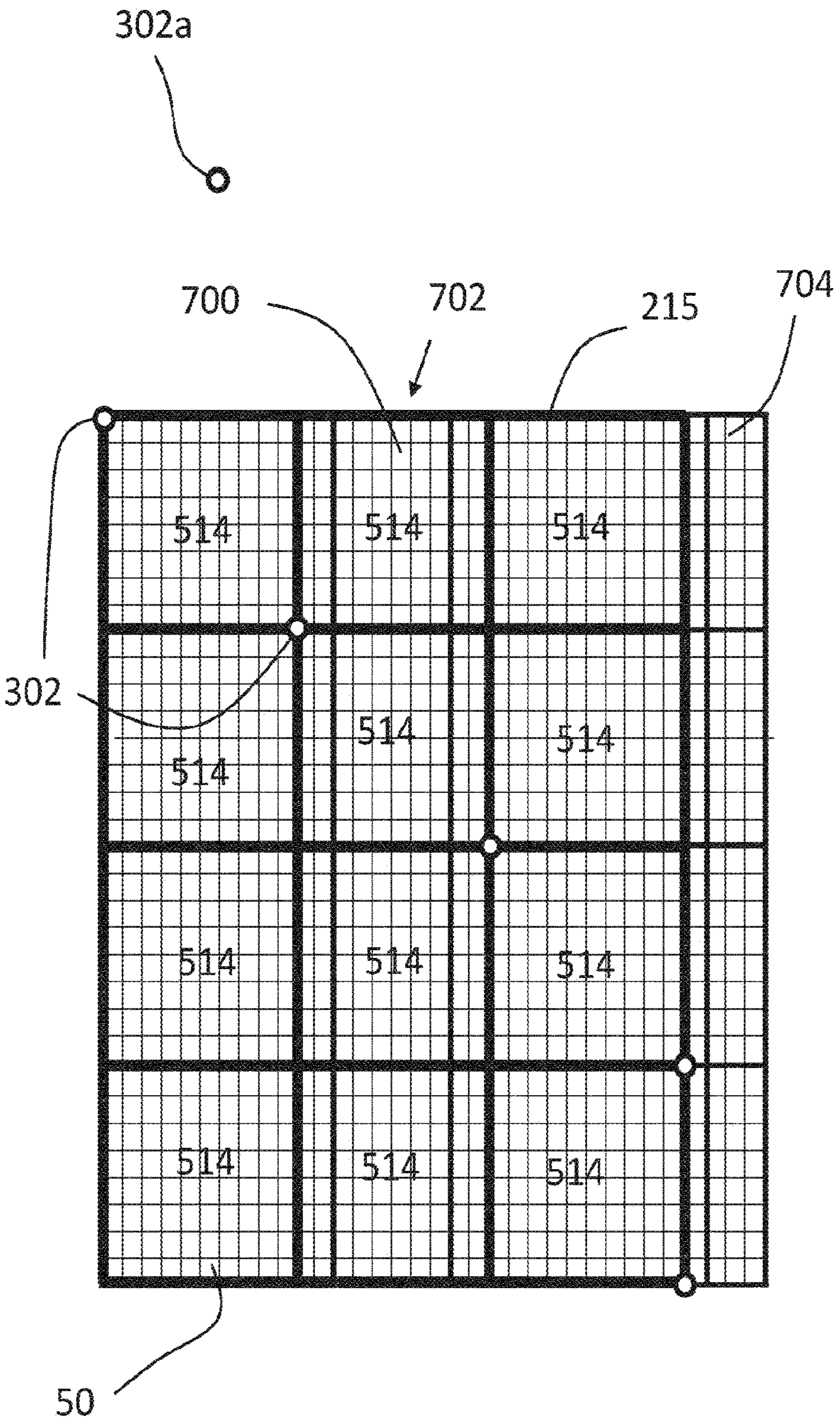
FIG. 24 is a schematic top view of the grid structure of FIG. 23, showing an arrangement of accelerometers in a diagonal line on the grid structure.

In the arrangement illustrated in FIG. 24, five accelerometers 302 are located on the grid framework structure. As in FIG. 18, an additional accelerometer 302*a* is positioned on the ground in order to measure the differential acceleration of the accelerometers on the grid structure relative to the ground. The accelerometers 302 are located at the intersection points of the modules 514. In the example shown the accelerometers are mounted on the bracing structure, which could be on the vertical frame columns or horizontal frame beams or diagonal bracing members. Four of the accelerometers are arranged in a diagonal line, with the fifth being in line with the fourth.

Figure 25:
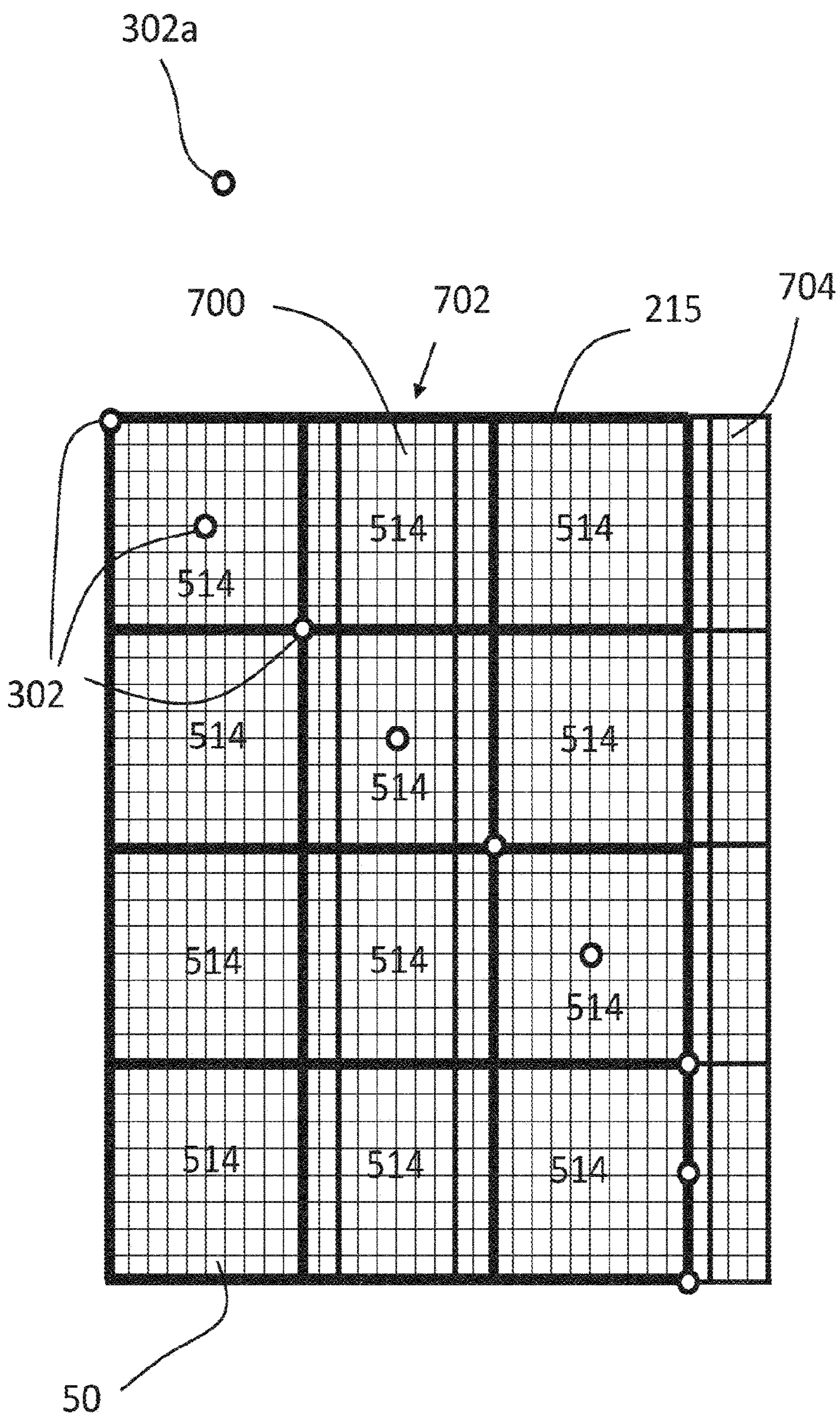
FIG. 25 is a schematic top view of the grid structure of FIG. 23, showing an arrangement of accelerometers in a diagonal line on the grid structure.

In the arrangement illustrated in FIG. 25, nine accelerometers 302 are located on the grid framework structure, as well as the ground accelerometer 302*a*. Five of the accelerometers are in the same positions as in the example illustrated in FIG. 24. The four additional accelerometers are placed in between the five accelerometers of FIG. 24, positioned in the centres of modules 514 rather than at the intersections. The accelerometers may be mounted on the horizontal grid members (track supports). Again, the majority of the accelerometers extend in a diagonal line across the grid.

Figure 26:
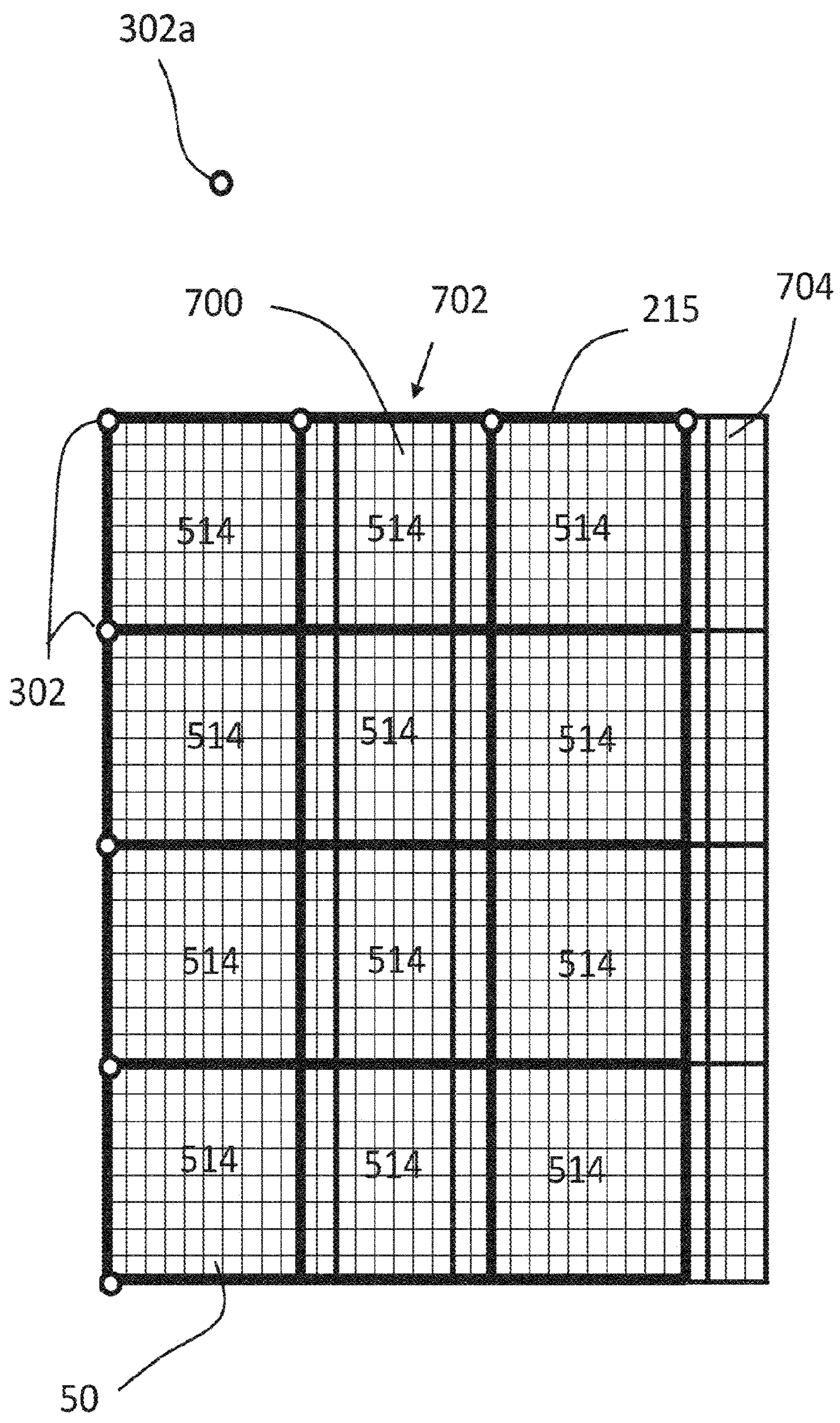
FIG. 26 is a schematic top view of the grid structure of FIG. 23, showing an arrangement of accelerometers on two sides of the grid structure.

In the arrangement illustrated in FIG. 26, eight accelerometers 302 are located on the grid framework structure, as well as the ground accelerometer 302*a*. The accelerometers are arranged along two edges of the grid framework structure. One line of accelerometers extends in the first direction (X-direction), and a second line of accelerometers extends in the second direction (Y-direction). As in the example illustrated in FIG. 24, the accelerometers 302 are located at the intersection points of the modules 514 and mounted on the bracing structure.

Figure 27:
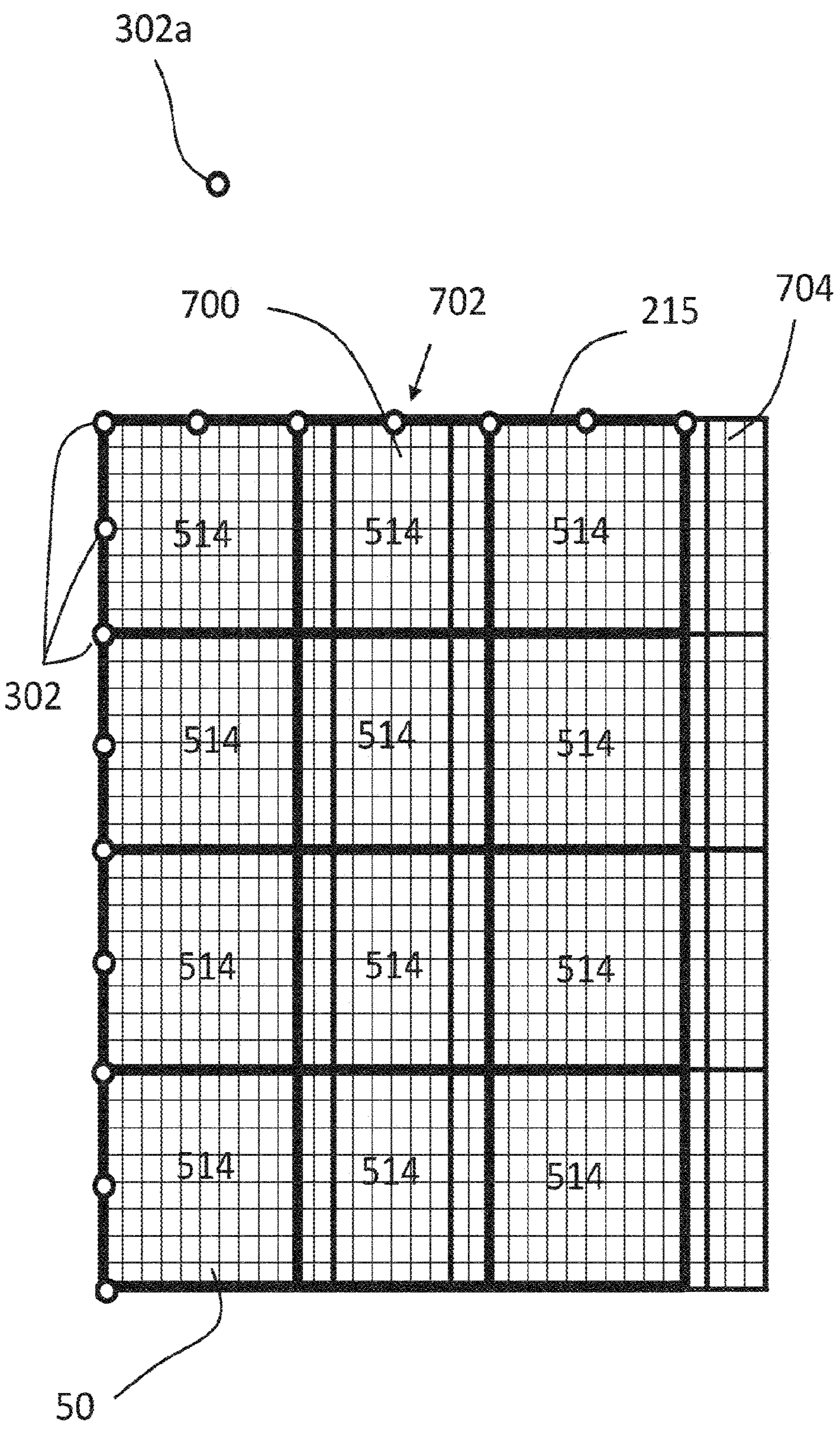
FIG. 27 is a schematic top view of the grid structure of FIG. 23, showing an arrangement of accelerometers on two sides of the grid structure.

In the arrangement illustrated in FIG. 27, fifteen accelerometers 302 are located on the grid framework structure, as well as the ground accelerometer 302*a*. Eight of the accelerometers 302 are in the same positions as in FIG. 26. The additional seven accelerometers are positioned in between the eight accelerometers of FIG. 26, positioned halfway along the edges of the modules 514 rather than at the intersections. Again, one line of accelerometers extends in the first direction (X-direction), and a second line of accelerometers extends in the second direction (Y-direction). As with FIG. 26, the accelerometers are arranged along two sides of the grid framework structure.

Figure 28:
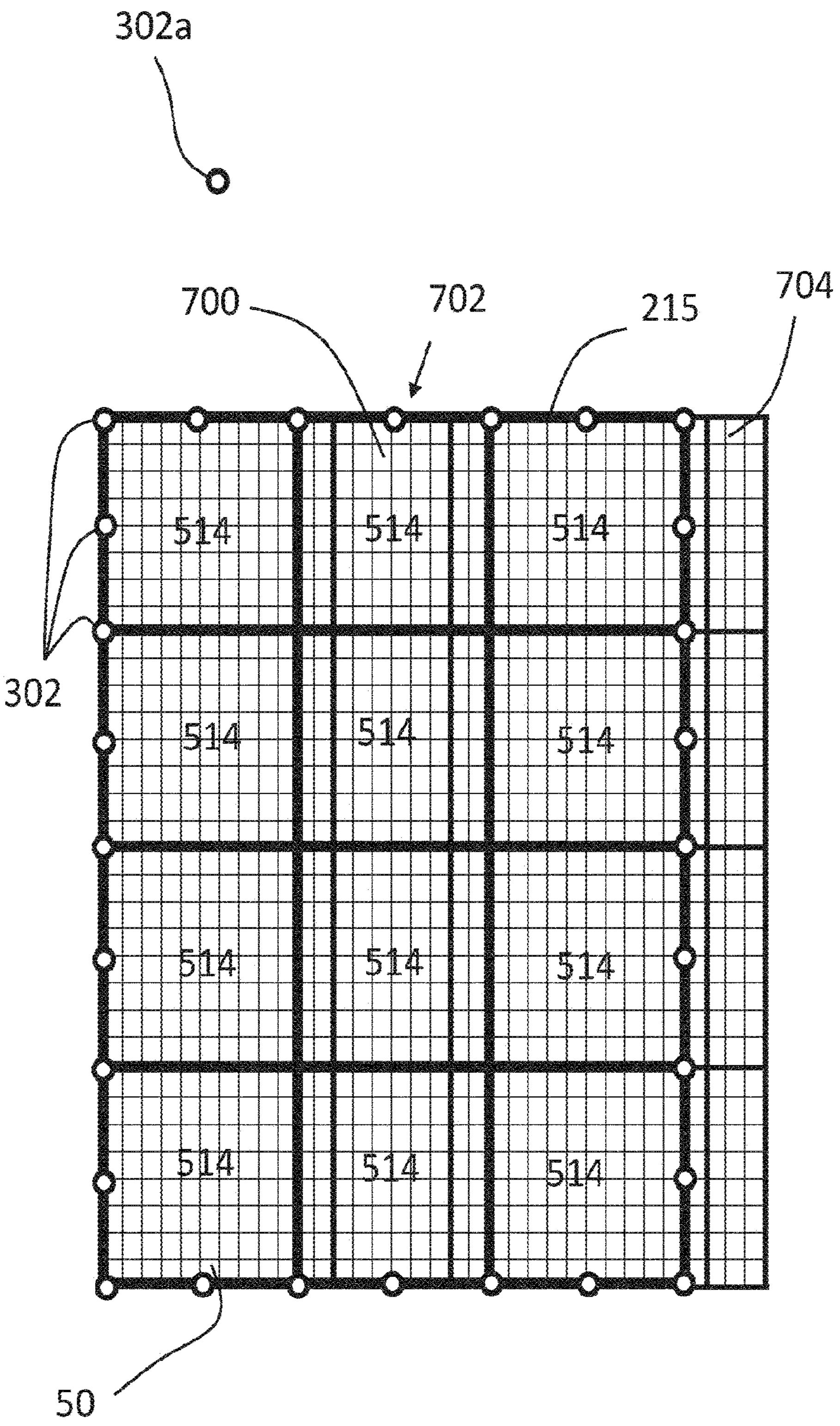
FIG. 28 is a schematic top view of the grid structure of FIG. 23, showing an arrangement of accelerometers on four sides of the grid structure.

In the arrangement illustrated in FIG. 28, 28 accelerometers 302 are located on the grid framework structure, as well as the ground accelerometer 302*a*. The accelerometers are positioned around the periphery of the bracing structure, along all four edges of the perimeter bracing structure 215. In this case, two lines of accelerometers extend in the first direction (X-direction), and two lines of accelerometers extend in the second direction (Y-direction), the lines meeting at the four corners of the grid to form a substantially rectangular shape around the perimeter of the grid.

These arrangements of accelerometers are examples only, and other arrangements are possible. Although the illustrated examples are applied to a modular seismic grid framework structure, these arrangements of accelerometers could also be used on a standard non-seismic grid framework structure, either modular or non-modular. The number of accelerometers may scale with the size of the grid. In examples where the grid is modular, the number of accelerometers may scale with the number of modules 514.

In some examples, increasing the number of accelerometers beyond a given number will result in diminishing returns, i.e. a further increase in the number of accelerometers will provide no substantial further improvement in accuracy of the acceleration data. Marginal improvements in accuracy from adding more accelerometers to the seismic detection system may not justify the increased cost and increased complexity of a system with a larger number of accelerometers.

The distribution of accelerometers on a grid framework structure is different from that which would be required for other structures, for example for a building. A building might have one or two accelerometers on each floor, whereas the grid framework structure has a larger number of accelerometers at or towards the top of the grid framework structure. The difference in distribution is required because the seismic detection system on a grid framework structure is able to detect which parts of the grid are damaged-a typical grid framework structure for a storage and retrieval system extends over a wide area. A seismic detection system in a building, on the other hand, needs to determine which floors of a building are safe for humans to enter, so the accelerometers are likely to be distributed vertically (one on each floor) rather than distributed horizontally (many accelerometers on the top floor). In a building, the purpose of a seismic detection system is to assess the structural integrity of each floor or each level of the building, whereas in a grid framework structure the purpose of a seismic detection system is to assess the structural integrity of the entire grid framework structure, which is located on the ground in a building.

A typical building in a seismic zone will be a tower block or other tall multi-storey building with many floors, but not extending over a wide area compared to the building's height. This is especially true in locations like Japan where usable land is at a premium, so there is a tendency to build upwards rather than outwards. For this reason, the distribution of the accelerometers is different from what would be typical in a tall building; the accelerometers are distributed horizontally rather than vertically, and are at or near the top of the grid framework structure. The accelerometers may be distributed in a substantially horizontal plane.

Figure 29:
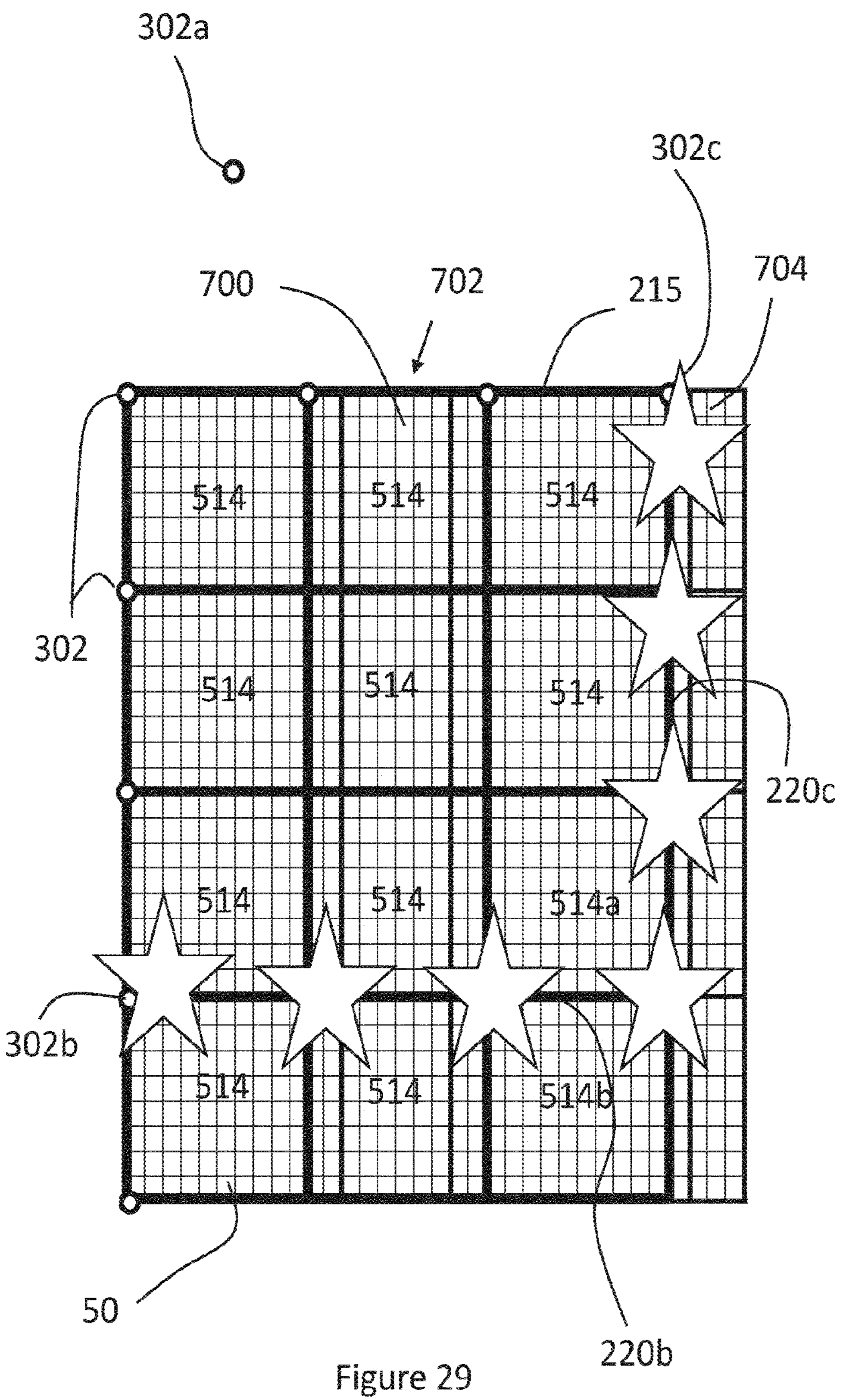
FIG. 29 is a schematic top view of a grid structure with the arrangement of accelerometers as shown in FIG. 26, illustrating the approximate locations of damage on the grid structure.

For example, FIG. 29 illustrates a grid framework structure with the accelerometer arrangement as in FIG. 26, with accelerometers arranged along two edges of the grid framework structure and mounted on horizontal frame beams 220. In particular, the accelerometer labelled 302*b* is mounted on the horizontal frame beam labelled 220*b*, and the accelerometer labelled 302*c* is mounted on the horizontal frame beam labelled 220*c*. In the illustrated example, only the accelerometer 302*b* and the accelerometer 302*c* have measured significant accelerations, enough to determine that the horizontal frame beams 220*b* and 220*c* upon which these two accelerometers are mounted have yielded and moved away from their initial positions. The other accelerometers 302 have measured accelerations that indicate no yield. The positions of the two accelerometers 302*b* and 302*c* enable the most damaged parts of the grid to be identified. The damaged parts of the grid are highlighted on FIG. 26 with stars, along the yielded horizontal frame beams 220*b* and 220*c*. This information is useful because it indicates that the other parts of the grid (for example, the top left corner) are undamaged and may be able to continue operating, and are safe for humans to enter.

The use of a number of accelerometers in different locations distributed over the grid framework structure, rather than a single accelerometer, is advantageous because it permits the damaged section(s) of the grid to be identified after a seismic event. Arrangements of accelerometers surrounding the grid on two or more edges are particularly useful because they enable identification of which parts of the grid are sufficiently undamaged to keep operating as usual, which parts are too damaged to resume operation immediately but safe enough to send personnel in to fix the damage, and which parts are dangerous to personnel.

In examples where the grid framework structure is a seismic grid framework structure (either modular or a single structure), accelerometers can be mounted directly on the bracing structure. In particular, accelerometers may be mounted on horizontal frame beams 220, which extend horizontally along the edges of the grid. If an accelerometer mounted on a horizontal frame beam indicates a residual drift, then the horizontal frame beam has yielded. Positioning accelerometers on the perimeter bracing structure 215 enables the seismic detection system to determine whether the members of the perimeter bracing structure have yielded. In examples where the grid framework structure is an assembly of modular frames (as in FIG. 23), determining which members of the perimeter bracing structure have yielded can enable individual modules 514 to be categorised into different states or failure modes depending on the amount of residual drift.

Failure Modes

A seismic event can produce a range of different failure modes or states of the grid framework structure, which have different consequences and require different actions.

- Elastic limit—the instant before yielding of the bracing members. If the bracing members are still within the elastic limit, there is no permanent deformation of the grid framework structure and normal operation can continue after the seismic event. The elastic limit state occurs below accelerations of around 0.6 g.
- Immediate Occupancy—the level of allowable plastic or elastic deformation. It is possible for personnel to safely re-enter the building after a seismic event in order to assess and repair the damage. The immediate occupancy state occurs for accelerations between around 0.6 g and around 1 g.
- Life Safety—the grid framework structure could have significant structural damage, but it has reserve structural capacity to resist aftershocks. The building may not be able to be occupied until after repairs are made. The life safety state occurs for accelerations between around 1 g and around 1.83 g.
- Collapse Prevention—the grid framework structure has been pushed to the limits of its strength and stiffness and is on the verge of collapse. Aftershocks may cause the grid framework structure or the building to collapse. The collapse prevention state occurs for accelerations above around 1.83 g.

The state of the grid framework structure may also be determined based on the spectral acceleration measured by the accelerometers at the top of grid framework structure. The grid framework structure has a natural period and a natural frequency, which will depend on the size, shape, and materials from which the grid framework structure is built. After a seismic event has taken place, the data can be analysed to determine whether the frequency spectrum during the seismic event contained components close to the natural frequency of the grid framework structure; if so, more damage would be expected, since an applied oscillation close to the natural frequency or the natural period would result in resonance, and therefore a higher amplitude of vibration.

Many building codes place a limit of the maximum movement allowed during a seismic event before a structure is classed as "failed". For example, in the US the maximum permitted lateral displacement measured during a seismic event is 2% of the structure's height, while in Japan the maximum permitted lateral displacement measured during a seismic event is 0.5% of the structure's height. If a structure is classed as "failed" according to building codes, the structure may need to be recertified by an appropriately qualified person before it can be considered as compliant with the building code.

Grid framework structures may be very large structures, with thousands of components that could potentially fail. If there is no means of identifying where damage has occurred, every critical part of the grid framework structure would have to be inspected individually. Visual inspection of parts on the outside of the grid framework structure is relatively straightforward, but inspecting parts inside the grid framework structure, especially given the presence of stacks of storage containers, is extremely time consuming, since the storage containers would need to be moved in order to permit visual inspection of the components within the grid framework structure.

When a storage and retrieval system is taken offline for inspection after a seismic event, this is extremely expensive because the system cannot fulfil customer orders while offline. It is therefore advantageous to minimise downtime and get the storage and retrieval system back up and running as quickly as possible.

On the other hand, if a storage and retrieval system continues to operate when it is damaged, this can affect other systems or threaten safety, so it is important to ensure that the system is safe and capable of normal operation before bringing the system back online.

There is a large difference in costs between "Immediate Occupancy" and "Life Safety" failure modes. If there is no means of distinguishing which state the grid framework structure is in, it is necessary to take a more cautious approach to avoid endangering life.

In some examples, particularly where the grid framework structure is modular, different parts of the grid framework structure may be in different states, for example some parts could be safe to continue operating as normal, some parts could safely be entered by personnel in order to replace damaged parts, and some parts are not safe. Understanding the state or failure mode of different parts of the grid framework structure enables downtime to be minimised while ensuring the safety of personnel and compliance with building codes.

Method to Generate Displacement Data

Figure 19:
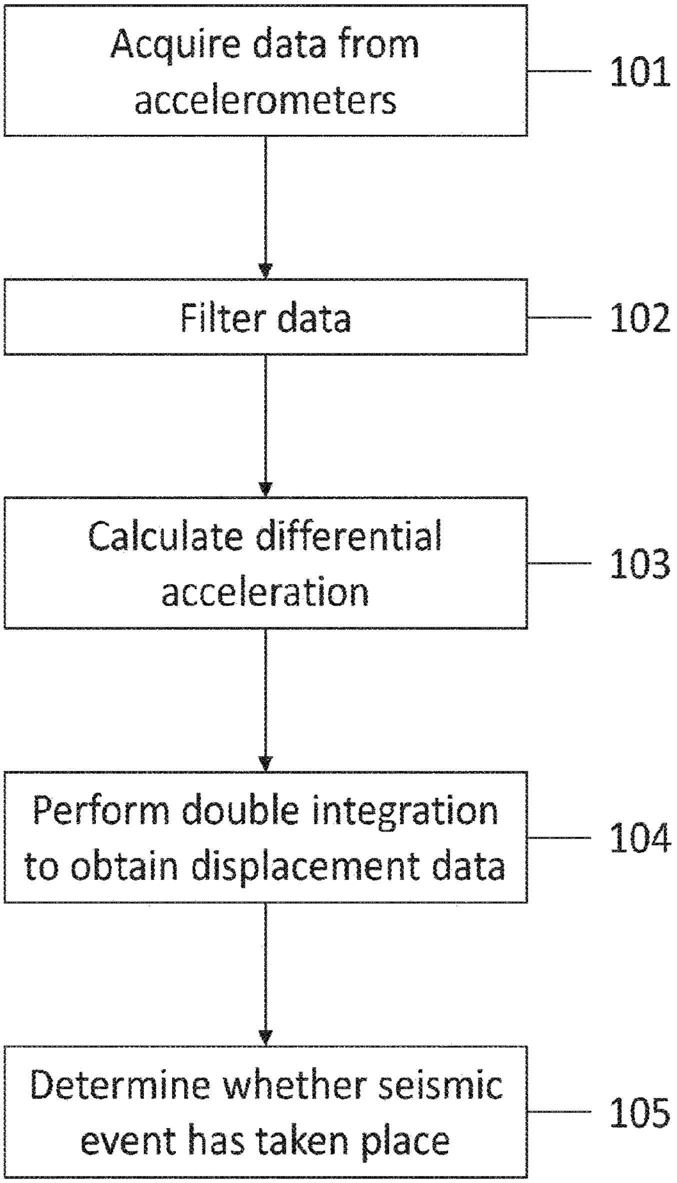
FIG. 19 is a flowchart showing the steps in the method for detecting seismic events according to an embodiment of the present invention.

The method of generating displacement data to determine whether a seismic event has taken place is illustrated in FIG. 19, and described below.

In step 101, the raw data is captured by the accelerometers in the form of a signal of acceleration with respect to time.

The data is filtered in step 102. The first task of the controller upon receiving a signal from an accelerometer is to filter the signal to remove excessive noise. This can be done, for example, by using a band filter to band limit the waveform (i.e. to attenuate or remove oscillations that are above or below the specified frequency band), or by using a high-pass filter to attenuate low-frequency vibrations, or by using a low-pass filter to attenuate high-frequency noise.

Additionally, the controller may filter out other known sources of noise, for example vibrations caused by load handling devices moving on the grid framework structure, or frequencies associated with other components or peripherals on the grid framework structure, or even in the same building. In order to do this, the known sources of noise must be characterised by recording the background acceleration signal in the absence of seismic activity, and then analysing this background acceleration signal to determine characteristic background frequencies, e.g. by calculating the Fourier transform of the acquired signal in the frequency domain. These characteristic background frequencies can then be filtered out or attenuated from the acceleration signals received by the controller from the accelerometers. Alternatively, the Fourier transform of the background acceleration signal can be subtracted from the Fourier transform of the acceleration signal from the accelerometers, so that events due to characteristic background frequencies are removed from the signal. In this way, it becomes easier to detect seismic events because any unusual events can more easily be distinguished from the background noise.

Filtering out known sources of noise is important for a seismic detection system for a grid framework structure, especially for grid framework structures that do not have an exoskeleton to provide further support during seismic events. The load handling devices accelerating and decelerating as they move on top of the grid is an additional movement that must be taken into account. This movement will affect the accelerometer readings more so than, say, people moving within a building, because people in a building are likely to be distributed vertically on different floors rather than all at the top of the structure, and likely to be moving more slowly and not continuously. People in a building are likely to move vertically (e.g. taking lifts up and down between different floors) at least as much as horizontally, and buildings are likely to be empty at certain times of day rather than full of people moving continuously. For this reason, filtering out known sources of noise is advantageous.

A ground accelerometer **302*a* is provided, located on the ground beside or underneath the grid framework structure. The ground accelerometer measures the acceleration at the ground level. At step 103**, the acceleration at ground level is then used to calculate the differential acceleration of the accelerometers at the top of the grid framework structure relative to the ground. The controller subtracts the acceleration signal measured by the ground accelerometer from the acceleration signal measured by the accelerometers at the top of the grid framework structure, in order to calculate the differential acceleration.

At step 104, the controller determines the displacement of the grid framework structure relative to the ground from the calculated differential acceleration. This can be achieved mathematically by performing a double integration on the differential acceleration signal (i.e. integrates with respect to time once to obtain a velocity signal, then integrates with respect to time again to obtain a displacement signal). A displacement signal is therefore obtained from each of the accelerometers.

At step 105, the displacement data can be analysed to determine whether a seismic event has taken place.

Detecting Seismic Events From Displacement Data

Figure 20:
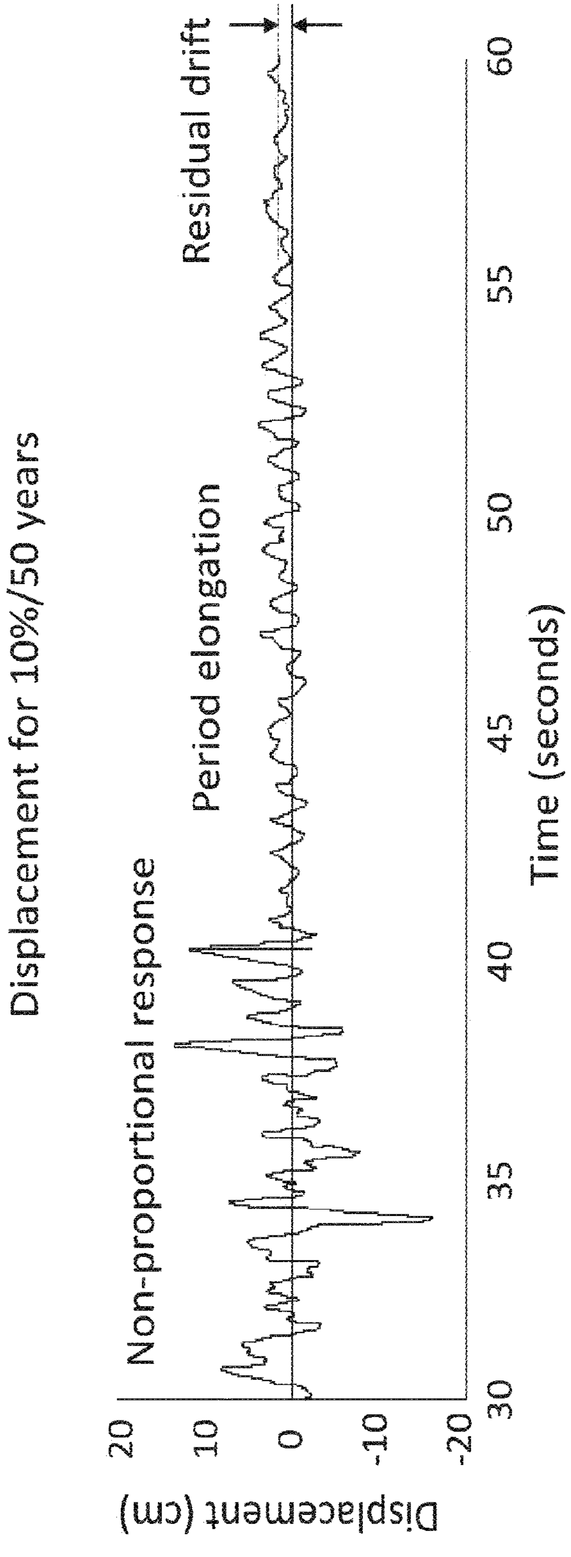
FIG. 20 is a graph of sample displacement data showing the non-proportional response, period elongation, and residual drift regimes.

FIG. 20 illustrates an example of displacement data calculated from an accelerometer on a grid framework structure during a seismic event. Displacement is plotted as a function of time. There are three distinct regimes of the displacement response that can be seen on the graph: non-proportional response, period elongation, and residual drift.

The first regime is non-proportional response, characterised by high-amplitude spikes. In this regime, the amplitude (displacement response) is not proportional to the applied force. This indicates that the yield strength of a structural member has been surpassed, and the material is no longer exhibiting linear elastic behaviour. In the absence of seismic events, the material of the structural components behaves linearly and obeys Hooke's law, where the displacement is proportional to the applied force:

$$F=kx$$

where F is the applied force, k is the stiffness or spring constant of the material, and x is the displacement. The stiffness k depends on the cross-sectional area, the length, and the Young's modulus of the material. The above equation is true when the material of the structure components is below its yield strength. When the yield strength is exceeded, the material starts behaving non-linearly and the value of k is no longer a constant. In the non-proportional response regime the displacements may be higher than would be expected when the material is behaving elastically.

Non-proportional response can be detected by determining whether the amplitude of the displacement signal exceeds a predetermined displacement threshold corresponding to the elastic limit of a structural member of the grid framework structure. Alternatively, non-proportional response can be detected by comparing the acceleration signal (after filtering) with the displacement signal, and determining whether the amplitudes of the two signals are proportional.

The second regime is period elongation, in which the time period of the oscillation is increased from its usual value. This happens because yielding changes the dynamic properties of the grid framework structure. To determine the period of oscillation, a Fourier transform of the signal in the frequency domain can be calculated. The largest spike in the frequency domain will be the oscillation frequency of the grid framework structure during the period elongation regime of the seismic event. To determine whether the period has changed, the oscillation period can be compared to a reference period, corresponding to the natural frequency of vibration of the grid framework structure. The natural frequency can be determined by taking a Fourier transform of the displacement signal in the absence of any seismic events.

The third regime is residual drift, in which there is a static non-zero displacement remaining once the displacement oscillations have stopped or returned to their usual level. This can be seen as the dashed line on FIG. 20; once the amplitude of the oscillations has reduced, the displacement has shifted away from zero. This residual drift or residual displacement is an indication of how far the accelerometer has moved from its original position, i.e. how far the structural member upon which the accelerometer is mounted has moved.

These three regimes (non-linear response, period elongation, residual drift) provide three different methods to identify failure from the displacement time signal. In practice any one of these three methods can be used, or a combination of two or all three. The simplest method is residual drift, as this simply means that the structure has moved after a seismic event, which suggests failure. It has the advantage that it is straightforward to estimate the extent of the yielding of the structure from the magnitude of the static displacement. However, the residual drift method alone may not be sufficiently accurate, and is subject to the risk of false positives (e.g. if the accelerometers have moved rather than the grid structure itself). Using a combination of methods will yield a more accurate result.

The non-proportional response and period elongation methods are more complex and require more analysis. However, these two methods are more indicative of yield failure in the grid framework structure, as the only time that the non-proportional response and period elongation phenomena occur is when the grid framework structure yields. If non-proportional response and/or period elongation are detected, then it is likely that there has been a yield failure. Determining the extent of the yield failure is more difficult with these methods, whereas the residual drift allows easy estimation of the extent of the yield. It is therefore preferable to use a combination of all three methods.

Adaptive Gain Control and Offset Compensation

In some cases, adaptive gain control can be used to compensate for differences between predicted and measured peak-to-peak displacement as a function of frequency, as will be described below. For a range of frequencies, the peak-to-peak displacement of the accelerometer is calculated according to the method described above and illustrated in FIG. 19. Calculated peak-to-peak displacements are compared to measured peak-to-peak displacements. At low frequencies, the calculated peak-to-peak displacement tends to underestimate the displacement. Filtering out low frequencies from the acceleration signal by using a high-pass filter or band filter makes the calculated displacement more accurate (closer to the measured displacement).

In cases where the error in displacement calculation is a fixed percentage of the displacement, this error can be corrected by multiplying the calculated displacement by a gain or scale factor. This procedure is repeated across a range of frequencies, resulting in a reference curve of the gain or scale factor vs. frequency. This reference curve can be applied to calculated peak-to-peak displacements in order to correct the error and more accurately estimate the peak-to-peak displacement of the accelerometers.

To simulate residual drift (see the residual drift regime illustrated in FIG. 20), an acceleration signal is created by superimposing a peak-to-peak oscillation and a static displacement to simulate yield of a structural element within the grid framework structure. The acceleration signal is filtered and integrated twice in order to calculate a displacement signal. The calculated displacement signal exhibits an initial transient response, as could be expected as a result of double-integrating, after which the signal settles to its expected position (i.e. static displacement).

The accelerometers do not measure exactly zero when at rest, due to background noise and to the equipment input offset voltage on the acceleration measurements. This offset voltage is small, but adds up when double integrated over a long time. To compensate for this effect, offset compensation (e.g. by an averaging algorithm) can be applied to the signal to counteract the offset voltage.

As for dynamic displacement, the calculated static displacements tend to be underestimated at low frequencies. Adaptive gain control can therefore be applied, as described above with reference to the peak-to-peak displacement calculation.

Multi-Storey Storage System

The seismic detection system and method of the invention can equally be applied to a multi-storey storage system located in a multi-storey building. In some examples, as well as having a grid framework structure on the ground floor of a building, further grid framework structures can be located on one or more upper floors of the building. For example, an ambient grid framework structure for ambient-temperature goods can be located on the ground floor, and a (usually smaller) chill grid framework structure for chilled temperature goods can be located on an upper floor. This could be the first floor of the building, i.e. the floor directly above the ground floor, or a higher floor, for example the second or third or fourth floor. In other examples, there may be three or more grid framework structures in the same building, located on different floors. In some examples, a single grid framework structure could be located on a higher floor of a multi-storey building instead of on the ground floor.

Figure 30:
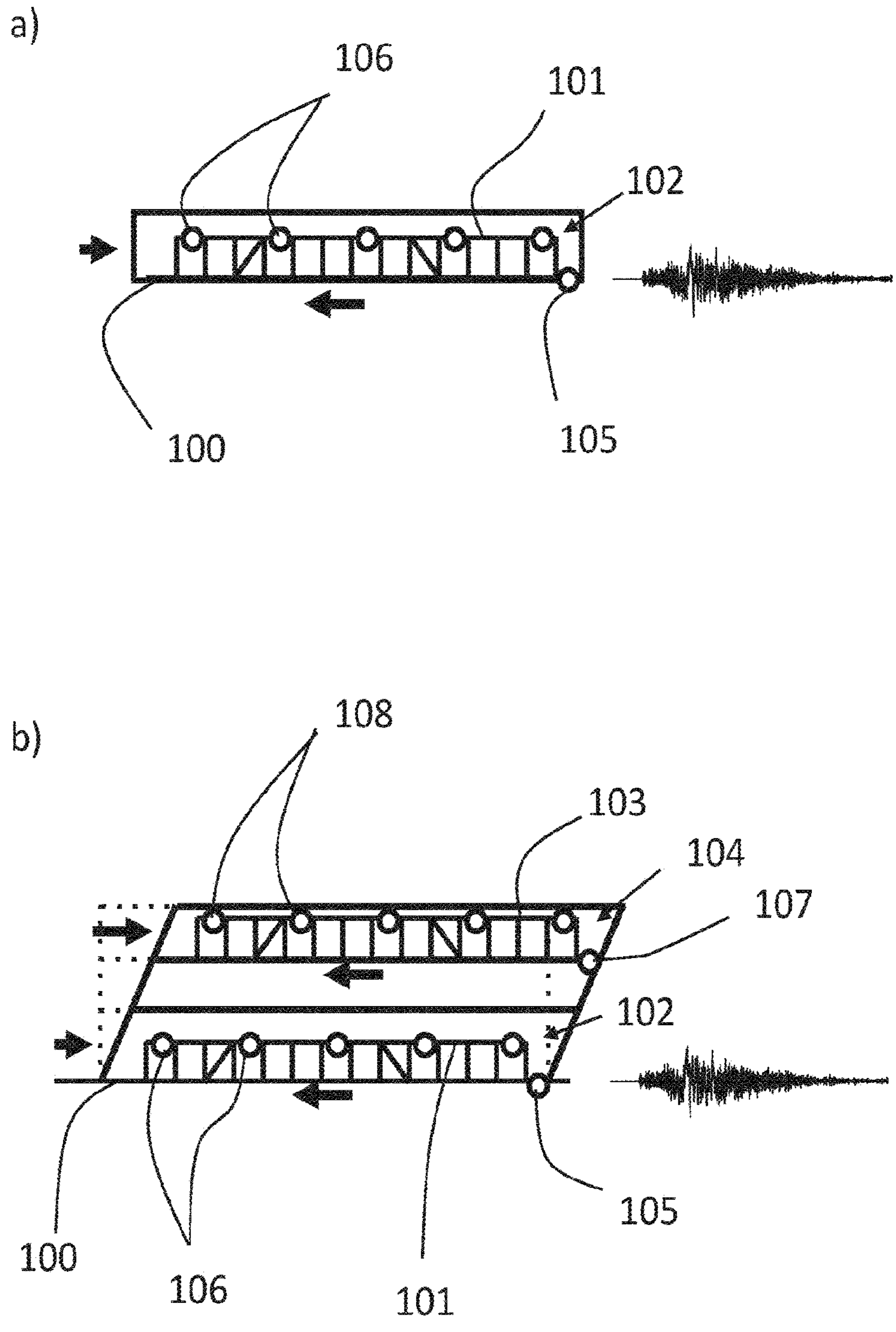
FIG. 30 is a schematic illustration of (a) a single storey storage system, and (b) a multi-storey storage system.
Figure 31:
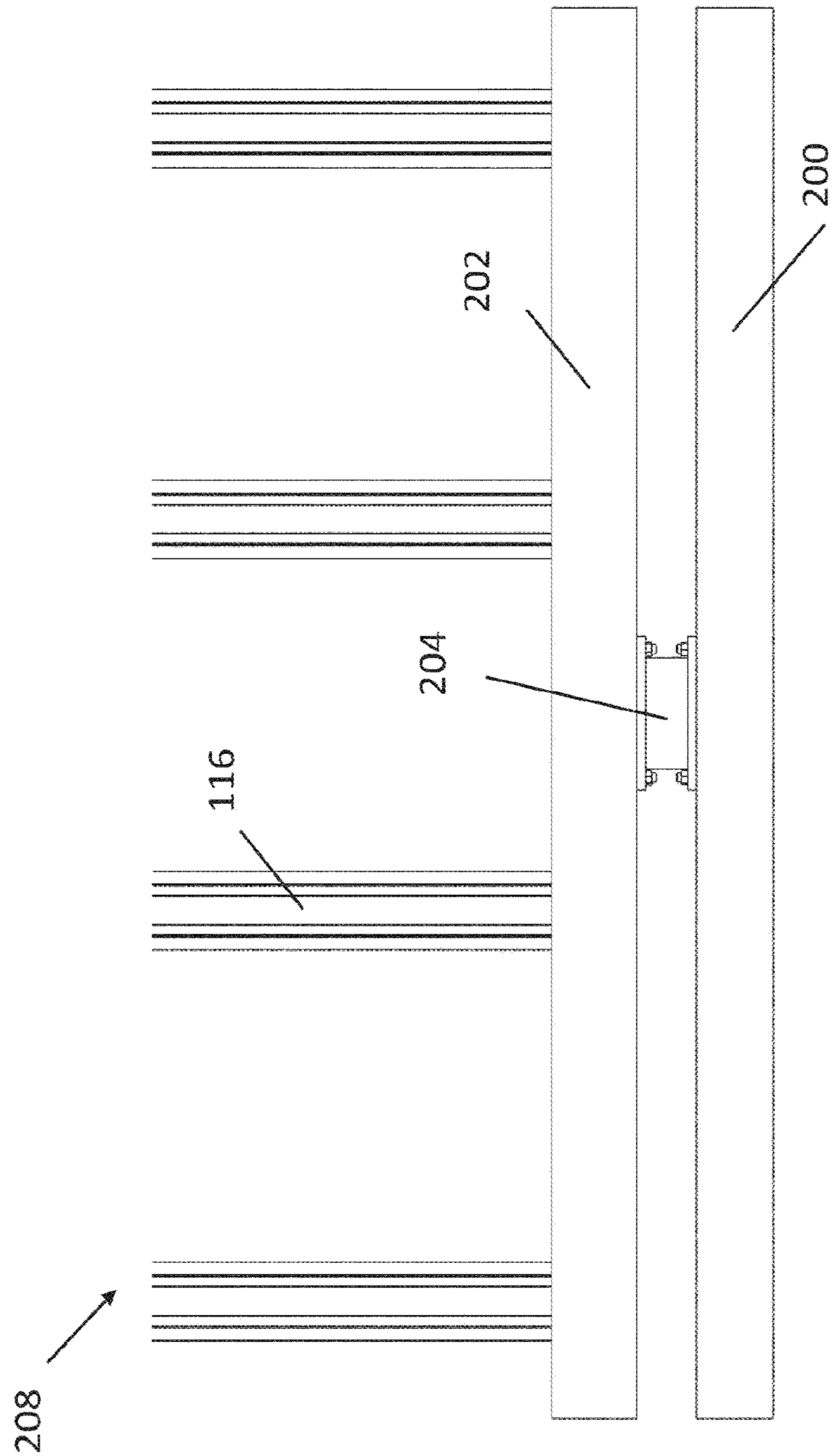
FIG. 31 is a cross sectional view of a portion of the seismic isolation system showing a base isolation device.

FIG. 30(*a*) illustrates an example with a single-storey building 100 that has a single grid framework structure 101 located on the ground floor 102 of the building 100. As in previous examples, one or more ground accelerometers 105 are located on the ground (either on the substructure supporting the lower grid framework structure 101 or directly on the soil ground, as discussed earlier). One or more accelerometers 106 are mounted on the grid framework structure 101, either on the grid or on the supporting framework structure.

FIG. 30(*b*) illustrates an example with a multi-storey building 100 that has a lower grid framework structure 101 located on the ground floor 102 of the building 100, and an upper grid framework structure 103 located on an upper floor 104 of the building 100. The upper floor 104 could be the first floor of the building 100, or another upper floor as in the illustrated example. As in previous examples, one or more ground accelerometers 105 are located on the ground (either on the substructure supporting the lower grid framework structure 101 or directly on the soil ground, as discussed earlier). One or more accelerometers (which will be referred to as lower grid accelerometers 106) are mounted on the lower grid framework structure, either on the grid or on the supporting framework structure. On the upper floor 104 are located one or more accelerometers 107 (which will be referred to as upper floor accelerometers 107) on the floor at the base of the upper grid framework structure 103. One or more accelerometers 108 (which will be referred to as upper grid accelerometers 108) are mounted on the upper grid framework structure 103, either on the grid or on the supporting framework structure.

The seismic demand is the acceleration or force that the ground movement (represented by the signal illustrated in FIG. 30) imposes on a building or structure. Seismic demand at the ground will be measured by the ground accelerometer 105. Seismic demand on the upper floor will depend on both the ground acceleration and the movement of the building. In general, the seismic demand will be higher on higher floors of the building. The seismic demand in FIG. 30 is represented by the right-pointing arrows. In FIG. 30(*b*), the right-pointing arrow on the upper floor 104 is longer than for the ground floor 102, representing the higher seismic demand (and higher acceleration/displacement) of the upper floor 104 and hence the upper grid framework structure 103.

The seismic capacity is the acceleration or force that a building or structure can resist, which is a function of the materials and design of the structure. For engineering design, it is a requirement that the seismic capacity is greater than or equal to the seismic demand. The seismic capacity of the upper and lower grid framework structures is illustrated by the left-pointing arrows in FIG. 30, and is the same irrespective of which floor the grid framework structure is located on.

When calculating differential acceleration for a grid framework structure on an upper floor, the same method can be used as described earlier in this application. Differential acceleration can be calculated by taking the difference between acceleration measured by the upper grid accelerometers 108 and the upper floor accelerometer 107, as well as by taking the difference between acceleration measured by the upper grid accelerometers 108 and the ground accelerometer 105. This enables the movement of the upper grid structure 103 to be characterised both relative to the floor that it rests on within the building 100, and to the ground.

Base Isolation

In some examples, the grid framework structure comprises a seismic isolation system for reducing the seismic forces acting on the grid framework structure. A cross sectional view of one example of a seismic isolation system 208 is shown in FIG. 18. The seismic isolation system 208 comprises a superstructure or diaphragm 202 and a substructure or foundation 200. The superstructure 202 comprises at least part of and, in some cases, all of the load bearing structure of the grid framework structure 114. The superstructure 202 can be a concrete load bearing structure. The grid framework structure 114, more specifically, the footing of the upright columns 116 are mounted to the superstructure 202 by one or more anchor bolts. The upright columns 116 and thus, the grid framework structure 114 is mounted to the superstructure 202 by one or more adjustable feet 90 and/or anchor feet 132. Further detail of the adjustable foot and the anchor foot is discussed above. The requirement of the superstructure 202 at the base of the grid framework structure has the benefit of redistributing forces concentrated from one or more discrete braced frame locations to a relatively larger number of support points. The substructure 200 comprises at least the grid framework structure's foundation. This could be the ground or a concrete foundation.

Inter disposed between the superstructure 202 and the substructure 200 are one or more base isolation devices 204. The distribution of the base isolation devices 204 can be tuned to remove any irregularities or possible torsional issues in the superstructure 202. The one or more base isolation devices 204 decouple the superstructure 202, and thus the grid framework structure 114 mounted thereon, from the motion of the substructure or ground motion during earthquakes. In this way, large deflections and high accelerations are prevented being transmitted to the grid framework structure 114. The number and distribution of the one or more base isolation devices 202 is dependent on the weight of the grid framework structure, the height of the grid framework structure, and the composition of the ground. For example, while the energy of seismic waves with higher frequencies tends to be absorbed by solid rock soil, the seismic waves with lower frequency pass through the solid rock soil without being absorbed but are eventually amplified by soft sediments. Base isolation devices can be distributed in an array having a grid like pattern, each of the base isolation devices 204 being respectively mounted between the substructure 200 and the superstructure 202 by lower and upper mounting plates. The base isolation devices provide the lateral flexibility of the seismic isolation system to attenuate ground movement being transmitted to the grid framework structure. Various known base isolation devices that attempt to get maximum energy dissipation by damping are permissible in the present invention. Options include (but are not limited to) elastomeric bearings, sliding bearings or a combination thereof.

In examples where the grid framework structure is located in a multi-storey building, the grid framework structure may be located on an upper floor rather than on the ground floor. Alternatively, a second grid framework structure could be located on an upper floor, in addition to a grid framework structure located on the ground floor. Usually the seismic demand in a multi-storey building is higher for upper floors, but in examples where the entire building utilises a seismic isolation system (i.e. the building is supported by the superstructure 202, which can move relative to the substructure 200), in some cases the seismic demand may be lower on higher floors than on the ground floor.

DEFINITIONS

In this document, the language "movement in the n-direction" (and related wording), where n is one of x, y and z, is intended to mean movement substantially along or parallel to the n-axis, in either direction (i.e. towards the positive end of the n-axis or towards the negative end of the n-axis).

In this document, the word "connect" and its derivatives are intended to include the 25 possibilities of direct and indirection connection. For example, "x is connected to y" is intended to include the possibility that x is directly connected to y, with no intervening components, and the possibility that x is indirectly connected to y, with one or more intervening components. Where a direct connection is intended, the words "directly connected", "direct connection" or similar will be used. Similarly, the word "support" 30 and its derivatives are intended to include the possibilities of direct and indirect contact.

For example, "x supports y" is intended to include the possibility that x directly supports and directly contacts y, with no intervening components, and the possibility that x indirectly supports y, with one or more intervening components contacting x and/or y. The word "mount" and its derivatives are intended to include the possibility of direct and indirect mounting. For example, "x is mounted on y" is intended to include the 5 possibility that x is directly mounted on y, with no intervening components, and the possibility that x is indirectly mounted on y, with one or more intervening components.

In this document, the word "comprise" and its derivatives are intended to have an inclusive rather than an exclusive meaning. For example, "x comprises y" is intended to include the possibilities that x includes one and only one y, multiple y's, or one or 10 more y's and one or more other elements. Where an exclusive meaning is intended, the language "x is composed of y" will be used, meaning that x includes only y and nothing else.

The invention claimed is:

1. A method for detecting seismic events, the method comprising:

a) acquiring acceleration data over a given period of time from one or more accelerometers located on a grid framework structure, said grid framework structure including:

i) a first set of horizontal grid members extending in a first direction;

ii) a second set of horizontal grid members extending in a second direction substantially perpendicular to the first direction and intersecting with the first set of horizontal grid members at intersections, the first and second sets of horizontal grid members being arranged to form a grid including a plurality of substantially rectangular frames in a horizontal plane, each of the substantially rectangular frames constituting a grid cell; and iii) a plurality of upright columns supporting the first and second sets of horizontal grid members the plurality of upright columns forming a plurality of vertical storage locations for containers to be stacked between the upright columns;

b) comparing the acquired acceleration data to ground acceleration data from one or more accelerometers located on the ground;

c) determining a differential acceleration between the acceleration data and the ground acceleration data;

d) determining displacement data from the differential acceleration; and e) determining whether a seismic event has taken place over the given period of time based on the displacement data, wherein the determining whether a seismic event has taken place comprises determining a change in a frequency and/or period of oscillation of the displacement data over the given period of time.

2. The method of claim 1, wherein the determining whether a seismic event has taken place over the given period of time comprises:

determining whether the displacement data exceeds a predetermined displacement threshold corresponding to an elastic limit of a member of the grid framework structure.

3. The method of claim 1, wherein determining the change in the frequency and/or period of oscillation of the displacement data comprises:

determining whether a frequency and/or period of oscillation differs from a predetermined frequency threshold and/or a predetermined period of oscillation.

4. The method of claim 3, wherein determining whether a seismic event has taken place over the given period of time comprises:

determining a static displacement from the displacement data and determining whether the static displacement exceeds a predetermined static displacement threshold.

5. The method of claim 4, comprising:

filtering the acceleration data to remove or attenuate one or more signals associated with non-seismic events.

6. The method of claim 5, wherein the filtering the acceleration data to remove or attenuate one or more signals associated with non-seismic events comprises:

determining frequency ranges at which oscillation occurs in an absence of seismic events, and attenuating or filtering out these frequency ranges from the acceleration data.

7. A method of condition monitoring a grid framework structure following a seismic event, the grid framework structure including:

i) a first set of horizontal grid members extending in a first direction;

ii) a second set of horizontal grid members extending in a second direction substantially perpendicular to the first direction and intersecting with the first set of horizontal grid members at intersections, the first and second sets of horizontal grid members being arranged to form a grid including a plurality of substantially rectangular frames in a horizontal plane, each of the substantially rectangular frames constituting a grid cell;

iii) a plurality of upright columns supporting the first and second sets of horizontal grid members, the plurality of upright columns forming a plurality of vertical storage locations for containers to be stacked between the upright columns; and iv) one or more accelerometers located on the grid framework structure;

the method comprising:

a) acquiring acceleration data over a given period of time from the one or more accelerometers;

b) comparing the acquired acceleration data to ground acceleration data over the given period of time from one or more accelerometers located on the ground;

c) determining a differential acceleration between the acceleration data and the ground acceleration data;

d) determining the extent of damage to different portions of the grid framework structure that occurred during the given period of time by determining whether the differential acceleration data exceeded a predetermined acceleration threshold during the given period of time;

e) determining displacement data from the differential acceleration; and f) determining a change in a frequency and/or period of oscillation of the displacement data over the given period of time.

8. The method of claim 7, wherein the predetermined acceleration threshold comprises:

a plurality of predetermined acceleration thresholds, each of the plurality of predetermined acceleration thresholds being indicative of a different level of damage to one or more of the portions of the grid framework structure.

9. The method of claim 7, comprising:

g) determining an extent of damage to different parts of the grid framework structure by determining whether the displacement data has exceeded a predetermined displacement threshold.

10. The method of claim 9, wherein the predetermined displacement threshold is indicative of an elastic limit, such that a displacement of a portion of the grid framework structure exceeding the predetermined displacement threshold provides an indication that a portion of the grid framework structure has been permanently deformed.

11. A seismic detection system configured for a grid framework structure including:

i) a first set of horizontal grid members extending in a first direction;

ii) a second set of horizontal grid members extending in a second direction substantially perpendicular to the first direction and intersecting with the first set of horizontal grid members at intersections, the first and second sets of horizontal grid members being arranged to form a grid including a plurality of substantially rectangular frames in a horizontal plane, each of the substantially rectangular frames constituting a grid cell; and iii) a plurality of upright columns supporting the first and second sets of horizontal grid members, the plurality of upright columns forming a plurality of vertical storage locations for containers to be stacked between the upright columns;

the seismic detection system comprising:

a) one or more accelerometers mounted on the grid framework structure;

b) an input module configured to acquire acceleration data from the one or more accelerometers; and c) a controller in communication with the input module, the controller including one or more processors and a memory storing instructions that, when executed by the one or more processors, will cause the one or more processors to:

i) determine whether a seismic event has taken place based on the acquired acceleration data from the one or more accelerometers, wherein determining whether a seismic event has taken place comprises determining a change in a frequency and/or period of oscillation of displacement data derived from the acquired acceleration data; and ii) in response to determining that a seismic event has taken place, send a signal to one or more output devices.

12. The seismic detection system of claim 11, comprising: one or more accelerometers at a ground location near the grid framework structure.

13. The seismic detection system framework structure of claim 11, wherein the one or more accelerometers mounted on the grid framework structure comprise: a plurality of accelerometers arranged along the first direction and/or the second direction of the grid.

14. The seismic detection system framework structure of claim 13, wherein the plurality of accelerometers are arranged along at least a portion of the periphery of the grid.

15. The seismic detection system framework structure of claim 11, wherein the one or more accelerometers mounted on the grid framework structure comprise: a plurality of accelerometers and at least a portion of the plurality of accelerometers are arranged diagonally relative to the first and second direction of the grid.

16. The seismic detection system framework structure of claim 11, wherein the grid framework structure is subdivided into a plurality of modular frames, such that the grid extends across the plurality of modular frames.

17. A multi-story grid framework structure having a seismic detection system according to claim 11, the multi-story grid framework structure comprising:

i) a first grid framework structure at a first level;

ii) a second grid framework structure at a second level, the second level being above the first level;

wherein each of the first and second grid framework structures are configured as the grid framework structure.

18. A storage and retrieval system having a seismic detection system, the storage and retrieval system comprising:

A) the grid framework structure, the grid framework structure comprising:

i) a first set of horizontal grid members extending in a first direction;

ii) a second set of horizontal grid members extending in a second direction substantially perpendicular to the first direction and intersecting with the first set of horizontal grid members at intersections, the first and second sets of horizontal grid members being arranged to form a grid including a plurality of substantially rectangular frames in a horizontal plane, each of the substantially rectangular frames constituting a grid cell, the first and the second set of grid members supporting a first and a second set of tracks or rails respectively for a load handling device to move one or more containers on the grid framework structure; and iii) a plurality of upright columns supporting the first and second sets of horizontal grid members, the plurality of upright columns forming a plurality of vertical storage locations for containers to be stacked between the upright columns;

B) one or more load handling devices remotely operable to move the one or more containers stored on the grid framework structure, each of the one or more load handling devices including:

i) a wheel assembly for guiding the load handling device on the grid framework structure;

ii) a container-receiving space located above the grid framework structure; and iii) a lifting device arranged to lift a single container from a stack into the container-receiving space;

wherein the seismic detection system comprises:

a) one or more accelerometers configured to be mounted on the grid framework structure;

b) an input module configured to acquire acceleration data from the one or more accelerometers; and c) a controller in communication with the input module, the controller including one or more processors and a memory storing instructions that, when executed by the one or more processors, will cause the one or more processors to:

i) determine whether a seismic event has taken place based on the acquired acceleration data from the one or more accelerometers; and ii) in response to determining that a seismic event has taken place, send a signal to one or more output devices.

19. The storage and retrieval system of claim 18, comprising one or more accelerometers at a ground location near the grid framework structure.

20. The storage and retrieval system of claim 18, wherein the one or more accelerometers mounted on the grid framework structure comprise a plurality of accelerometers arranged along the first direction and/or the second direction of the grid.

21. The storage and retrieval system of claim 18, wherein the one or more accelerometers mounted on the grid framework structure comprise a plurality of accelerometers, at least a portion of which are arranged diagonally relative to the first and second direction of the grid.

* * * * *